US009327488B2

(12) United States Patent
Taniguchi et al.

(10) Patent No.: US 9,327,488 B2
(45) Date of Patent: May 3, 2016

(54) ALIGNMENT METHOD, TRANSFER METHOD AND TRANSFER APPARATUS

(75) Inventors: Kazutaka Taniguchi, Kyoto (JP); Masafumi Kawagoe, Kyoto (JP); Mikio Masuichi, Kyoto (JP); Tomoyuki Komura, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 567 days.

(21) Appl. No.: 13/599,534

(22) Filed: Aug. 30, 2012

(65) Prior Publication Data

US 2013/0135458 A1 May 30, 2013

(30) Foreign Application Priority Data

Nov. 30, 2011 (JP) ................................ 2011-261821
Nov. 30, 2011 (JP) ................................ 2011-261822

(51) Int. Cl.
*G01B 11/00* (2006.01)
*B41F 1/16* (2006.01)
*B41F 33/00* (2006.01)

(52) U.S. Cl.
CPC ............... *B41F 1/16* (2013.01); *B41F 33/0081* (2013.01); *B41P 2233/13* (2013.01)

(58) Field of Classification Search
CPC ... G03F 9/7073; G03F 9/7084; G03F 9/7038; G03F 9/7069; G03F 9/708; G03F 9/00
USPC .................................................. 356/399–401
See application file for complete search history.

(56) References Cited

U.S. PATENT DOCUMENTS 6,278,957 B1 8/2001 Yasuda et al. ................. 702/150
8,339,614 B2 * 12/2012 Kondo ......................... 356/616
2002/0043344 A1 4/2002 Watanabe et al. .......... 156/583.4
2002/0109827 A1 8/2002 Nishi ............................. 355/53
2004/0021254 A1 2/2004 Sreenivasan et al. ......... 264/406

(Continued)

FOREIGN PATENT DOCUMENTS

CN 1749002 A 3/2006
CN 1963679 A 5/2007

(Continued)

OTHER PUBLICATIONS

Notice of Allowance issued May 20, 2014 in the corresponding Korean Patent Application No. 10-2012-0094872.

(Continued)

*Primary Examiner* — Roy M Punnoose
*Assistant Examiner* — Isiaka Akanbi
(74) *Attorney, Agent, or Firm* — Ostrolenk Faber LLP

(57) ABSTRACT

A carrier and a substrate are aligned even if an imager cannot be simultaneously focused on alignment marks formed on both the carrier and the substrate. Center of gravity positions G1*m* of an alignment pattern element AP1 on a substrate and G2*m* of an alignment pattern element AP2 on a transparent blanket are calculated by image processing from an image IM imaged via the blanket by a CCD camera. The position of the center of gravity Gm2 is specified by a process associated with edge extraction from the image imaged with the alignment pattern element AP2 on the blanket being in focus. High spatial frequency components are removed and low frequency components are extracted for the alignment pattern element AP1 on the substrate imaged out of focus to have a blurred outline, and the position of the center of gravity G1*m* is specified from an extraction result.

23 Claims, 28 Drawing Sheets

(56) References Cited

U.S. PATENT DOCUMENTS

| | | | | |
|---|---|---|---|---|
| 2004/0021866 | A1 | 2/2004 | Watts et al. | 356/401 |
| 2004/0022888 | A1 | 2/2004 | Sreenivasan et al. | 425/174.4 |
| 2004/0118311 | A1 | 6/2004 | Tokiwa | 101/485 |
| 2004/0150823 | A1* | 8/2004 | Yamamoto | 356/401 |
| 2004/0213436 | A1 | 10/2004 | Noffke et al. | 382/112 |
| 2007/0242272 | A1 | 10/2007 | Suehira et al. | 356/401 |
| 2009/0002658 | A1 | 1/2009 | Kiuchi | 355/53 |
| 2009/0108483 | A1 | 4/2009 | Suehira et al. | 264/40.5 |
| 2009/0133595 | A1* | 5/2009 | Yamasaki et al. | 101/127.1 |
| 2009/0155026 | A1 | 6/2009 | Alberti et al. | 414/222.02 |
| 2010/0173553 | A1 | 7/2010 | Tanaka et al. | 445/24 |
| 2011/0141448 | A1* | 6/2011 | Aoki et al. | 355/72 |
| 2012/0147343 | A1 | 6/2012 | Iwamoto | 355/53 |
| 2013/0135458 | A1 | 5/2013 | Taniguchi et al. | 348/95 |

FOREIGN PATENT DOCUMENTS

| | | | |
|---|---|---|---|
| CN | 101059650 | | 10/2007 |
| CN | 201559345 | U | 8/2010 |
| JP | 05-074685 | | 3/1993 |
| JP | 08-146371 | | 6/1996 |
| JP | 9-027276 | | 1/1997 |
| JP | 9-326343 | | 12/1997 |
| JP | 10-041219 | | 2/1998 |
| JP | 11-153805 | | 6/1999 |
| JP | 2000-243762 | | 9/2000 |
| JP | 2002-229043 | | 8/2002 |
| JP | 2003-066466 | | 3/2003 |
| JP | 2004-140512 | A | 5/2004 |
| JP | 2004-151653 | | 5/2004 |
| JP | 2004-188684 | A | 7/2004 |
| JP | 2004-233643 | | 8/2004 |
| JP | 2006-330512 | | 12/2006 |
| JP | 2008-007857 | | 1/2008 |
| JP | 2008-096605 | | 4/2008 |
| JP | 2008-162291 | A | 7/2008 |
| JP | 2008-221821 | | 9/2008 |
| JP | 2009-026976 | | 2/2009 |
| JP | 2009-075142 | | 4/2009 |
| JP | 2009-090673 | | 4/2009 |
| JP | 2010-034132 | | 2/2010 |
| JP | 2010-158799 | | 7/2010 |
| JP | 2011-002475 | | 1/2011 |
| JP | 2011-002737 | | 1/2011 |
| JP | 2013-113766 | | 6/2013 |
| TW | I266970 | | 11/2006 |
| TW | 200844684 | | 11/2008 |
| WO | WO 2004/013693 | | 2/2004 |

OTHER PUBLICATIONS

Taiwan Office Action issued May 19, 2014 in the corresponding Taiwanese Patent Application No. 101134350 (4 pages).

Office Action issued Mar. 17, 2015 in corresponding Japanese Patent Application No. 2011-261822.

Office Action mailed Sep. 28, 2014 in corresponding Chinese Patent Application No. 201210465012.2.

Office Action mailed Jun. 11, 2015 in corresponding Chinese Patent Application No. 201210465012.2.

Office Action issued Jun. 30, 2015 in corresponding Japanese Patent Application No. 2011-261821.

* cited by examiner

FIG. 13

(a)

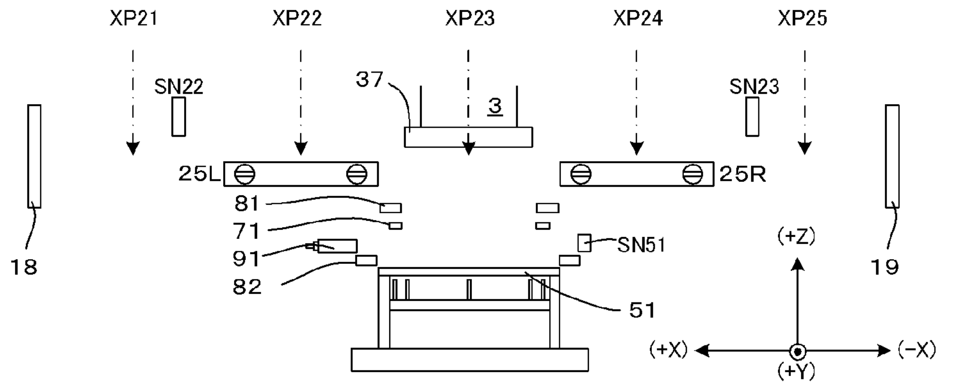

(b)

| STEP | SUB STEP | CONTROL TARGET | OPERATION CONTENTS |
|---|---|---|---|
| S1 | 1−1 | PRINTING PLATE SHUTTLE 25L | MOVE TO PRINTING PLATE TRANSFER POSITION XP21 |
| | 1−2 | PRINTING PLATE SHUTTLE 25L | ROTATION OF HAND (ORIGINAL POSITION) |
| | 1−3 | PRINTING PLATE SHUTTER 18 | OPEN |
| | 1−4 | PRINTING PLATE LOADING/ UNLOADING UNIT | LOAD PRINTING PLATE PP |
| | 1−5 | PRINTING PLATE SHUTTER 18 | CLOSE |
| | 1−6 | THICKNESS MEASUREMENT SENSOR SN22 | MEASURE THICKNESS OF PRINTING PLATE PP |
| | 1−7 | PRINTING PLATE SHUTTLE 25L | MOVE TO MIDDLE POSITION XP22 |
| S2 | 2−1 | SUBSTRATE SHUTTLE 25R | MOVE TO SUBSTRATE TRANSFER POSITION XP25 |
| | 2−2 | SUBSTRATE SHUTTER 19 | OPEN |
| | 2−3 | SUBSTRATE LOADING/ UNLOADING UNIT | LOAD SUBSTRATE SB |
| | 2−4 | SUBSTRATE SHUTTER 19 | CLOSE |
| | 2−5 | THICKNESS MEASUREMENT SENSOR SN23 | MEASURE THICKNESS OF SUBSTRATE SB |
| | 2−6 | SUBSTRATE SHUTTLE 25R | MOVE TO MIDDLE POSITION XP24 |

(c)

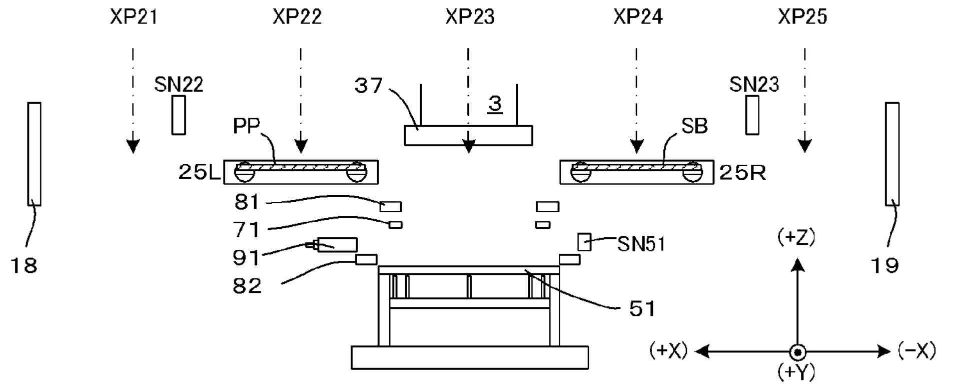

FIG. 14

(a)

| STEP | SUB STEP | CONTROL TARGET | OPERATION CONTENTS |
|---|---|---|---|
| S3 | 3−1 | PRINTING PLATE SHUTTLE 25L | MOVE TO PRINTING PLATE SUCTION POSITION XP23 |
| | 3−2 | PRINTING PLATE SHUTTLE 25L | MOVE DOWNWARD TO PRE-ALIGNMENT POSITION |
| | 3−3 | PRE-ALIGNMENT UPPER PART 81 | PRE-ALIGNMENT OF PRINTING PLATE PP |
| | 3−4 | UPPER STAGE UNIT 3 | MOVING DOWNWARD OF SUCTION PLATE 37 → SUCTION OF PRINTING PLATE PP |
| | 3−5 | UPPER STAGE UNIT 3 | ELEVATION OF SUCTION PLATE 37 |
| | 3−6 | PRINTING PLATE SHUTTLE 25L | MOVE UPWARD TO TRANSFER POSITION |
| | 3−7 | PRINTING PLATE SHUTTLE 25L | MOVE TO MIDDLE POSITION XP22 |
| S4 | 4−1 | ALIGNMENT STAGE 44 | MOVE TO INITIAL POSITION |
| | 4−2 | LIFT PIN UNIT 55 | ELEVATION OF LIFT PIN |
| | 4−3 | BLANKET SHUTTER | OPEN |
| | 4−4 | (CONVEYANCE ROBOT) | LOAD BLANKET BL |
| | 4−5 | BLANKET SHUTTER | CLOSE |
| | 4−6 | LIFT PIN UNIT 55 | MOVING DOWNWARD OF LIFT PIN |
| | 4−7 | PRE-ALIGNMENT LOWER PART 82 | PRE-ALIGNMENT OF BLANKET BL |
| | 4−8 | LOWER STAGE UNIT 5 | SUCTION OF BLANKET BL |
| | 4−9 | PRE-ALIGNMENT LOWER PART 82 | RETRACTION OF LOWER GUIDE |

(b)

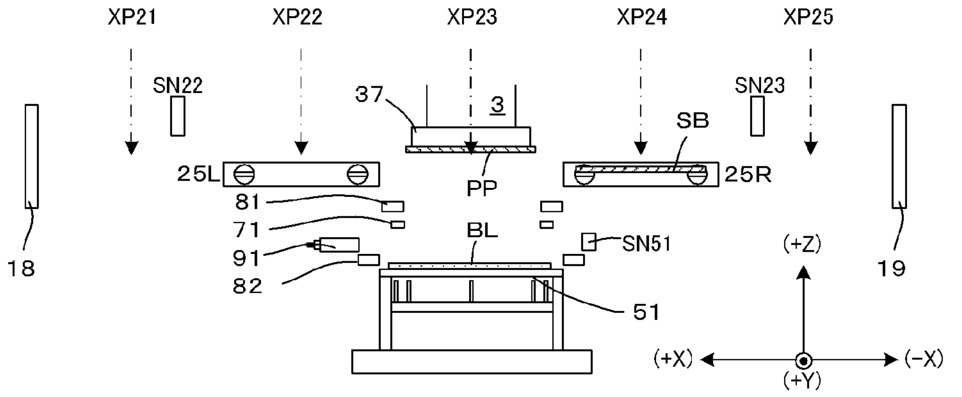

F I G. 1 5

(a)

| STEP | SUB STEP | CONTROL TARGET | OPERATION CONTENTS |
|---|---|---|---|
| S5 | 5−1 | BLANKET THICKNESS MEASUREMENT PART 56 | MOVE OF SENSOR SN51 TOWARD BLANKET BL SIDE |
| | 5−2 | BLANKET THICKNESS MEASUREMENT PART 56 | MEASURE THICKNESS OF BLANKET BL |
| | 5−3 | BLANKET THICKNESS MEASUREMENT PART 56 | MOVE OF SENSOR SN51 TO RETRACT POSITION |
| | 5−4 | UPPER STAGE UNIT 3 | MOVING DOWN/POSITIONING OF SUCTION PLATE 37 |
| | 5−5 | PRESSING UNIT 7 | MOVING DOWNWARD OF PRESSING MEMBER 71 |
| | 5−6 | LOWER STAGE UNIT 5 | RISING OF BLANKET BL |

(b)

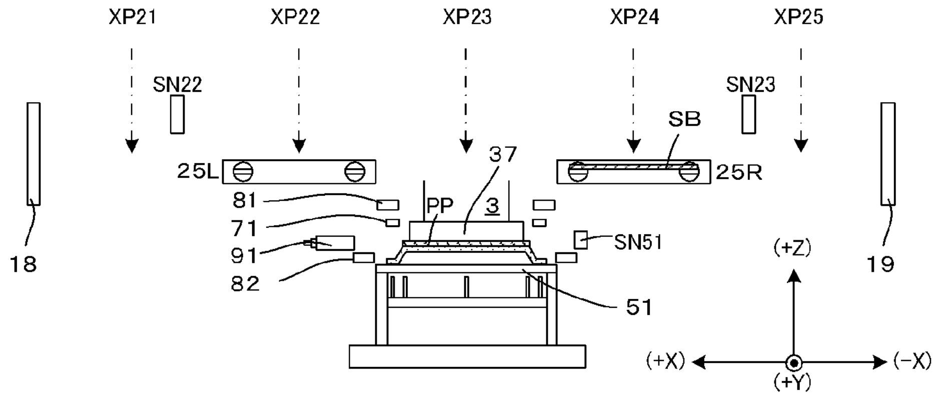

(c)

| STEP | SUB STEP | CONTROL TARGET | OPERATION CONTENTS |
|---|---|---|---|
| S6 | 6−1 | UPPER STAGE UNIT 3 | SEPARATION PROCESS BY ELEVATION OF SUCTION PLATE 37 |
| | 6−2 | UPPER STAGE UNIT 3 | POSITIONING OF SUCTION PLATE 37 TO STATIC ELIMINATION POSITION |
| | 6−3 | PRESSING UNIT 7 | ELEVATION OF PRESSING MEMBER 71 |
| | 6−4 | IONIZER 91 | ELIMINATION OF ELECTRICITY |
| | 6−5 | UPPER STAGE UNIT 3 | ELEVATION OF SUCTION PLATE 37 |

(d)

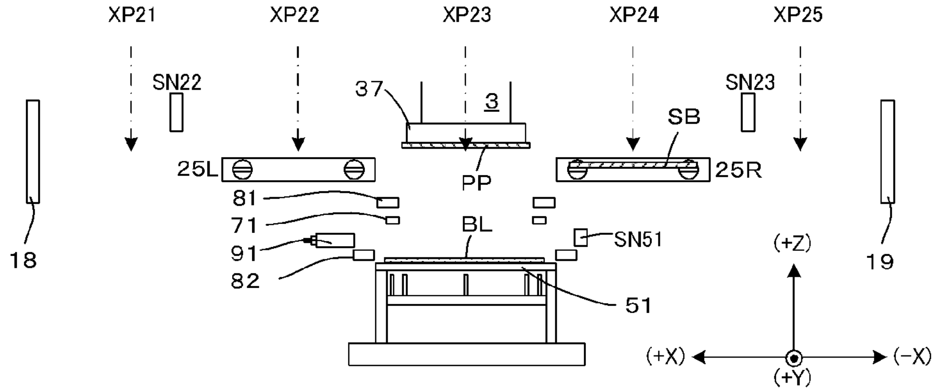

FIG. 16

(a)

| STEP | SUB STEP | CONTROL TARGET | OPERATION CONTENTS |
|---|---|---|---|
| S7 | 7−1 | PRINTING PLATE SHUTTLE 25L | ROTATION OF HAND (OPPOSITE POSITION) |
| | 7−2 | PRINTING PLATE SHUTTLE 25L | MOVE TO PRINTING PLATE SUCTION POSITION XP23 |
| | 7−3 | UPPER STAGE UNIT 3 | MOVING DOWNWARD OF SUCTION PLATE 37 → RELEASE SUCTION OF PRINTING PLATE PP |
| | 7−4 | UPPER STAGE UNIT 3 | ELEVATION OF SUCTION PLATE 37 |
| | 7−5 | PRINTING PLATE SHUTTLE 25L | MOVE TO MIDDLE POSITION XP22 |
| S8 | 8−1 | SUBSTRATE SHUTTLE 25R | MOVE TO SUBSTRATE SUCTION POSITION XP23 |
| | 8−2 | SUBSTRATE SHUTTLE 25R | MOVE DOWNWARD TO PRE-ALIGNMENT POSITION |
| | 8−3 | PRE-ALIGNMENT UPPER PART 81 | PRE-ALIGNMENT OF SUBSTRATE SB |
| | 8−4 | UPPER STAGE UNIT 3 | MOVING DOWNWARD OF SUCTION PLATE 37 → SUCTION OF SUBSTRATE SB |
| | 8−5 | UPPER STAGE UNIT 3 | ELEVATION OF SUCTION PLATE 37 |
| | 8−6 | SUBSTRATE SHUTTLE 25R | MOVE UPWARD TO TRANSFER POSITION |
| | 8−7 | SUBSTRATE SHUTTLE 25R | MOVE TO MIDDLE POSITION XP24 |

(b)

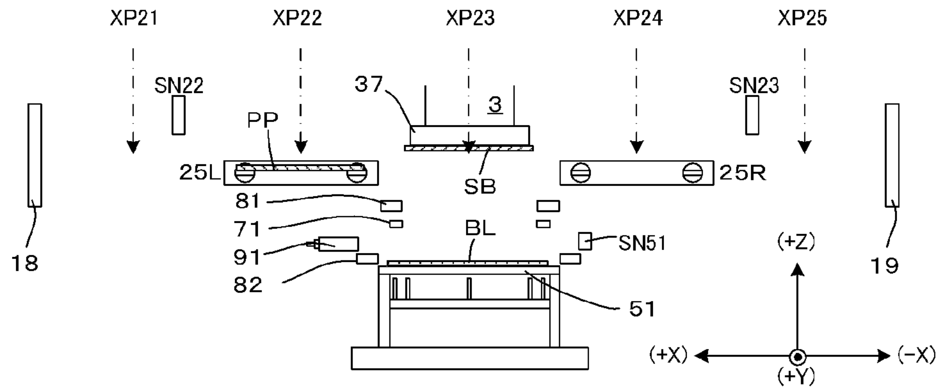

FIG. 17

(a)

| STEP | SUB STEP | CONTROL TARGET | OPERATION CONTENTS |
|---|---|---|---|
| S9 | 9-1 | BLANKET THICKNESS MEASUREMENT UNIT 56 | MOVE OF SENSOR SN51 TOWARD BLANKET BL SIDE |
| | 9-2 | BLANKET THICKNESS MEASUREMENT UNIT 56 | MEASURE THICKNESS OF BLANKET BL |
| | 9-3 | BLANKET THICKNESS MEASUREMENT UNIT 56 | MOVE OF SENSOR SN51 TO RETRACT POSITION |
| | 9-4 | UPPER STAGE UNIT 3 | MOVING DOWN/POSITIONING OF SUCTION PLATE 37 |
| | 9-5 | PRESSING UNIT 7 | MOVING DOWNWARD OF PRESSING MEMBER 71 |
| | 9-6 | ALIGNMENT PART 4 | FOCUS ADJUSTMENT TO BLANKET BL |
| | 9-7 | ALIGNMENT PART 4 | OBTAIN IMAGE |
| | 9-8 | ALIGNMENT PART 4 | PRECISE ALIGNMENT |
| | 9-9 | LOWER STAGE UNIT 5 | RISING OF BLANKET BL |

(b)

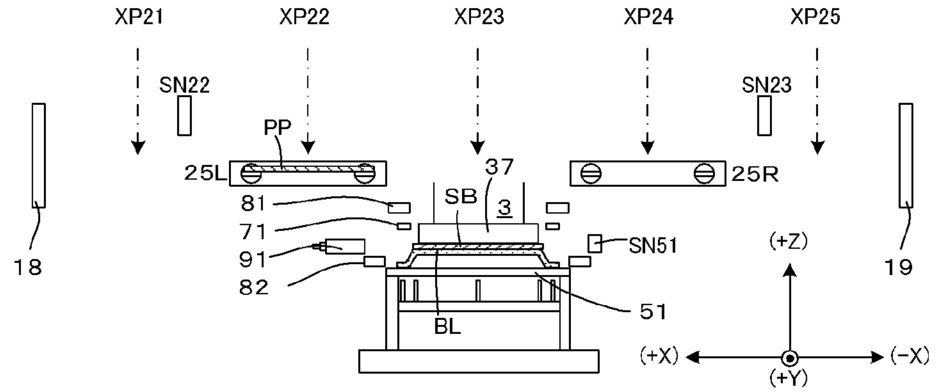

(a)

| STEP | SUB STEP | CONTROL TARGET | OPERATION CONTENTS |
|---|---|---|---|
| S10 | 10−1 | UPPER STAGE UNIT 3 | SEPARATION PROCESS BY ELEVATION OF SUCTION PLATE 37 |
| | 10−2 | UPPER STAGE UNIT 3 | POSITIONING OF SUCTION PLATE 37 TO STATIC ELIMINATION POSITION |
| | 10−3 | PRESSING UNIT 7 | ELEVATION OF PRESSING MEMBER 71 |
| | 10−4 | IONIZER 91 | ELIMINATION OF ELECTRICITY |
| | 10−5 | UPPER STAGE UNIT 3 | ELEVATION OF SUCTION PLATE 37 |

FIG. 19

(a)

| STEP | SUB STEP | CONTROL TARGET | OPERATION CONTENTS |
|---|---|---|---|
| S11 | 11−1 | SUBSTRATE SHUTTLE 25R | MOVE TO SUBSTRATE SUCTION POSITION XP23 |
| | 11−2 | UPPER STAGE UNIT 3 | MOVING DOWN OF SUCTION PLATE 37 → RELEASE SUCTION OF SUBSTRATE SB |
| | 11−3 | UPPER STAGE UNIT 3 | ELEVATION OF SUCTION PLATE 37 |
| | 11−4 | SUBSTRATE SHUTTLE 25R | MOVE TO MIDDLE POSITION XP24 |
| S12 | 12−1 | LOWER STAGE UNIT 5 | RELEASE SUCTION OF BLANKET BL |
| | 12−2 | LIFT PIN UNIT 55 | ELEVATION OF LIFT PIN |
| | 12−3 | BLANKET SHUTTER | OPEN |
| | 12−4 | (CONVEYANCE ROBOT) | RETRACT BLANKET BL |
| | 12−5 | BLANKET SHUTTER | CLOSE |
| | 12−6 | LIFT PIN UNIT 55 | MOVING DOWN OF LIFT PIN |
| S13 | 13−1 | PRINTING PLATE SHUTTLE 25L | MOVE TO PRINTING PLATE TRANSFER POSITION XP21 |
| | 13−2 | PRINTING PLATE SHUTTER 18 | OPEN |
| | 13−3 | PRINTING PLATE LOADING/UNLOADING UNIT | UNLOAD PRINTING PLATE |
| | 13−4 | PRINTING PLATE SHUTTER 18 | CLOSE |
| | 13−5 | PRINTING PLATE SHUTTLE 25L | MOVE TO MIDDLE POSITION XP22 |
| S14 | 14−1 | SUBSTRATE SHUTTLE 25R | MOVE TO SUBSTRATE TRANSFER POSITION XP25 |
| | 14−2 | SUBSTRATE SHUTTER 19 | OPEN |
| | 14−3 | SUBSTRATE LOADING/UNLOADING UNIT | UNLOAD SUBSTRATE |
| | 14−4 | SUBSTRATE SHUTTER 19 | CLOSE |
| | 14−5 | SUBSTRATE SHUTTLE 25R | MOVE TO MIDDLE POSITION XP24 |

(b)

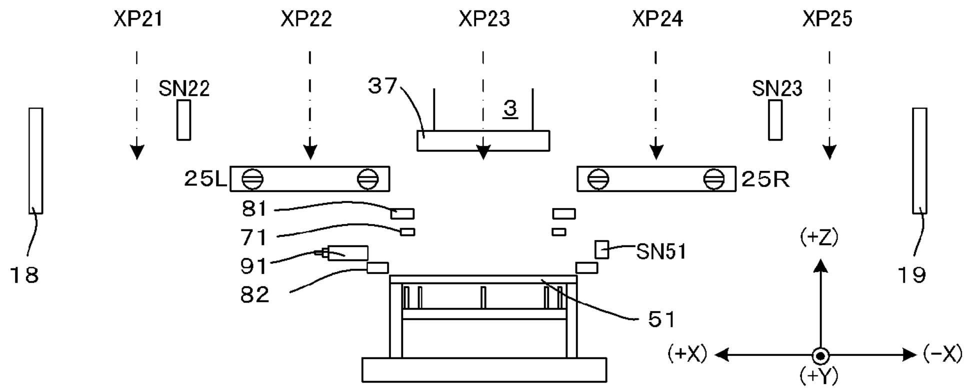

ALIGNMENT METHOD, TRANSFER METHOD AND TRANSFER APPARATUS

CROSS REFERENCE TO RELATED APPLICATION

The disclosure of Japanese Patent Applications enumerated below including specifications, drawings and claims is incorporated herein by reference in its entirety:
No. 2011-261821 filed on Nov. 30, 2011; and
No. 2011-261822 filed on Nov. 30, 2011.

BACKGROUND OF THE INVENTION

1. Field of the Invention

This invention relates to an alignment technology for aligning two substrates by arranging them opposite to each other and a transfer technology for transferring a pattern or a thin film as a transfer material carried on one substrate to a predetermined position of the other substrate.

2. Description of the Related Art

As an alignment technology for superposing two substrates, for example, a technology disclosed in patent literature JP2004-151653A is known. In this technology, an alignment mark is formed on a surface of each of the two substrates to be bonded, and an alignment process is performed based on images imaged by an imager (e.g. CCD camera). Specifically, by arranging the both substrates such that the alignment mark formed surfaces face each other, a distance between the alignment marks is set to be equal to or shorter than the depth of field of the imager, whereby imaging is performed in a state where the both alignment marks are in focus. Relative positions between the substrates are adjusted based on a positional relationship of the both alignment marks detected from the imaged image.

Such an alignment technology is also applicable to a pattern forming method for forming a predetermined pattern on another substrate by transferring a pattern carried on one substrate to the other substrate. That is, the pattern can be formed at an appropriate position on the other substrate by aligning the one substrate carrying the pattern and the other substrate, to which the pattern is to be transferred, with high accuracy.

Further improvement in alignment accuracy is desired in such a technology. It is thought as one effective method to increase the magnification of an image to be imaged. However, since a depth of field is generally reduced if the magnification of an imaging optical system of an imager is increased, both substrates need to be brought closer to each other in the above conventional technology based on the premise that imaging is performed in a state where the both alignment marks are in focus. However, there is an appropriate range for the distance between the substrates in consideration of dimensional variations, deflection and the like of the substrates and a mechanism for holding them. Thus, the both alignment marks may not be able to be arranged within the range of the depth of field shortened by increasing the magnification. The above conventional technology cannot deal with such a case.

It is thought as another method to individually image two alignment marks by successively focusing the imager on these alignment marks. However, the above conventional technology cannot deal with such a case. Further, a detection error resulting from a variation of an optical axis by a focusing operation may rather reduce alignment accuracy.

SUMMARY OF THE INVENTION

As described above, a technology enabling a highly accurate alignment process in a state where alignment marks respectively formed on two substrates cannot be simultaneously brought into focus has not been established yet.

This invention was developed in view of the above problem and aims to provide a technology capable of aligning two substrates with high accuracy even if it is not possible to simultaneously bring both alignment marks formed on the respective substrates into focus in an alignment technology for aligning the two substrates with respect to each other by arranging them opposite to each other and a transfer technology for transferring a pattern or the like using the alignment technology.

An alignment method for arranging a first substrate and a second substrate opposite to each other and adjusting a mutual positional relationship according to an aspect of the invention comprises: a holding step of proximately holding the first substrate formed with a first alignment mark on a surface and the second substrate formed with a second alignment mark on a surface with the respective alignment mark formed surfaces facing each other; an imaging step of imaging the first alignment mark and the second alignment mark within a same field of view of an imager via the second substrate from a side opposite to the alignment mark formed surface of the second substrate; a position detecting step of detecting positions of the first alignment mark and the second alignment mark based on an image obtained by imaging; and an aligning step of adjusting relative positions of the first substrate and the second substrate based on a detection result in the position detecting step, wherein the imaging step is performed in a state where a distance in an optical axis direction of the imager between the alignment mark formed surface of the first substrate and that of the second substrate is longer than the depth of field of the imager and the imager is focused on the alignment mark formed surface of the second substrate; and in the position detecting step, a filtering process of removing high spatial frequency components from the image is performed and a center of gravity position of the first alignment mark is detected from the image after filtering.

In the invention thus configured, the both alignment marks are not be simultaneously brought into focus in one image since the distance between the first and second alignment marks in the optical axis direction of the imager is longer than the depth of field of the imager. Accordingly, the imager is focused on the second alignment mark located at a position closer to the imager. This causes the second alignment mark to be imaged with high image contrast. Thus, the position of the second alignment mark in the image can be detected by various conventionally known methods, e.g. an image processing associated with edge extraction.

On the other hand, an image of the first alignment mark located behind the range of the depth of field has low image contrast and is blurred since this image is out of focus. That is, out of spatial frequency components of the first alignment mark, particularly high frequency components are lost in the imaged image. Thus, position detection, for example, by edge extraction cannot achieve sufficient accuracy. Accordingly, in this invention, the position of the first alignment mark is detected by removing high spatial frequency components from the image and detecting the center of gravity position of the first alignment mark from remaining low frequency components. If a pattern element shape of the first alignment mark is appropriately set, the center of gravity position can be detected with high accuracy even in a state where the high frequency components are lost.

Then, a relative positional relationship between the first and second substrates is grasped from the thus obtained positional relationship between the first and second alignment marks in the image and relative positions of the first and second substrates are adjusted. As just described, according to the invention, the first and second substrates can be aligned with high accuracy without requiring that both the first and second alignment marks are located within the depth of field of the imager.

A transfer method for transferring a pattern or a thin film as a transfer material carried on a transparent carrier to a predetermined position of a substrate according to another aspect of the invention comprises: a holding step of proximately holding the substrate formed with a first alignment mark on a surface and the carrier formed with the transfer material and a second alignment mark on a surface with the respective alignment mark formed surfaces facing each other; an imaging step of imaging the first alignment mark and the second alignment mark within a same field of view of an imager via the carrier from a side opposite to the alignment mark formed surface of the carrier; a position detecting step of detecting positions of the first alignment mark and the second alignment mark based on an image obtained by imaging; an aligning step of adjusting relative positions of the substrate and the carrier based on a detection result in the position detecting step; and a transferring step of transferring the transfer material on the surface of the carrier to the substrate by bringing the substrate and the carrier, the relative positions of which are adjusted, into contact, wherein the imaging step is performed in a state where a distance in an optical axis direction of the imager between the alignment mark formed surface of the substrate and the alignment mark formed surface of the carrier held proximate to each other is longer than the depth of field of the imager and the imager is focused on the alignment mark formed surface of the carrier; and in the position detecting step, a filtering process of removing high spatial frequency components from the image is performed and a center of gravity position of the first alignment mark is detected from the image after filtering.

In this invention, the same way of thinking as the alignment method described above is applied to a position adjustment between the substrate and the carrier. The relationship between the "substrate" and the "carrier" in this invention corresponds to the relationship between the "first substrate" and the "second substrate" of the invention relating to the above alignment method. Thus, according to this invention, the carrier and the substrate are brought into contact while being aligned with high accuracy as described above and the transfer material is transferred from the carrier to the substrate, wherefore the transfer material can be accurately transferred to a predetermined position on the surface of the substrate.

A transfer apparatus for transferring a pattern or a thin film as a transfer material to a substrate according to the other aspect of the invention comprises: a holder that proximately holds the substrate formed with a first alignment mark on a surface and a carrier carrying the transfer material to be transferred to the substrate and a second alignment mark on a surface with the respective alignment mark formed surfaces facing each other; an imager that images the first alignment mark and the second alignment mark within a same field of view via the carrier from a side opposite to the alignment mark formed surface of the carrier; a position detector that detects positions of the first alignment mark and the second alignment mark based on an image imaged by the imager; and an aligner that adjusts relative positions of the substrate and the carrier based on a detection result of the position detector; wherein a distance in an optical axis direction of the imager between the alignment mark formed surface of the substrate and the alignment mark formed surface of the carrier held proximate to each other by the holder is longer than the depth of field of the imager, the imager performs imaging in a state where the alignment mark formed surface of the carrier is in focus and the position detector performs a filtering process of removing high spatial frequency components from the image and detects a center of gravity position of the first alignment mark from the image after filtering.

In this invention, similar to the invention relating to the transfer method described above, the relative positional relationship between the substrate and the carrier is grasped from the positional relationship between the first and second alignment marks in the image, and the relative positions of the substrate and the carrier are adjusted by the aligner. Thus, according to the invention, the substrate and the carrier can be aligned with high accuracy without requiring that both the first and second alignment marks are located within the depth of field of the imager. After alignment is performed in this way, the transfer material is transferred from the carrier to the substrate, whereby the pattern or the thin film can be formed at a predetermined position on the substrate with excellent positional accuracy.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 13 to 19 are charts showing the operation of the printing apparatus of FIG. 1;

DETAILED DESCRIPTION OF THE PREFERRED EMBODIMENTS

Here, after the overall configuration of a printing apparatus as one embodiment of a transfer apparatus according to the invention is first described, the configuration and operation of each unit of the apparatus are described in detail. Although this embodiment relates to a transfer apparatus for forming a predetermined pattern on a substrate surface by transfer, this apparatus is referred to as a "printing apparatus" in this specification since a process for patterning a predetermined pattern on a blanket BL using a printing plate PP and transferring this to a substrate SB as in a printing technology is adopted as described below.

A. Overall Configuration of Apparatus

Figure 1:
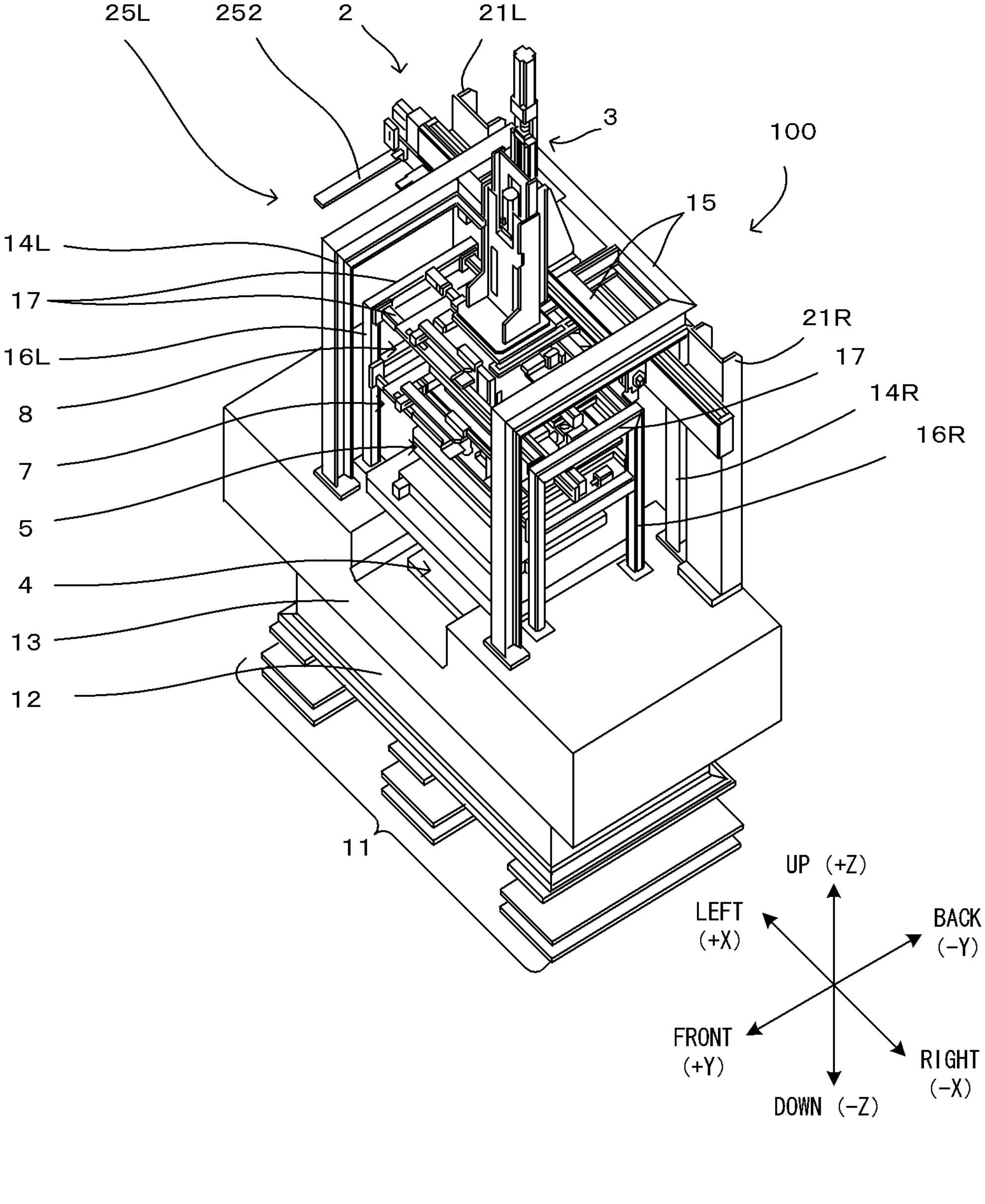
FIG. 1 is a perspective view showing a printing apparatus equipped with an embodiment of a pattern forming apparatus according to the invention.
Figure 2:
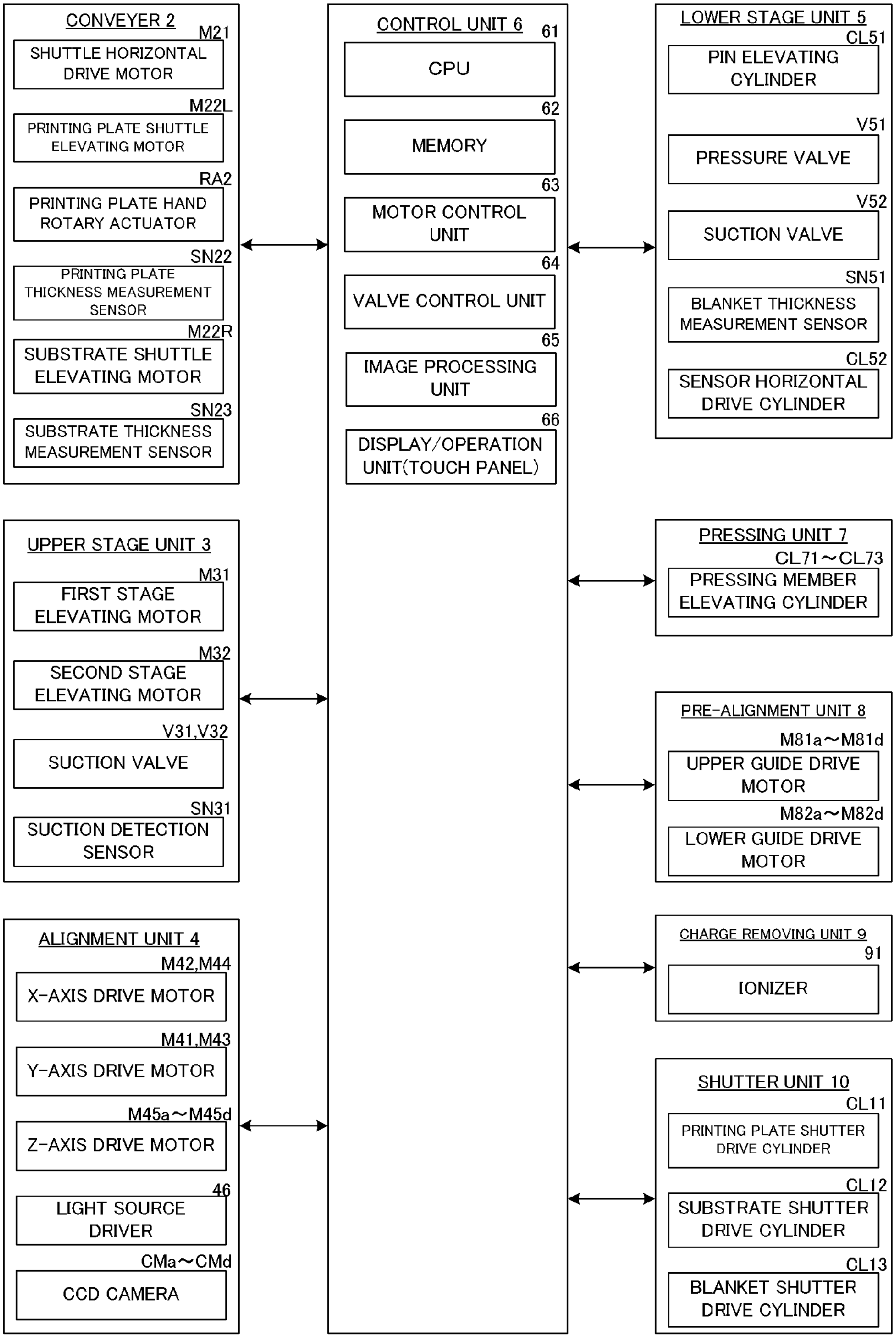
FIG. 2 is a block diagram showing the electrical configuration of the apparatus of FIG. 1.

FIG. 1 is a perspective view showing a printing apparatus equipped with an embodiment of a pattern forming apparatus according to the invention. In order to clearly show the internal configuration of the apparatus, FIG. 1 illustrates a state where apparatus covers are removed. FIG. 2 is a block diagram showing the electrical configuration of the apparatus of FIG. 1. A blanket is loaded from the front side of the printing apparatus 100 while a printing plate is loaded from the left side thereof. In the apparatus 100, the upper surface of the blanket is brought into close contact with the lower surface of a printing plate, and then the blanket is separated. Therefore, an application layer on the blanket is patterned by a pattern formed on the lower surface of the printing plate to form a pattern layer (patterning process). Further, a substrate is loaded into the apparatus 100 from the right side thereof. After the patterned upper surface of the blanket is brought into close contact with the lower surface of the substrate, the blanket is separated. Therefore, the pattern layer formed on the blanket is transferred to the lower surface of the substrate (transfer process). Note that, in FIG. 1 and each Figure described later, conveying directions of the printing plate and the substrate are referred to as "X directions" to clarify an arrangement relationship of the respective units of the apparatus 100. Furthermore, a horizontal direction from the right side toward the left side in FIG. 1 is referred to as a "+X direction" and an opposite direction is referred to as a "−X direction". Out of horizontal directions perpendicular to the X directions, a direction toward the front side of the apparatus 100 is referred to as a "+Y direction" and a direction toward the rear side of the apparatus 100 is referred to as a "−Y direction". A vertically upward direction and a vertically downward direction are respectively referred to as a "+Z direction" and a "−Z direction".

In the printing apparatus 100, a main body base 12 is placed on a spring-type vibration isolation table 11 and a stone plate 13 is further mounted on the main body base 12. Further, two arched frames 14L, 14R stand in the center of the upper surface of the stone plate 13 while being spaced apart in the X direction. Two horizontal plates 15 are coupled to upper end portions of these arched frames 14L, 14R at a (−Y) side to form a first frame structure. Further, a second frame structure is provided on the upper surface of the stone plate 13 to be covered by the first frame structure. More specifically, as shown in FIG. 1, arched frames 16L, 16R smaller than the frames 14L, 14R stand on the stone plate 13 at positions right below the respective arched frames 14L, 14R. A plurality of horizontal plates 17 extending in the X direction connect column parts of the respective frames 16L, 16R and a plurality of horizontal plates 17 extending in the Y direction connect the frames 16L, 16R.

Between the thus configured frame structures, conveyance spaces are formed between beam parts of the frames 14L, 16L and between beam parts of the frames 14R, 16R. The printing plate and the substrate can be conveyed via these conveyance spaces while being held in a horizontal posture. A conveyance unit 2 is provided behind the second frame structure, i.e. at the (−Y) side and the printing plate and the substrate can be conveyed in the X direction.

An upper stage unit 3 is fixed to the horizontal plate 15 forming the first frame structure and can suck and hold the upper surfaces of the printing plate and the substrate conveyed by the conveyance unit 2. That is, after the printing plate is conveyed to a position right below the upper stage unit 3 via the conveyance space from the left side of FIG. 1 by a printing plate shuttle of the conveyance unit 2, a suction plate of the upper stage unit 3 is lowered to hold the substrate by suction. Conversely, when the suction plate of the upper stage unit 3 releases suction after the substrate is sucked with the printing plate shuttle located at the position right below the upper stage unit 3, the printing plate is transferred to the conveyance unit 2. In this way, the printing plate is transferred between the conveyance unit 2 and the upper stage unit 3.

Further, the substrate is also held by the upper stage unit 3 similarly to the printing plate. That is, after the substrate is conveyed to the position right below the upper stage unit 3 via the conveyance space from the right side of FIG. 1 by a substrate shuttle of the conveyance unit 2, the suction plate of the upper stage unit 3 is lowered to hold the substrate by suction. Conversely, when the suction plate of the upper stage unit 3 releases suction after the substrate is sucked with the substrate shuttle located at the position right below the upper stage unit 3, the substrate is transferred to the conveyance unit 2. In this way, the substrate is transferred between the conveyance unit 2 and the upper stage unit 3.

Below the upper stage unit 3 in the vertical direction (hereinafter, referred to as "vertically below" or "(−Z) direction"), an alignment unit 4 is arranged on the upper surface of the stone plate 13. A lower stage unit 5 is placed on an alignment stage of the alignment unit 4 and the upper surface of the lower stage unit 5 faces the suction plate of the upper stage unit 3. The upper surface of the lower stage unit 5 can hold a blanket by suction, and the blanket on the lower stage unit 5 can be positioned with high accuracy by a control unit 6 controlling the alignment stage.

As just described, the upper stage unit 3 and the lower stage unit 5 are arranged to face each other in the vertical direction Z. Between them, a pressing unit 7 for pressing the blanket placed on the lower stage unit 5 from above and a pre-alignment unit 8 for pre-aligning the printing plate, the substrate and the blanket are respectively arranged and fixed to the second frame structure.

The pre-alignment unit 8 includes a pre-alignment upper part and a pre-alignment lower part that are arranged in two levels in the vertical direction Z. The pre-alignment upper part accesses to the printing plate held by the printing plate shuttle positioned at the position right below the suction plate of the upper stage unit 3 and positions the printing plate on the printing plate shuttle (printing plate pre-alignment process). Further, the pre-alignment upper part accesses to a substrate SB held by the substrate shuttle positioned at the position right below the suction plate and positions the substrate on the substrate shuttle (substrate pre-alignment process). The pre-alignment lower part accesses to the blanket placed on a suction plate of the lower stage unit 5 and positions the blanket on the suction plate (blanket pre-alignment process).

To precisely transfer a pattern layer on the blanket to the substrate, a precise alignment process is necessary besides the substrate pre-alignment process. Thus, the alignment unit 4 includes four CCD (Charge Coupled Device) cameras CMa to CMd and can read alignment marks formed on each of the substrate held by the upper stage unit 3 and the blanket held by the lower stage unit 5 by the respective CCD cameras CMa to CMd. Then, the control unit 6 controls the alignment stage based on images read by the CCD cameras CMa to CMd, whereby the blanket sucked by the lower stage unit 5 can be precisely positioned with respect to the substrate held by the upper stage unit 3.

After the pattern layer on the blanket is transferred to the substrate, the blanket is separated from the substrate. In that separation stage, static electricity is generated. Static electricity is produced also when the blanket is separated from the printing plate after the application layer on the blanket is patterned by the printing plate. Accordingly, a static eliminator 9 is provided to eliminate static electricity. The static eliminator 9 includes an ionizer 91 for irradiating ions toward a space between the upper stage unit 3 and the lower stage unit 5 from the left side of the first frame structure, i.e. from the (+X) side.

Note that, although not shown in FIG. 1, a (+X) side cover out of the apparatus covers is provided with an opening used to load and unload the printing plate and a printing plate shutter (18 in FIG. 13 to be described later) for opening and closing the opening for the printing plate. A valve control unit 64 of the control unit 6 switches the opening and closing of a valve connected to a printing plate shutter drive cylinder CL11, thereby actuating the printing plate shutter drive cylinder CL11 to drivingly open and close the printing plate shutter. Note that, pressurized air is used as a drive source for driving the cylinder CL11 and a factory's utility is used as its positive pressure supply source. The apparatus 100 may be equipped with an air supply unit and the cylinder CL11 may be driven by the air supply unit. This point equally applies also to cylinders to be described later.

Further, a (−X) side cover and a (+Y) side cover are respectively formed with openings for loading and unloading the substrate and the blanket, and a substrate shutter (19 in FIG. 13 to be described later) and a blanket shutter (not shown) are respectively provided for the substrate opening and the blanket opening. By opening and closing valves by the valve control unit 64, a substrate shutter drive cylinder CL12 and a blanket shutter drive cylinder CL13 are respectively driven to open and close the shutters.

As just described, a shutter unit 10 is formed by three shutters and three shutter drive cylinders CL11 to CL 13, and the printing plate, the substrate and the blanket can be respectively independently loaded into and unloaded from the printing apparatus 100. Note that, although not shown in FIG. 1, a printing plate loading/unloading unit for loading and unloading the printing plate is juxtaposed at the left side of the apparatus 100 and a substrate loading/unloading unit for loading and unloading the substrate is juxtaposed at the right side of the apparatus 100 in this embodiment. Alternatively, a conveyance robot (not shown) for conveying the printing plate may directly access to the printing plate shuttle of the conveyance unit 2 and load and unload the printing plate. In the case, the installation of the printing plate loading/unloading unit is not necessary. This point equally applies to the substrate side. That is, a conveyance robot (not shown) for conveying the substrate may directly access to the substrate shuttle of the conveyance unit 2 and load and unload the substrate, whereby the installation of the substrate loading/unloading unit is not necessary.

On the other hand, in this embodiment, a conveyance robot for conveying the blanket is used to load and unload the blanket. That is, the conveyance robot accesses to the lower stage unit 5 to directly load the blanket before the process and receive and unload the blanket after the use. Of course, it goes without saying that a dedicated loading/unloading unit may be arranged at the front side of the apparatus as for the printing plate and the substrate.

B. Configuration of Each Unit of Apparatus

B-1. Conveyance Unit 2

Figure 3:
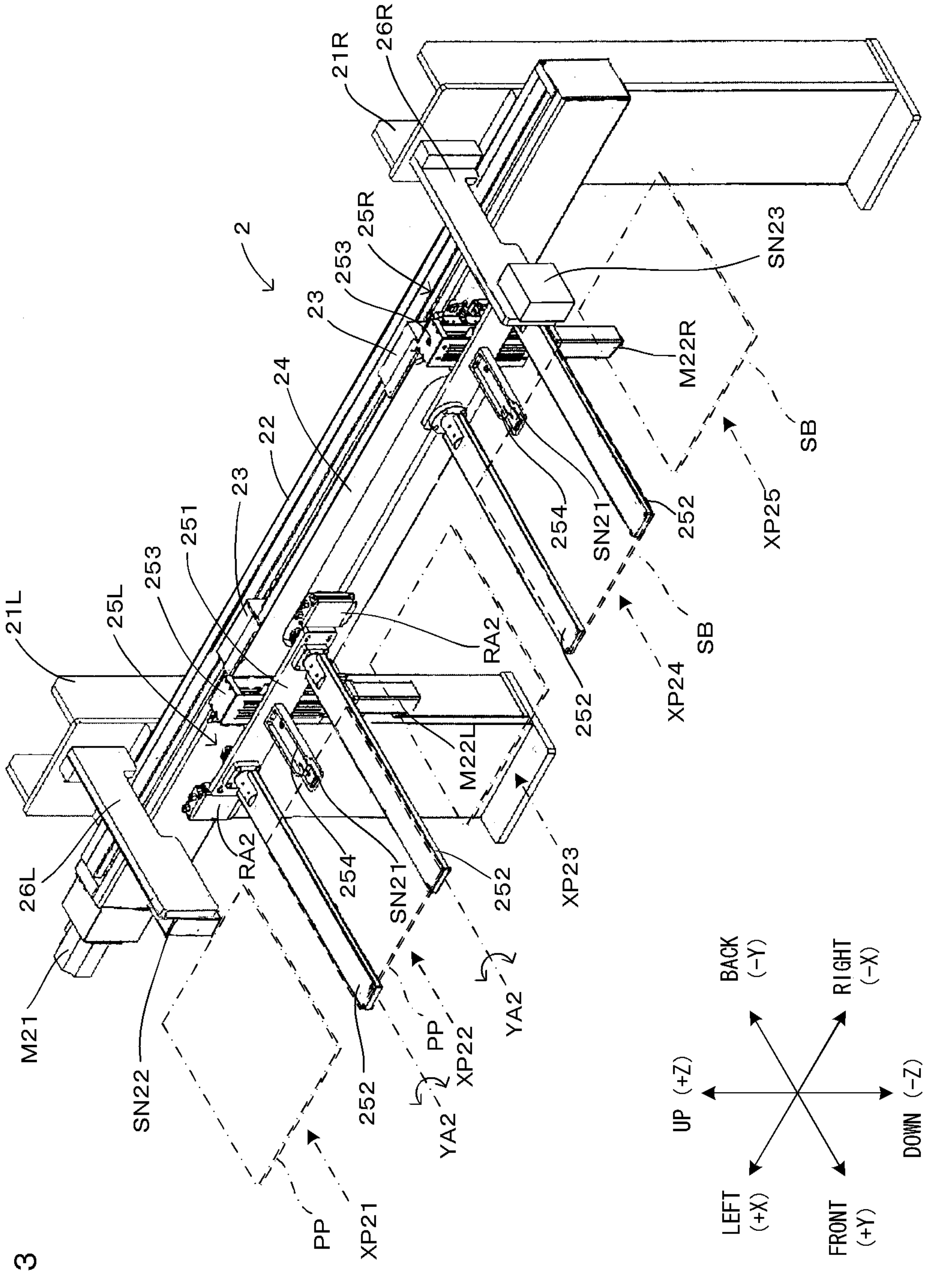
FIG. 3 is a perspective view showing the conveyance unit equipped in the printing apparatus of FIG. 1.

FIG. 3 is a perspective view showing the conveyance unit equipped in the printing apparatus of FIG. 1. The conveyance unit 2 includes two brackets 21L, 21R extending in the vertical direction Z. As shown in FIG. 1, the bracket 21L stands on the upper surface of the stone plate 13 adjacent to and to the left of a rear column part of the left frame 14L, and the bracket 21T stands on the upper surface of the stone plate 13 adjacent to and to the right of a rear column part of the right frame 14R. As shown in FIG. 3, a ball screw mechanism 22 extends in a lateral direction, i.e. in the X direction to couple upper end portions of these brackets 21L, 21R to each other. In the ball screw mechanism 22, a ball screw (not shown) extends in the X direction and a rotary shaft (not shown) of a shuttle horizontal drive motor M21 for horizontally driving shuttles is coupled to one end thereof. Two ball screw brackets 23, 23 are threadably engaged with a central portion of the ball screw. A shuttle holding plate 24 extending in the X direction is mounted on side surfaces of these ball screw brackets 23, 23 facing toward the (+Y) side.

A printing plate shuttle 25L is provided on a (+X) side end portion of the shuttle holding plate 24 to be movable upward and downward in the vertical direction Z, whereas a substrate shuttle 25R is provided on a (−X) side end portion to be movable upward and downward in the vertical direction Z. Since these shuttles 25L, 25R have the same configuration except for a hand rotation mechanism, the configuration of the printing plate shuttle 25L is described and that of the substrate shuttle 25R is denoted by the same or equivalent reference signs and not described here.

The shuttle 25L includes an elevating plate 251 and two printing plate hands 252, 252. The elevating plate 251 extends in the X direction and has a length about equal to or slightly longer than a width size (X-direction size) of the printing plate PP. The two printing plate hands 252, 252 respectively extend forward, i.e. toward the (+Y) side from an (+X) side end portion and a (−X) side end portion of the elevating plate 251. The elevating plate 251 is mounted on an (+X) side end portion of the shuttle holding plate 24 via a ball screw mechanism 253 to be movable upward and downward. That is, the ball screw mechanism 253 extends in the vertical direction Z with respect to the (+X) side end portion of the shuttle holding plate 24. A rotary shaft (not shown) of a printing plate shuttle elevating motor M22L is coupled to the lower end of the ball screw mechanism 253. Further, a ball screw bracket (not shown) is threadably engaged with the ball screw mechanism 253 and the elevating plate 251 is mounted on a (+Y) side surface of the ball screw bracket. Thus, the printing plate shuttle elevating motor M22L operates in response to an operation command from a motor control unit 63 of the control unit 6, whereby the elevating plate 251 is driven to move upward and downward in the vertical direction Z.

A front-back size (Y-direction size) of the respective hands 252, 252 is longer than a length size (Y-direction size) of the printing plate PP so that the printing plate PP can be held by leading end sides (+Y sides) of the respective hands 252, 252.

To detect the holding of the printing plate PP by the printing plate hands 252, 252 in this way, a sensor bracket 254 extends toward the (+Y) side from a central portion of the elevating plate 251 and a sensor SN21 for detecting the printing plate is mounted on a leading end portion of the sensor bracket 254. Thus, when the printing plate PP is placed on the both hands 252, the sensor SN 21 detects a rear end portion, i.e. a (−Y) side end portion of the printing plate PP and outputs a detection signal to the control unit 6.

Each of the printing plate hands 252, 252 is mounted on the elevating plate 251 via a bearings (not shown) and rotatable about an axe of rotation YA2 extending in a front-back direction (Y-direction). Rotary actuators RA2, RA2 are mounted on both ends of the elevating plate 251 in the X direction. These rotary actuators RA2, RA2 operate using pressurized air as a drive source and are rotatable by the 180 degree by opening and closing a valve (not shown) inserted in a pressurized air supply path. Thus, by controlling the opening and closing of the valves using the valve control unit 64 of the control unit 6, a switch can be made between an unused posture and a used posture. The unused posture is one hand posture in which one principle surface of each printing plate hand 252 faces upward to be suited to handling the printing plate PP before patterning. The used posture is other hand posture in which the other principle surface faces upward to be suited to handling the printing plate PP after patterning. The printing plate shuttle 25L differs from the substrate shuttle 25R only in including such a hand posture switching mechanism.

Next, mount positions of the printing plate shuttle 25L and the substrate shuttle 25R with respect to the shuttle holding plate 24 are described. As shown in FIG. 3, the shuttles 25L, 25R are mounted on the shuttle holding plate 24 while being spaced apart in the X direction by a distance longer than the width sizes of the printing plate PP and the substrate SB. Note that the width sizes of the printing plate PP and the substrate SB are equal in this embodiment. When the rotary shaft of the shuttle horizontal drive motor M21 is rotated in a predetermined direction, the both shuttles 25L, 25R move in the X direction while keeping the above separation distance. For example, in FIG. 3, a position right below the upper stage unit 3 is denoted by XP23 and the shuttles 25L, 25R are located at positions XP22, XP24 respectively at the same distance (this distance is referred to as a "step movement unit") in the (+X) direction and the (−X) direction from the position XP23. Note that a state shown in FIG. 3 is referred to as a "middle position state" in this embodiment.

When the shuttle holding plate 24 is moved by the step movement unit in the (+X) direction by rotating the rotary shaft of the shuttle horizontal drive motor M21 in a predetermined direction in this middle position state, the substrate shuttle 25R is moved in the (+X) direction to the position XP23 right below the upper stage unit 3 and positioned. At this time, the printing plate shuttle 25L is also integrally moved in the (+X) direction and positioned at a position XP21 close to the printing plate loading/unloading unit.

Conversely, when the shuttle holding plate 24 is moved by the step movement unit in the (−X) direction by rotating the rotary shaft of the shuttle horizontal drive motor M21 in a direction opposite to the predetermined direction, the printing plate shuttle 25L is, in the middle position state, moved in the (−X) direction to the position XP23 right below the upper stage unit 3 and positioned. At this time, the substrate shuttle 25R is also integrally moved in the (−X) direction and positioned at a position XP25 proximate to the substrate loading/unloading unit. As just described, in this specification, five positions XP21 to XP25 are specified as shuttle positions in the X direction. That is, the printing plate transfer position XP21 is a position closest to the printing plate loading/unloading unit out of the three positions XP21 to XP23 to which the printing plate shuttle 25L is positioned. This means that the position XP21 is an X-direction position where the printing plate PP is loaded from and unloaded to the printing plate loading/unloading unit. The substrate transfer position XP25 is a position closest to the substrate loading/unloading unit out of the three positions XP23 to XP25 to which the substrate shuttle 25R is positioned. This means that the position XP25 is an X-direction position where the substrate SB is loaded from and unloaded to the substrate loading/unloading unit. Further, the position XP23 is an X-direction position where a suction plate 37 of the upper stage unit 3 moves in the vertical direction to hold the printing plate PP or the substrate SB by suction. In this specification, the X-direction position XP23 is referred to as a "printing plate suction position XP23" when the printing plate shuttle 25L is located at the position XP23, whereas the X-direction position XP23 is referred to as a "substrate suction position XP23" when the substrate shuttle 25R is located at the position XP23. Further, a position in the vertical direction Z, i.e. a height position where the printing plate PP and the substrate SB are conveyed by the shuttles 25L, 25R is referred to as a "conveyance position".

The thickness of the printing plate PP needs to be measured to accurately control a gap amount between the printing plate PP and the blanket at the time of patterning. The thickness of the substrate SB also needs to be measured to accurately control a gap amount between the substrate SB and the blanket at the time of transfer. Accordingly, a printing plate thickness measurement sensor SN22 and a substrate thickness measurement sensor SN23 are provided.

More specifically, as shown in FIG. 3, a sensor bracket 26L extending forward, i.e. toward the (+Y) side is mounted on the left bracket 21L and a leading end portion of the sensor bracket 26L extends to above the printing plate PP positioned at the position XP21. The printing plate thickness measurement sensor SN22 is mounted on the leading end portion of the sensor bracket 26L. The sensor SN22 includes a light emitter and a light receiver and measures two distances. That is, the sensor SN22 measures a distance from the sensor SN22 to the upper surface of the printing plate PP based on light reflected by the upper surface of the printing plate PP and measures a distance from the sensor SN22 to the lower surface of the printing plate PP based on light reflected by the lower surface of the printing plate PP. Information on the distances is output from the sensor SN22 to the control unit 6. Thus, in the control unit 6, the thickness of the printing plate PP can be accurately calculated from these pieces of distance information.

The substrate thickness measurement sensor SN23 is provided for the substrate side in the same manner for the printing plate side. That is, a sensor bracket 26R is mounted on the right bracket 21R and a leading end portion of the sensor bracket 26R extends to above the substrate SB positioned at the position XP25. The substrate thickness measurement sensor SN23 is mounted on the leading end portion of the sensor bracket 26R and measures the thickness of the substrate SB.

B-2. Upper Stage Unit 3

Figure 4B:
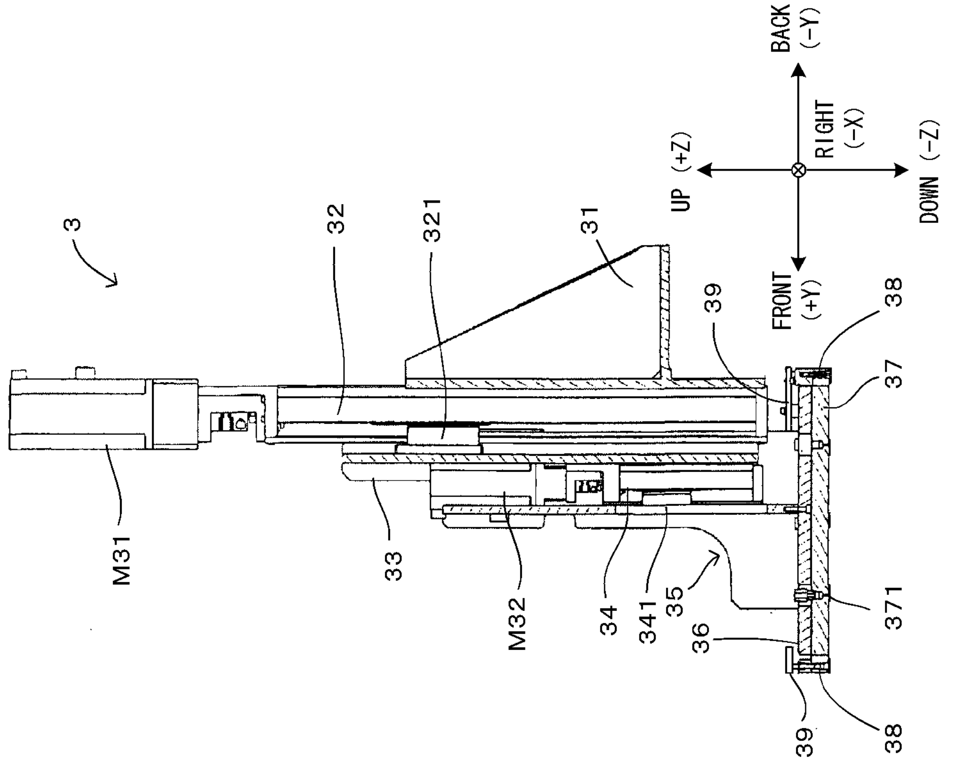
FIG. 4B is a sectional view of the upper stage unit shown in FIG. 4A.
Figure 4A:
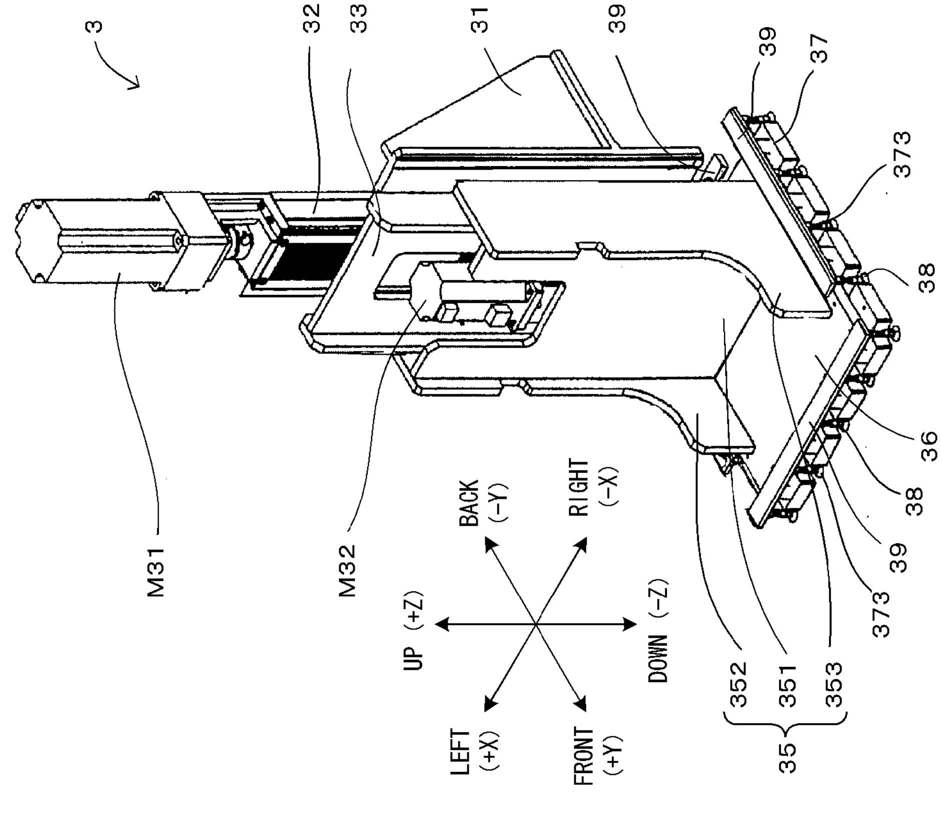
FIG. 4A is a perspective view showing the upper stage unit equipped in the printing apparatus of FIG. 1.

FIG. 4A is a perspective view showing the upper stage unit equipped in the printing apparatus of FIG. 1. FIG. 4B is a sectional view of the upper stage unit shown in FIG. 4A. The upper stage unit 3 is arranged above the printing plate PP or the substrate SB positioned at the position XP23 (see FIG. 3). A supporting frame 31 is coupled to the horizontal plate 15 to be supported on the first frame structure. As shown in FIGS. 4A and 4B, the supporting frame 31 has a frame side surface extending in the vertical direction Z. A ball screw mechanism 32 extending in the vertical direction Z is supported on the frame side surface. A rotary shaft (not shown) of a first stage elevating motor M31 is coupled to an upper end portion of the ball screw mechanism 32. A ball screw bracket 321 is threadably engaged with the ball screw mechanism 32.

Another supporting frame 33 is fixed to the ball screw bracket 321 and movable upward and downward in the vertical direction Z together with the ball screw bracket 321. Further, another ball screw mechanism 34 is supported on a frame surface of the supporting frame 33. The ball screw mechanism 34 includes a ball screw at narrower pitches than that of the ball screw mechanism 32. With respect to the narrow pitch ball screw, a rotary shaft (not shown) of a second stage elevating motor M32 is coupled to an upper end portion thereof and a ball screw bracket 341 is threadably engaged with a central portion thereof.

A stage holder 35 is mounted to the ball screw bracket 341. The stage holder 35 is composed of three vertical plates 351 to 353 extending in the vertical direction Z. Out of these, the vertical plate 351 is fixed to the ball screw bracket 341 and the remaining vertical plates 352, 353 are respectively fixed to the left and right sides of the vertical plate 351. A horizontal supporting plate 36 is mounted to vertical lower ends of the vertical plates 351 to 353, and the suction plate 37 made of metal, e.g. aluminum alloy is mounted to the lower surface of the horizontal supporting plate 36.

Accordingly, the stage elevating motors M31, M32 operate in response to an operation command from the motor control unit 63 of the control unit 6, whereby the suction plate 37 is moved upward and downward in the vertical direction Z. By combining the ball screw mechanisms 32, 34 having different pitches and operating the first stage elevating motor M31, the suction plate 37 is moved upward and downward at a relatively wide pitch, i.e. the suction plate 37 can be moved at a high speed. In addition, by operating the second stage elevating motor M32, the suction plate 37 is moved upward and downward at a relatively narrow pitch, i.e. the suction plate 37 can be precisely positioned.

A plurality of suction grooves 371 are provided in the lower surface of the suction plate 37, i.e. in a suction surface for sucking and holding the printing plate PP or the substrate SB. A plurality of suction pads 38 are arranged in a plurality of cutouts 373 provided on the outer peripheral edge of the suction plate 37 and a central portion of the suction plate 37. Note that nozzle bodies for supporting the suction pads 38 are supported by the horizontal supporting plate 36, a nozzle supporting plate 39 and the like so that the leading end surfaces of the suction pads 38 are flush with the lower surface of the suction plate 37. Out of the suction pads 38, those arranged in the central portion of the suction plate 37 (not shown) are auxiliary ones for improving suction strength. It is also possible not to provide such auxiliary suction pads.

As just described, the suction grooves 371 and the suction pads 38 are provided as a suction means for sucking and holding the printing plate PP and the substrate SB and respectively connected to a negative pressure supply source via negative pressure supply paths for independently supplying a negative pressure. Valves V31 (FIG. 2) are inserted in the negative pressure supply paths for the suction grooves while valves V32 (FIG. 2) are inserted in the negative pressure supply paths for the suction pads. By controlling the opening and closing of the valves V31 in response to an opening/closing command from the valve control unit 64 of the control unit 6, the printing plate PP and the substrate SB can be sucked by the suction grooves 371. Further, by controlling the opening and closing of valves V32 in response to an opening/closing command from the valve control unit 64, the printing plate PP and the substrate SB can be sucked by the suction pads 38. Although a factory's utility is used as the negative pressure supply source to hold the printing plate, the substrate and the blanket in this embodiment, the apparatus 100 may be equipped with a negative pressure supply unit such as a vacuum pump and a negative pressure.

B-3. Alignment Unit 4

Figure 5:
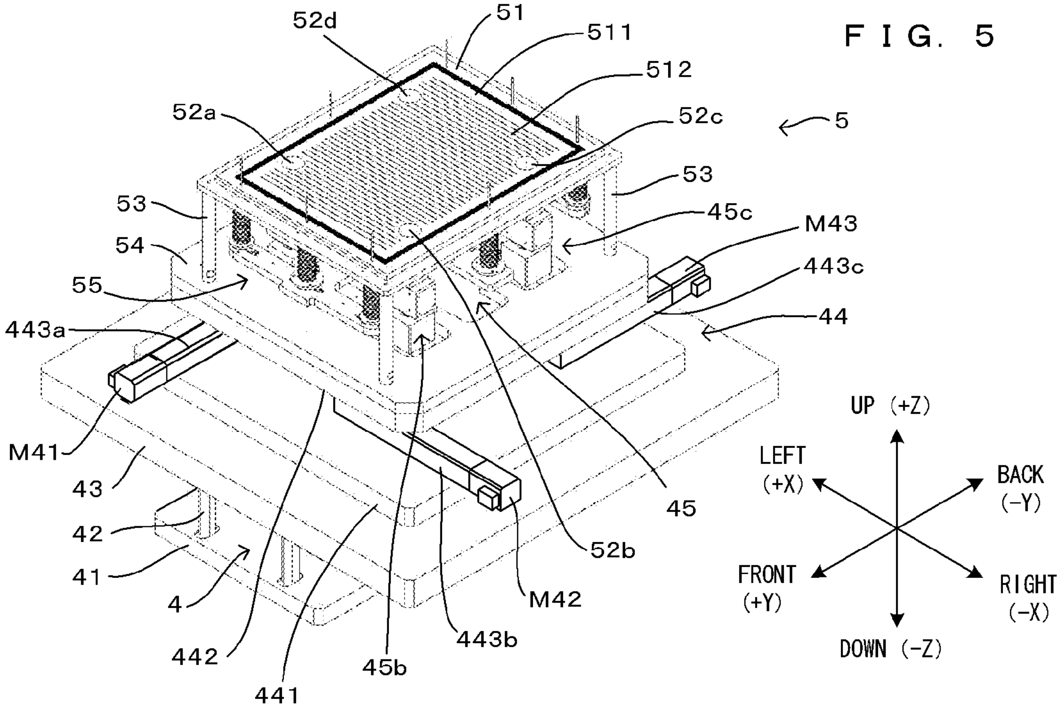
FIG. 5 is a perspective view showing the alignment unit and the lower stage unit equipped in the printing apparatus of FIG. 1.

FIG. 5 is a perspective view showing the alignment unit and the lower stage unit equipped in the printing apparatus of FIG. 1. As shown in FIG. 1, the alignment unit 4 and the lower stage unit 5 are arranged vertically below the upper stage unit 3. The alignment unit 4 includes a camera mount base 41, four column members 42, a frame-shaped stage supporting plate 43 provided with an opening in a central portion, an alignment stage 44 and an imaging device 45. As shown in FIG. 1, the camera mount base 41 is fixed to the inner bottom surface of a recess formed in a central portion of the upper surface of the stone plate 13. Further, two column members 42 stand upward in the vertical direction (referred to as "vertically upward" or "(+Z) direction") from each of front and rear end portions of the camera mount base 41, and handling ability of the camera mount base 41 is improved by these.

As shown in FIG. 1, the stage supporting plate 43 is arranged in a horizontal posture to cross over the recess of the stone plate 13 and fixed to the upper surface of the stone plate 13 with the central opening of the stage supporting plate 43 and the camera mount base 41 facing each other. Further, the alignment stage 44 is fixed to the upper surface of the stage supporting plate 43.

The alignment stage 44 includes a stage base 441 and a stage top 442. The stage base 441 is fixed onto the stage supporting plate 43. The stage top 442 is arranged vertically above the stage base 441 so as to support the lower stage unit 5. Each of these stage base 441 and stage top 442 is in the form of a frame having an opening in a central portion. A supporting mechanism (not shown), e.g. a cross roller bearing, having three degrees of freedom in a rotating direction about an axis of rotation extending in the vertical direction Z, the X direction and the Y direction is arranged near each corner of the stage top 442 between the stage base 441 and the stage top 442.

A Y-axis ball screw mechanism 443*a* is provided on the supporting mechanism arranged at the front-left corner out of these supporting mechanisms, and a Y-axis drive motor M41 is mounted to the Y-axis ball screw mechanism 443*a*. An X-axis ball screw mechanism 443*b* is provided on the supporting mechanism arranged at the front-right corner, and an X-axis drive motor M42 is mounted to the X-axis ball screw mechanism 443*b*. A Y-axis ball screw mechanism 443*c* is provided on the supporting mechanism arranged at the rear-right corner, and a Y-axis drive motor M43 is mounted to the Y-axis ball screw mechanism 443*c*. Further, an X-axis ball screw mechanism (not shown) is provided on the supporting mechanism arranged at the rear-left corner, and an X-axis drive motor M44 (FIG. 2) is mounted to the X-axis ball screw mechanism. Thus, by operating the respective drive motors M41 to M44 in response to an operation command from the motor control unit 63 of the control unit 6, the stage top 442 is moved in a horizontal plane while a relatively large space is provided in a central portion of the alignment stage 44. Further, the suction plate of the lower stage unit 5 can be positioned by being rotated about a vertical axis.

One reason using the alignment stage 44 having a hollow space in this embodiment is to image alignment marks formed on the blanket held on the upper surface of the lower stage unit 5 and the substrate SB held on the lower surface of the upper stage unit 3 by the imaging device 45. The configuration of the imaging device 45 is described below with reference to FIGS. 5 and 6.

Figure 6:
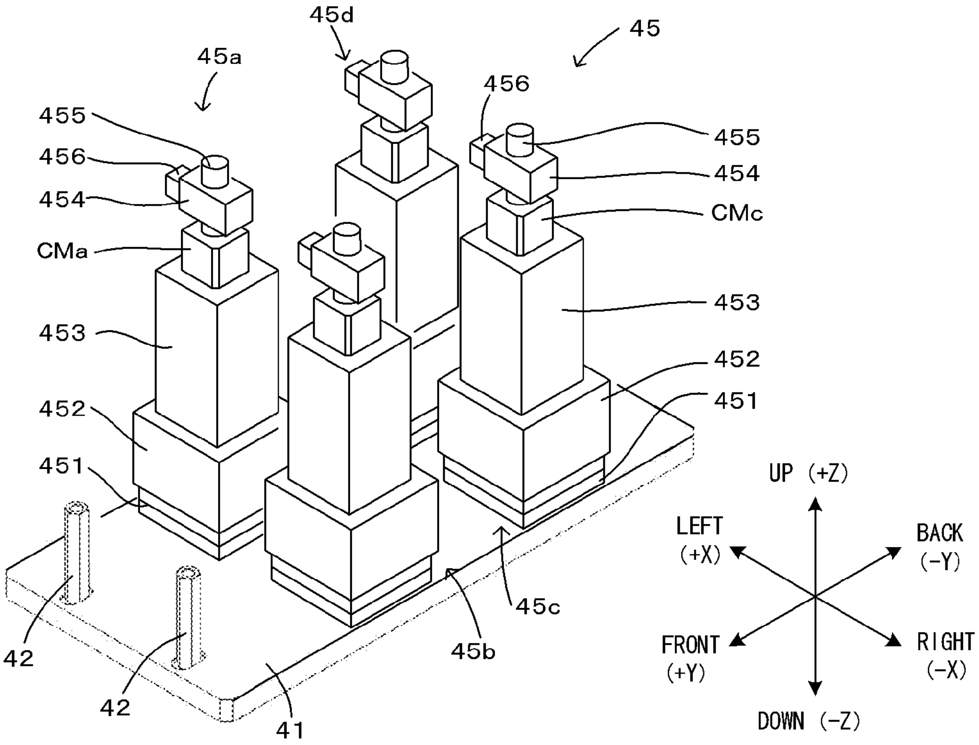
FIG. 6 is a perspective view showing the imaging device of the alignment unit.

FIG. 6 is a perspective view showing the imaging device of the alignment unit. The imaging device 45 is for imaging alignment marks respectively formed at four positions of the blanket and alignment marks respectively formed at four positions of the substrate SB and includes four imaging units 45*a* to 45*d*. Imaging target areas of the respective imaging units 45*a* to 45*d* are as follows.

Imaging unit 45*a*: area near the front-left corners of the blanket and the substrate SB Imaging unit 45*b*: area near the front-right corners of the blanket and the substrate SB Imaging unit 45*c*: area near the rear-right corners of the blanket and the substrate SB Imaging unit 45*d*: area near the rear-left corners of the blanket and the substrate SB The imaging units 45*a* to 45*d* have different imaging target areas, but have the same configuration. Thus, the configuration of the imaging unit 45*a* is described and the other configurations are denoted by the same or equivalent reference signs and not described here.

In the imaging unit 45*a*, an XY table 451 is arranged on the upper surface near the front-left corner of the camera mount base 41 as shown in FIG. 6. A table base of the XY table 451 is fixed to the camera mount base 41 and a table top of the XY table 451 is precisely positioned in the X direction and the Y direction by manually operating an adjustment knob (not shown). A precision elevating table 452 is mounted on the table top. A Z-axis drive motor M45*a* (FIG. 2) is mounted to the precision elevating table 452 and operates in response to an operation command from the motor control unit 63 of the control unit 6, whereby the table top of the precision elevating table 452 moves upward and downward in the vertical direction Z.

A lower end portion of a camera bracket 453 extending in the vertical direction Z is fixed to the upper surface of the table top of the precision elevating table 452. Further, an upper end portion of the camera bracket 453 extends up to a position right below a suction plate 51 of the lower stage unit 5 through the central opening of the stage supporting plate 43, the central opening of the alignment stage 44 and an oblong opening (this will be described in detail later) of the stage base. The CCD camera CMa, a lens barrel 454 and an objective lens 455 are arranged one over another in this order on the upper end portion of the camera bracket 453 with an imaging surface faced vertically upward. Further, a light source 456 is mounted on a side surface of the lens barrel 454 and driven and turned on by a light source driver 46. Although a red LED (Light Emitting Diode) is used as the light source 456 in this embodiment, a light source corresponding to the materials of the blanket and the substrate SB and the like can be used. The objective lens 455 is mounted on the lens barrel 454. Further, a half mirror (not shown) is arranged in the lens barrel 454 so as to reflect illumination light irradiated from the light source 456 in the (+Z) direction and irradiate the blanket on the lower stage unit 5 via the objective lens 455 and a quartz window 52*a* provided in an area near the front-left corner of the suction plate 51. A part of the illumination light further irradiates the substrate SB sucked and held by the suction plate 37 of the upper stage unit 3 via the blanket. Note that since the blanket is made of a transparent material in this embodiment, the illumination light reaches the lower surface of the substrate SB through the blanket as described above.

Further, a part of the light emerging from the blanket and the substrate SB and propagating toward the (−Z) side is incident on the CCD camera CMa via the quartz window 52*a*, the objective lens 455 and the lens barrel 454. The CCD camera CMa images the alignment mark located vertically above the quartz window 52*a*. As just described, in the imaging unit 45*a*, illumination light is irradiated via the quartz window 52*a*, an image of the area near the front-left corners of the blanket and the substrate SB is captured via the quartz window 52*a*. An image signal corresponding to the captured image is output to an image processing unit 65 of the control unit 6. On the other hand, the other imaging units 45*b* to 45*d* respectively capture images via quartz windows 52*b* to 52*d* similarly to the imaging unit 45*a*.

B-4. Lower Stage Unit 5

Next, with reference back to FIG. 5, the configuration of the lower stage unit 5 is described in detail. The lower stage unit 5 includes the suction plate 51, the four quartz windows 52*a* to 52*d*, four column members 53, a stage base 54 and a lift pin unit 55. The stage base 54 is provided with three openings in the form of long holes extending in the lateral direction X and arranged in the front-back direction Y. The stage base 54 is fixed onto the alignment stage 44 so that these long openings and the central opening of the alignment stage 44 overlap when viewed from above. Further, upper parts (CCD cameras, lens barrels and objective lenses) of the imaging units 45*a*, 45*b* are loosely inserted into the front long opening, and upper parts (CCD cameras, lens barrels and objective lenses) of the imaging units 45*c*, 45*d* are loosely inserted into the rear long opening. Further, the column members 53 stand in the (+Z) direction from corners of the upper surface of the stage base 54 and tops thereof support the suction plate 51.

The suction plate 51 is a metal plate of, e.g. aluminum alloy, and the quartz windows 52*a* to 52*d* are respectively provided in areas near the front-left, front-right, rear-right and rear-left corners thereof. A groove 511 is provided in the upper surface of the suction plate 51 to enclose the quartz windows 52*a* to 52*d*. In an inner area enclosed by the groove 511, a plurality of grooves 512 extending in the lateral direction X except at the quartz windows 52*a* to 52*d* are provided at specified intervals in the front-back direction Y.

One end of a positive pressure supply pipe (not shown) is connected to each of these grooves 511, 512 and the other end thereof is connected to a pressurization manifold. A pressure valve V51 (FIG. 2) is inserted in an intermediate portion of each positive pressure supply pipe. Air of a predetermined pressure is obtained by adjusting pressurized air supplied from the factory's utility by a regulator. The adjusted pressurized air is constantly supplied to the pressurization manifold. Thus, when a desired pressure valve V51 is selectively opened in response to an operation command from the valve control unit 64 of the control unit 6, the adjusted pressurized air is supplied to the groove 511, 512 connected to the selected pressure valve V51.

It is possible to selectively supply not only the pressurized air, but also a negative pressure to each of the grooves 511, 512. That is, one end of a negative pressure supply pipe (not shown) is connected to each of the grooves 511, 512 and the other end thereof is connected to a negative pressure manifold. Further, a suction valve V52 (FIG. 2) is inserted in an intermediate portion of each negative pressure supply pipe. A negative pressure supply source is connected to the negative pressure manifold via a regulator and a negative pressure of a predetermined value is constantly supplied. Thus, when a desired suction valve V52 is selectively opened in response to an operation command from the valve control unit 64 of the control unit 6, the adjusted negative pressure is supplied to the groove 511, 512 connected to the selected suction valve V52.

As just described, it is possible to cause the suction plate 51 to partly or entirely suck the blanket by controlling the opening and closing of the valves V51, V52 and to partly raise the blanket and press the blanket against the printing plate PP or the substrate SB held by the upper stage unit 3 by partly supplying air between the suction plate 51 and the blanket and partly raising the blanket.

Figure 7A:
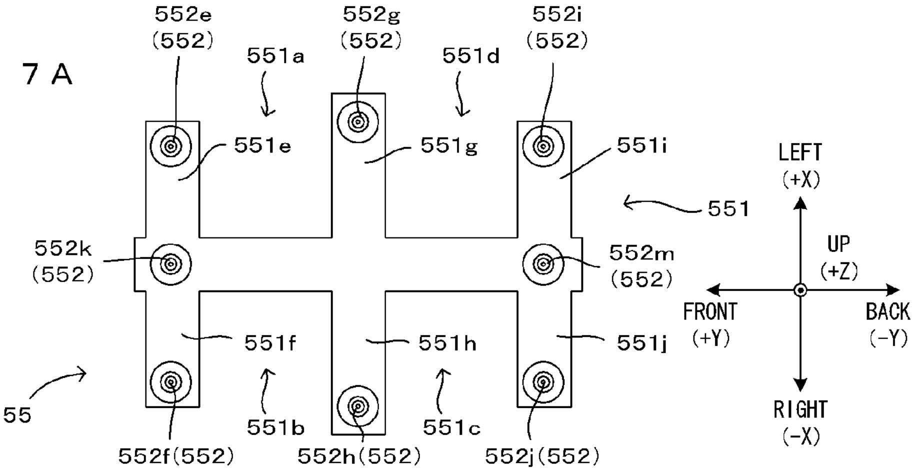
FIG. 7A is a plan view of the lift pin unit equipped in the lower stage unit.
Figure 7B:
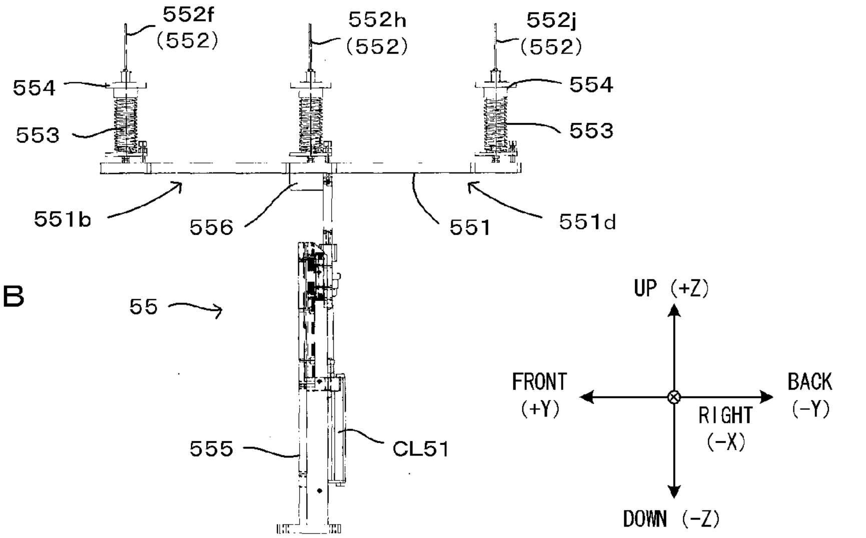
FIG. 7B is a side view of the lift pin unit shown in FIG. 7A.

FIG. 7A is a plan view of the lift pin unit equipped in the lower stage unit and FIG. 7B is a side view of the lift pin unit shown in FIG. 7A. In the lift pin unit 55, a lift plate 551 is provided movably upward and downward between the suction plate 51 and the stage base 54. The lift plate 551 is formed with cutouts 551*a* to 551*d* at four positions to prevent interference with the imaging units 45*a* to 45*d*. That is, in a state where the imaging units 45*a* to 45*d* are respectively fitted in the cutouts 551*a* to 551*d*, the lift plate 551 is movable upward and downward in the vertical direction Z. By providing the cutouts 551*a* to 551*d* at the four positions in this way, the lift plate 551 is formed with six finger parts 551*e* to 551*j*, and lift pins 552*e* to 552*j* respectively stand vertically upward from leading end portions of the respective finger parts 551*e* to 551*j*. Further, another lift pin 552*k* stands between the lift pins 552*e* and 552*f*, and still another lift pin 552*m* stands between the lift pins 552*i* and 552*j*. These eight lift pins 552 (552*e* to 552*k*, 552*m*) stand on the lift plate 551 and can support the entire lower surface of the blanket. These lift pins 552 are thinner than through holes (not shown) perforated in the vertical direction in the outer peripheral edge of the suction plate 51 and are insertable into the through holes from a vertically lower side as shown in FIG. 5.

A compression spring 553 and a housing 554 are fitted on each lift pin 552 in this order from above, and a lower end portion of the compression spring 553 is engaged with the lift plate 551 and an upper end portion thereof is covered by the housing 554. Note that the upper surface of the housing 554 has a circular shape having a larger outer diameter than an inner diameter of the through hole of the suction plate 51. When the lift plate 551 is moved upward by a pin elevating cylinder CL51 as described next, the upper surfaces of the housings 554 are engaged with the lower surface of the suction plate 51 and the compression springs 553 are sandwiched and compressed between these upper surfaces and the lift plate 551, whereby an upward moving speed of the lift plate 551 is controlled. Further, also when the lift plate 551 is moved downward, a downward moving speed of the lift plate 551 is controlled using compression forces of the compression springs 553.

The pin elevating cylinder CL51 is fixed to a side surface of a guide bracket 555 whose lower surface is fixed to the camera mount base 41, and a piston leading end thereof supports the lift plate 551 via a slide block 556. Accordingly, the pin elevating cylinder CL51 is actuated to move the lift plate 551 upward and downward by the valve control unit 64 of the control unit 6 switching the opening and closing of a valve connected to the pin elevating cylinder CL51. As a result, all the lift pins 552 are moved toward and away from the upper surface of the suction plate 51, i.e. the suction surface. For example, if the lift pins 552 projects in the (+Z) direction from the upper surface of the suction plate 51, the blanket can be placed on the tops of the lift pins 552 by the blanket conveyance robot. Following the placement of the blanket, the lift pins 552 are retracted in the (−Z direction) from the upper surface of the suction plate 51, whereby the blanket is transferred to the upper surface of the suction plate 51. Thereafter, the thickness of the blanket is measured by a blanket thickness measurement sensor SN51 arranged near the suction plate 51 at an appropriate timing as described later.

Figure 8:
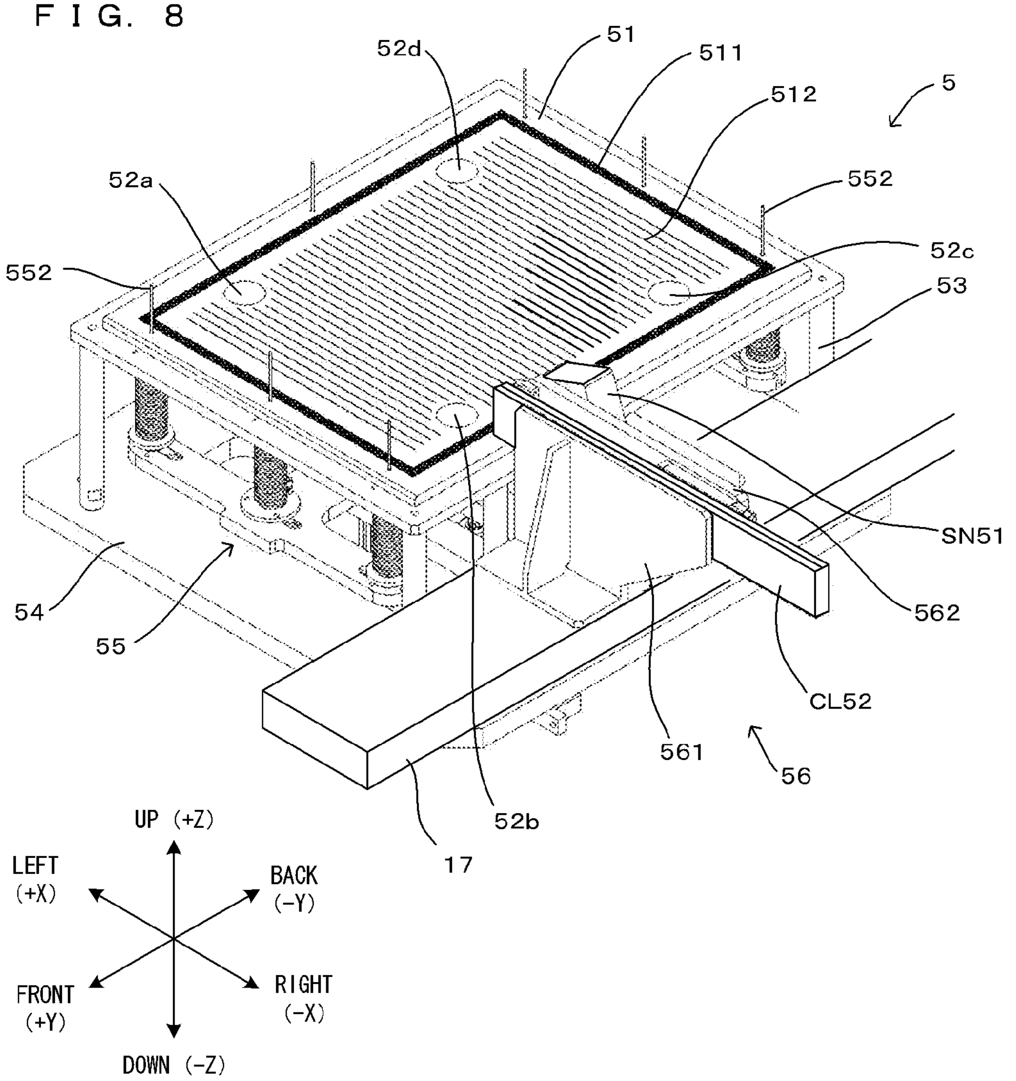
FIG. 8 is a perspective view showing a blanket thickness measurement unit.

FIG. 8 is a perspective view showing a blanket thickness measurement unit. A blanket thickness measurement unit 56 is a part of the lower stage unit 5 and configured as follows. In the blanket thickness measurement unit 56, a cylinder bracket 561 is fixed to the second frame structure at a position near the right side of the suction plate 51. A sensor horizontal drive cylinder CL52 is fixed in a horizontal posture to the cylinder bracket 561. A slide plate 562 mounted on the cylinder CL52 slides in the lateral direction X by the valve control unit 64 of the control unit 6 switching the opening and closing of a valve connected to the cylinder CL52. The blanket thickness measurement sensor SN51 is mounted on a left end portion of the slide plate 562. Thus, when the slide plate 562 is moved toward the left (+X) side, i.e. horizontally moved toward the suction plate 51 by the sensor horizontal drive cylinder CL52, the blanket thickness measurement sensor SN51 is positioned to a position right above a right end portion of the blanket sucked and held by the suction plate 51. The sensor SN51 is also configured similarly to the printing plate thickness measurement sensor SN22 and the substrate thickness measurement sensor SN23 and can measure the thickness of the blanket by the same measurement principle. On the other hand, at timings other than a measurement timing, the slide plate 562 is moved to the right (−X) side, i.e. moved to a retracted position distant from the suction plate 51 by the sensor horizontal drive cylinder CL52 to prevent the interference of the blanket thickness measurement unit 56.

B-5. Pressing Unit 7

Figure 9A:
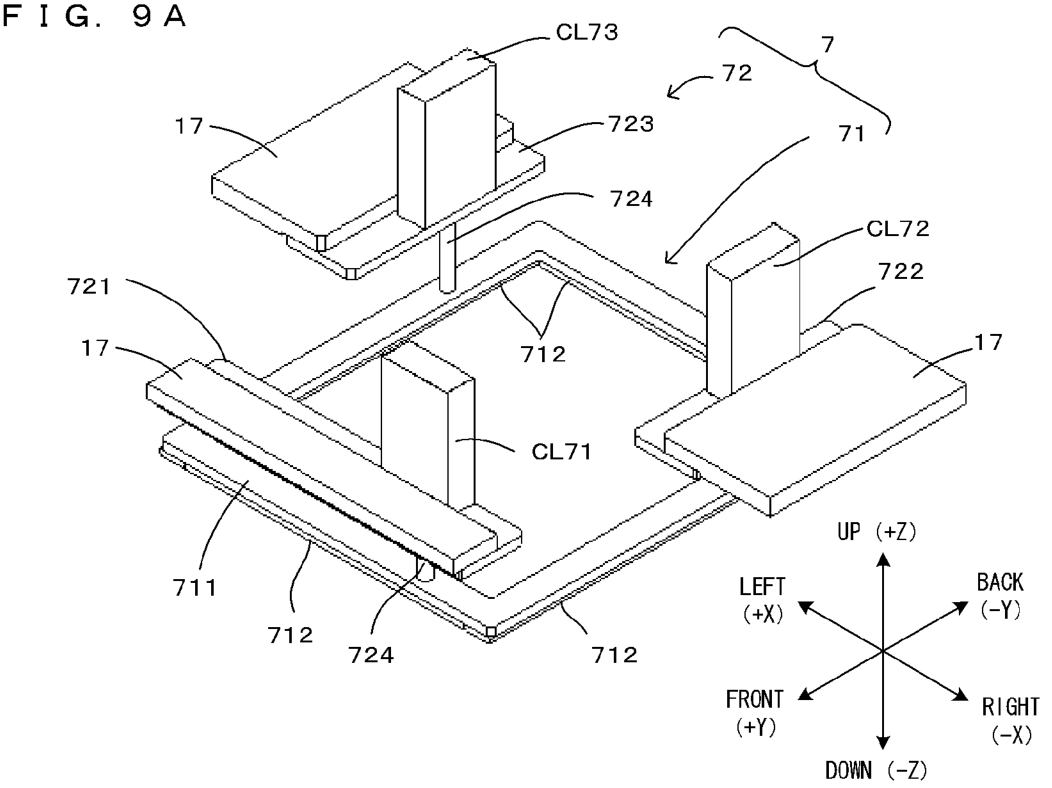
FIG. 9A is a perspective view showing the configuration of the pressing unit equipped in the printing apparatus of FIG. 1.
Figure 9B:
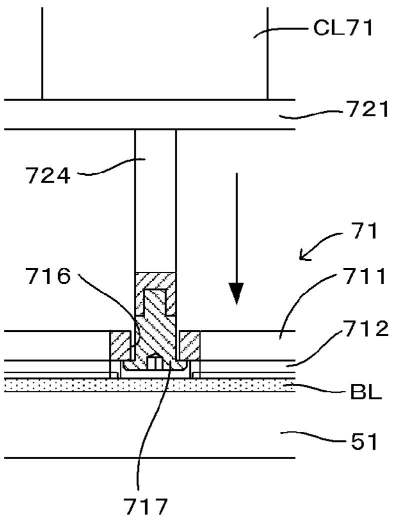
FIG. 9B is a view showing a state where the blanket sucked and held by the suction plate is pressed by the pressing unit.
Figure 9C:
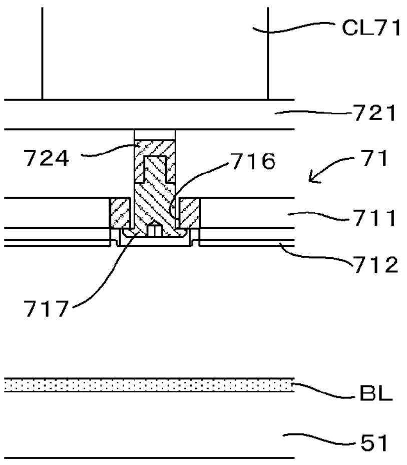
FIG. 9C is a view showing a state where the blanket is released from the pressing unit.

FIG. 9A is a perspective view showing the configuration of the pressing unit equipped in the printing apparatus of FIG. 1. FIG. 9B is a view showing a state where the blanket sucked and held by the suction plate is pressed by the pressing unit (hereinafter, referred to as a "blanket pressing state"). FIG. 9C is a view showing a state where the blanket is released from the pressing unit (hereinafter, referred to as a "blanket releasing state"). The pressing unit 7 is switched between the blanket pressing state and the blanket releasing state by moving a pressing member 71 provided vertically above the suction plate 51 upward and downward in the vertical direction Z by a switching mechanism 72.

In the switching mechanism 72, pressing member elevating cylinders CL71 to CL73 are so mounted on the horizontal plates 17 of the second frame structure by cylinder brackets 721 to 723 as to be able to move pistons 724 back and forth at vertically lower sides. The pressing member 71 is loosely fitted in a hanging state at leading end portions of these pistons 724.

The pressing member 71 includes a supporting plate 711 and four blanket pressing plates 712. The supporting plate 711 has the same planar size as the blanket BL and is in the form of a frame as a whole with an open central portion. The four blanket pressing plates 712 are fixed to the lower surface of the supporting plate 711 and cover the entire lower surface of the supporting plate 711.

As shown in FIGS. 9B and 9C, the supporting plate 711 is perforated with through holes 716 having an inner diameter larger than an outer diameter of the pistons 724 at positions corresponding to the pressing member elevating cylinders CL71 to CL73. Fastening members 717 are connected to the leading end portion of the pistons 724 through the through holes 716 from below the respective through holes 716. Accordingly, the pistons 724 of the pressing member elevating cylinders CL71 to CL73 are coupled to the pressing member elevating cylinders CL71 to CL73 in a state loosely fitted to the supporting plate 711. That is, the pressing member 71 is supported in a floating state relative to the pressing member elevating cylinders CL71 to CL73.

By the valve control unit 64 of the control unit 6 switching the opening and closing of valves connected to the pressing member elevating cylinders CL71 to CL73, the pressing member elevating cylinder CL71 to CL73 are actuated to bring the pressing member 71 into contact with or away from the suction plate 51 of the lower stage unit 5. For example, the pressing member 71 is lowered to press the suction plate 51 holding the blanket BL and sandwich and hold a peripheral edge portion of the blanket BL over the entire circumference together with the suction plate 51. Further, also when the suction plate 51 is moved for alignment, the pressing member 71 moves in the horizontal direction (X direction, Y direction) together with the suction plate 51 to stably hold the blanket BL.

B-6. Pre-Alignment Unit 8

Figure 10:
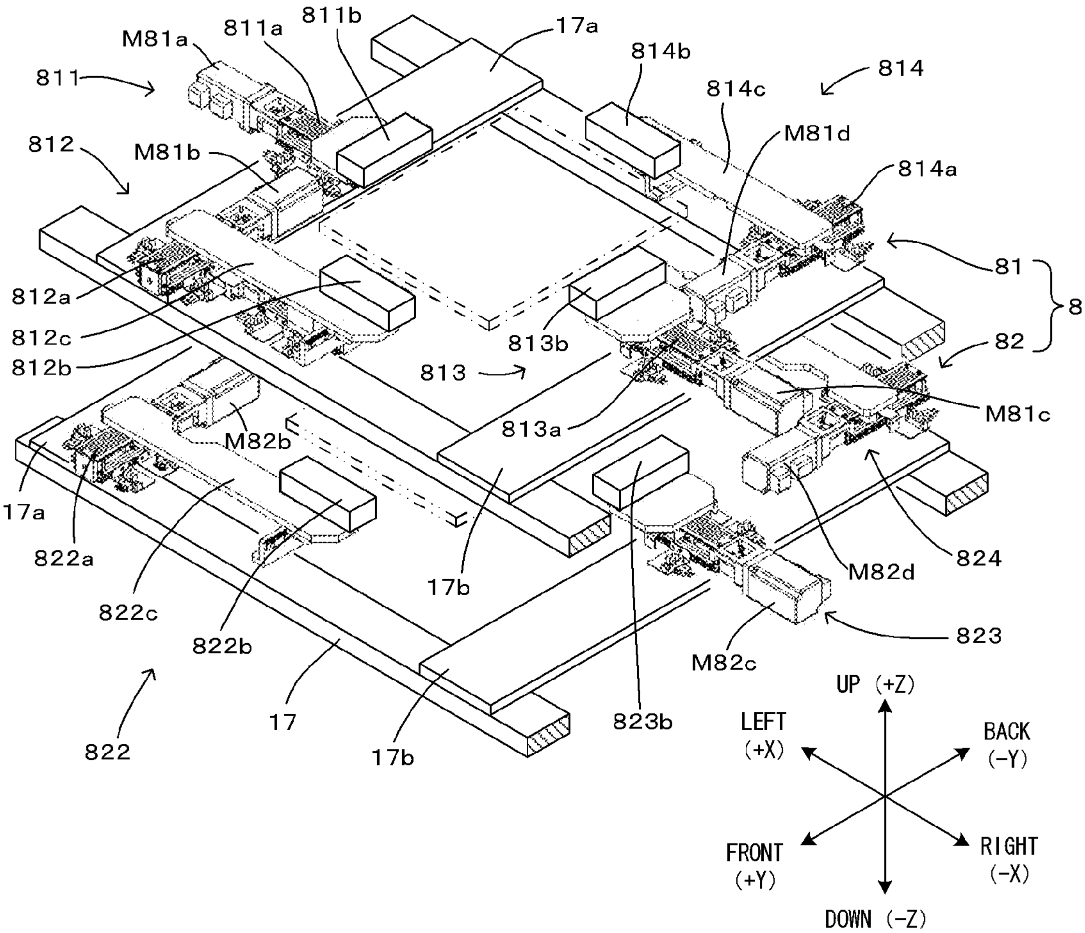
FIG. 10 is a perspective view showing the pre-alignment unit equipped in the printing apparatus of FIG. 1.

FIG. 10 is a perspective view showing the pre-alignment unit equipped in the printing apparatus of FIG. 1. The pre-alignment unit 8 includes a pre-alignment upper section 81 and a pre-alignment lower section 82. The pre-alignment upper section 81 is arranged vertically above the pre-alignment lower section 82 and aligns the printing plate PP held by the printing plate shuttle 25L and the substrate SB held by the substrate shuttle 25R at the position XP23 prior to close contact with the blanket BL. On the other hand, the pre-alignment lower section 82 aligns the blanket BL placed on the suction plate 51 of the lower stage unit 5 prior to close contact with the printing plate PP or the substrate SB. Note that the pre-alignment upper section 81 and the pre-alignment lower section 82 basically have the same configuration. Accordingly, the configuration of the pre-alignment upper section 81 is described below and that of the pre-alignment lower section 82 is denoted by the same or equivalent reference signs and not described.

The pre-alignment upper section 81 includes four upper guide movement parts 811 to 814. Each of the upper guide movement parts 811 to 814 is provided on the horizontal plates 17 that are arranged in the upper level within the second frame structure. That is, the upper guide movement part 811 is mounted on a central portion of the left horizontal plate 17*a* of the two horizontal plates extending in the front-back direction Y, and the upper guide movement part 812 is mounted on a front end portion thereof. The upper guide movement part 813 is mounted on a central portion of the other right horizontal plate 17*b* and the upper guide movement part 814 is mounted on a rear end portion thereof. Note that the upper guide movement parts 811, 813 have the same configuration and the upper guide movement parts 812, 814 have the same configuration. Thus, the configurations of the upper guide movement parts 811, 813 are described below and those of the upper guide movement parts 812, 814 are denoted by the same or equivalent reference signs and not described.

In the upper guide movement part 811, a ball screw mechanism 811*a* is fixed to the central portion of the left horizontal plate 17*a* while extending in the lateral direction X. A ball screw bracket is threadably engaged with a ball screw of the ball screw mechanism 811*a*, and an upper guide 811*b* is mounted on the ball screw bracket to face the upper guide movement part 813. A rotary shaft (not shown) of an upper guide drive motor M81*a* is coupled to a left end portion of the ball screw mechanism 811*a*, and the upper guide 811*b* moves in the lateral direction X by actuating the upper guide drive motor M81*a* in response to an operation command from the motor control unit 63 of the control unit 6.

In the upper guide movement part 812, a ball screw mechanism 812*a* is fixed to the front end portion of the left horizontal plate 17*a* while extending in the front-back direction Y. A ball screw bracket is threadably engaged with a ball screw of the ball screw mechanism 812*a*, and a left end portion of a guide holder 812*c* extending in the lateral direction is fixed to the ball screw bracket. A right end portion of the guide holder 812*c* reaches a middle position between the horizontal plates 17*a*, 17*b* and an upper guide 812*b* is mounted on a right end portion thereof to face the upper guide movement part 814. Further, a rotary shaft (not shown) of an upper guide drive motor M81*b* is coupled to a rear end portion of the ball screw mechanism 812*a*, and the upper guide 812*b* moves in the front-back direction Y by actuating the upper guide drive motor M81*b* in response to an operation command from the motor control unit 63 of the control unit 6.

In this way, the four upper guides 811*b* to 814*b* surround the printing plate PP or the substrate SB (dashed-dotted line in FIG. 10) at the position vertically below the position XP23 and the respective upper guides 811*b* to 814*b* are independently movable toward and away from the printing plate PP or the like. Thus, by controlling movement amounts of the respective upper guides 811*b* to 814*b*, the printing plate PP and the substrate SB can be aligned by being horizontally moved or rotated on the hands of the shuttles.

B-7. Static Eliminator 9

Figure 11:
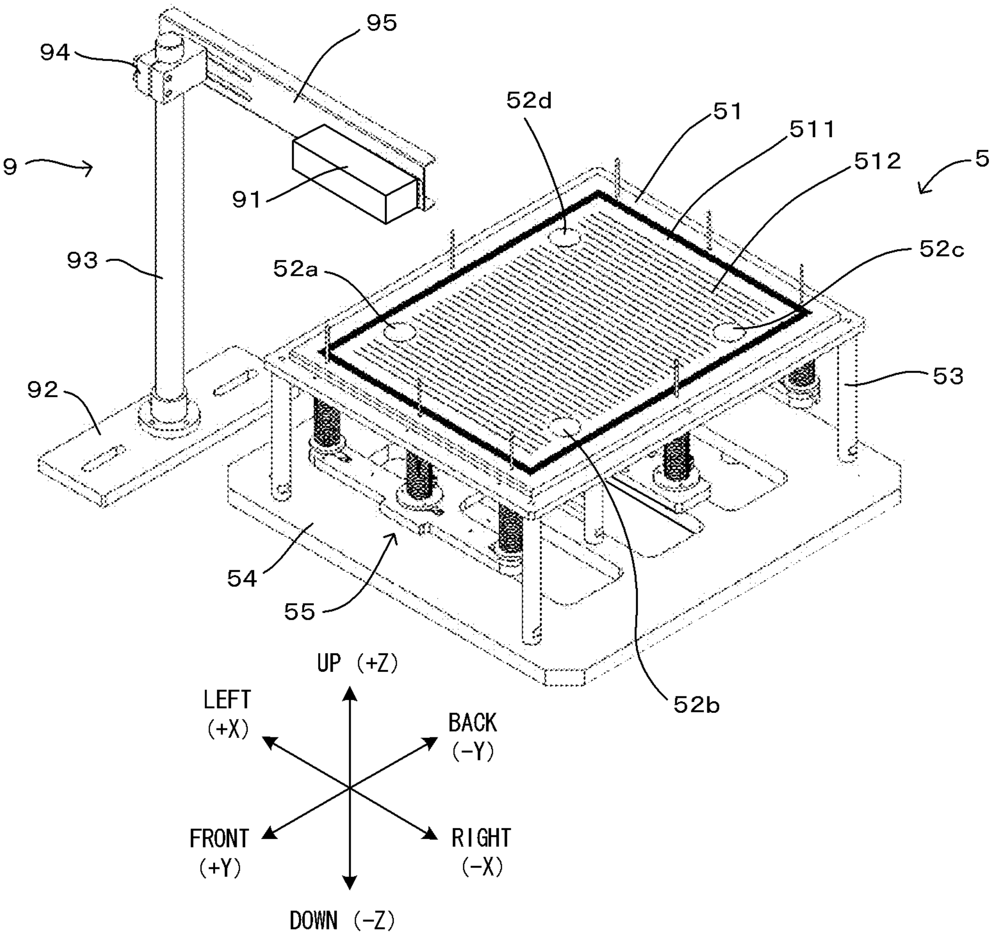
FIG. 11 is a perspective view showing the static eliminator equipped in the printing apparatus of FIG. 1.

FIG. 11 is a perspective view showing the static eliminator equipped in the printing apparatus of FIG. 1. In the static eliminator 9, a base plate 92 is fixed to the upper surface of the stone plate 13 at the left side of the lower stage unit 5. A column member 93 stands from the base plate 92 and an upper end portion thereof is located at a higher position than the lower stage unit 5. An ionizer bracket 95 is mounted on an upper end part of the column member 93 via a fixture 94. The ionizer bracket 95 extends in the rightward (−X) direction and a leading end portion thereof reaches the vicinity of the suction plate 51. The ionizer 91 is mounted on that leading end portion.

B-8. Control Unit 6

The control unit 6 includes a CPU (Central Processing Unit) 61, a memory 62, the motor control unit 63, the valve control unit 64, the image processing unit 65 and a display/operation unit 66. The CPU 61 controls the respective components of the apparatus in accordance with a program stored in the memory 62 in advance and performs a patterning process and a transfer process as shown in FIGS. 12 to 19.

C. Overall Operation of Printing Apparatus

Figure 12:
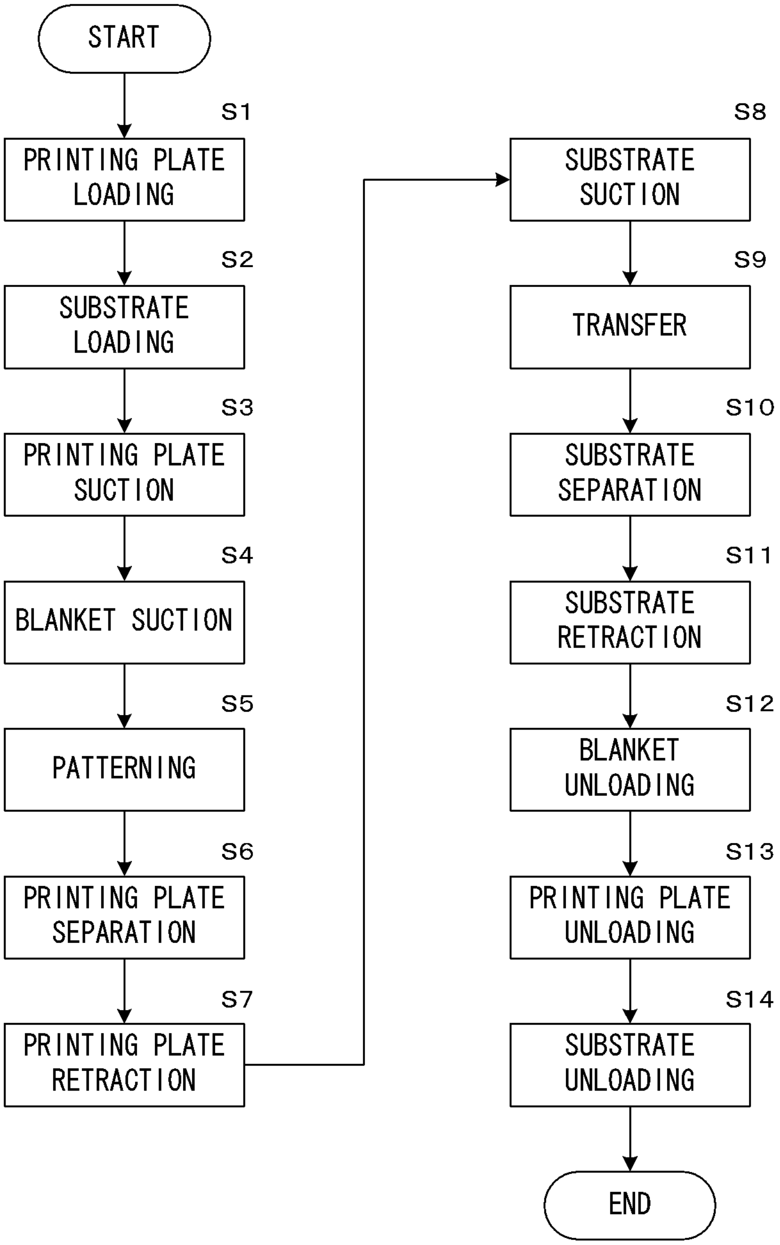
FIG. 12 is a flow chart showing the overall operation of the printing apparatus of FIG. 1.

FIG. 12 is a flow chart showing the overall operation of the printing apparatus of FIG. 1. FIGS. 13 to 19 are charts showing the operation of the printing apparatus of FIG. 1, wherein a table in each figure shows control contents (control targets and operation contents) by the control unit 6 and diagrams in each figure show states of the respective components of the apparatus. In an initial state of the printing apparatus 100, as shown in a field (a) of FIG. 13, the printing plate shuttle 25L and the substrate shuttle 25R are respectively positioned at the middle positions XP22, XP24. After the printing plate PP is set on the printing plate loading/unloading unit, the printing plate shuttle 25L performs a printing plate loading step (Step S1). After the substrate SB is set on the substrate loading/unloading unit, the substrate shuttle 25R performs a substrate loading step (Step S2). Note that the substrate SB is loaded (Step S2) after the printing plate PP is loaded (Step S1) since a conveyance structure of integrally moving the printing plate shuttle 25L and the substrate shuttle 25R in the lateral direction is adopted. As a matter of course, the order of the both may be reversed.

C-1. Printing Plate Loading Step (Step S1)

As shown in "Step S1" in a field (b) of FIG. 13, Substeps (1-1) to (1-7) are performed. That is, the shuttle horizontal drive motor M21 rotates its rotary shaft in a predetermined direction to move the shuttle holding plate 24 in the (+X) direction (1-1). Thus, the printing plate shuttle 25L is moved and positioned to the printing plate transfer position XP21. Further, the rotary actuators RA2, RA2 operate to rotate the printing plate hands 252, 252 by 180 degrees and position them at original positions (1-2). Therefore, the hand posture is switched from the used posture to the unused posture, whereby preparation for loading the printing plate PP before use is completed.

Then, the printing plate shutter drive cylinder CL11 operates to move the printing plate shutter 18 vertically downward, i.e. to open the shutter 18 (1-3). Subsequently, the printing plate loading/unloading unit loads the printing plate PP into the printing apparatus 100 in response to an operation command from the control unit 6 and places it on the hands 252, 252 of the printing plate shuttle 25L (1-4). When the loading of the printing plate PP is completed in this way, the opening/closing state of the above valve is returned to the original one and the printing plate shutter drive cylinder CL11 operates in the opposite direction to return the printing plate shutter 18 to the original position, i.e. to close the shutter 18 (1-5).

When the loading of the printing plate PP is completed, the printing plate PP is located at the printing plate transfer position XP21. Accordingly, at this timing, the printing plate thickness measurement sensor SN22 operates to detect the height positions (positions in the vertical direction Z) of the upper and lower surfaces of the printing plate PP, and outputs height information indicating these detection results to the control unit 6. Based on these pieces of height information, the CPU 61 calculates the thickness of the printing plate PP and stores it in the memory 62. In this way, the thickness of the printing plate PP is measured (1-6). Thereafter, the shuttle horizontal drive motor M21 rotates its rotary shaft in the opposite direction to move the shuttle holding plate 24 in the (−X) direction and position it to the middle position XP22 (1-7).

C-2. Substrate Loading Step (Step S2)

As shown in "Step S2" in the field (b) of FIG. 13, Substeps (2-1) to (2-6) are performed. That is, the shuttle horizontal drive motor M21 rotates its rotary shaft in the direction opposite to the predetermined direction to move the shuttle holding plate 24 in the (−X) direction (2-1). The substrate shuttle 25R is moved and positioned to the substrate transfer position XP25. Note that no rotation mechanism is provided for the substrate hands 252, 252 and preparation for the loading of the substrate SB is completed when Substep (2-1) is completed.

Then, the substrate shutter drive cylinder CL12 operates to move the substrate shutter 19 vertically downward, i.e. to open the shutter 19 (2-2). Following this, the substrate loading/unloading unit loads the substrate SB into the printing apparatus 100 in response to an operation command from the control unit 6 to place the substrate SB on the hands 252, 252 of the substrate shuttle 25R (2-3). When the loading of the substrate SB is completed, the substrate shutter drive cylinder CL12 operates in an opposite direction by returning the opening/closing state of the above valve to the original one, thereby returning the substrate shutter 19 to the original position, i.e. to close the shutter 19 (2-4).

When the loading of the substrate SB is completed, the substrate SB is located at the substrate transfer position XP25. Accordingly, at this timing, the substrate thickness measurement sensor SN23 is actuated to detect the height positions (positions in the vertical direction Z) of the upper and lower surfaces of the substrate SB, and outputs height information indicating these detection results to the control unit 6. Based on these pieces of height information, the CPU 61 calculates the thickness of the substrate SB and stores it in the memory 62. Thus, the thickness of the substrate SB is measured (2-5). Thereafter, the shuttle horizontal drive motor M21 rotates its rotary shaft in the predetermined direction to move the shuttle holding plate 24 in the (+X) direction and position it to the middle position XP24 (2-6).

As just described, in this embodiment, not only the printing plate PP, but also the substrate SB is prepared before the patterning process as shown in a field (c) of FIG. 13. Thereafter, the patterning process and the transfer process are successively performed as described in detail later. Accordingly, a time interval until an application layer patterned on the blanket BL is transferred to the substrate SB can be shortened and stable processes are performed.

C-3. Printing Plate Suction (Step S3).

As shown in "Step S3" in a field (a) of FIG. 14, Substeps (3-1) to (3-7) are performed. That is, the shuttle horizontal drive motor M21 rotates its rotary shaft to move the shuttle holding plate 24 in the (−X) direction (3-1). The printing plate shuttle 25L is moved and positioned to the printing plate suction position XP23. Then, the printing plate shuttle elevating motor M22L rotates its rotary shaft to move the elevating plate 251 in the downward (−Z) direction (3-2). The printing plate PP supported on the printing plate shuttle 25L is moved and positioned to a pre-alignment position lower than the conveyance position.

Subsequently, the upper guide drive motors M81*a* to M81*d* rotate their rotary shafts to move the upper guides 811*b*, 813*b* in the lateral direction X and move the upper guides 812*b*, 814*b* in the front-back direction Y. This causes the respective upper guides 811*b* to 814*b* to come into contact with end surfaces of the printing plate PP supported on the printing plate shuttle 25L, thereby positioning the printing plate PP to a horizontal position set in advance. Thereafter, the respective upper guide drive motors M81*a* to M81*d* rotate their rotary shafts in an opposite direction and the respective upper guides 811*b* to 814*b* are separated from the printing plate PP (3-3).

When the pre-alignment process for the printing plate PP is completed, the stage elevating motor M31 rotates its rotary shaft in a predetermined direction to lower the suction plate 37 in the downward (−Z) direction and bring it into contact with the upper surface of the printing plate PP. Following this, the valves V31, V32 are opened, whereby the printing plate PP is sucked to the suction plate 37 by the suction grooves 371 and the suction pads 38 (3-4).

When the suction of the printing plate PP is detected by a suction detection sensor SN31 (FIG. 2), the stage elevating motor M31 rotates its rotary shaft in an opposite direction and the suction plate 37 moves vertically upward while sucking and holding the printing plate PP. This makes the printing plate PP move to a position vertically above the printing plate suction position XP23 (3-5). Then, the printing plate shuttle elevating motor M22L rotates its rotary shaft to move the elevating plate 251 vertically upward, thereby moving the printing plate shuttle 25L from the pre-alignment position to the conveyance position, i.e. to the printing plate suction position XP23 (3-6). Thereafter, the shuttle horizontal drive motor M21 rotates its rotary shaft to move the shuttle holding plate 24 in the (+X) direction and the emptied printing plate shuttle 25L is positioned to the middle position XP22 (3-7).

C-4. Blanket Suction (Step S4)

As shown in "Step S4" in the field (a) of FIG. 14, Substeps (4-1) to (4-9) are performed. That is, the X-axis drive motors M42, M44 and the Y-axis drive motors M41, M43 are actuated to move the alignment stage 44 to an initial position (4-1). Accordingly, the alignment stage 44 is started from the same position every time. Following this, the pin elevating cylinder CL51 operates to lift the lift plate 551 and cause the lift pins 552 to project vertically upward form the upper surface of the suction plate 51 (4-2). When preparation for the loading of the blanket BL is completed in this way, the blanket shutter drive cylinder CL13 operates to move the blanket shutter (not shown) and open the shutter (4-3). The blanket conveyance robot accesses to the apparatus 100 and then places the blanket BL on the tops of the lift pins 552. Thereafter, the blanket conveyance robot is retracted from the apparatus 100 (4-4). Following this, the blanket shutter drive cylinder CL13 operates to move the blanket shutter and close the shutter (4-5).

Subsequently, the pin elevating cylinder CL51 operates to lower the lift plate 551, whereby the lift pins 552 are lowered while supporting the blanket BL and places the blanket BL on the suction plate 51 (4-6). Then, the lower guide drive motors M82*a* to M82*d* rotate their rotary shafts to move the lower guides 821*b*, 823*b* in the lateral direction X and move the lower guides 822*b*, 824*b* in the front-back direction Y. Hence, the respective lower guides 821*b* to 824*b* come into contact with end surfaces of the blanket BL supported on the suction plate 51 and position the blanket BL to a horizontal position set in advance (4-7).

When the pre-alignment process for the blanket BL is completed, the suction valves V52 are opened, whereby the adjusted negative pressure is supplied to the grooves 511, 512 and the blanket BL is sucked to the suction plate 51 (4-8). Further, the respective lower guide drive motors M82*a* to M82*d* rotate their rotary shafts in an opposite direction to separate the respective lower guides 821*b* to 824*b* from the blanket BL (4-9). Thus preparation for the patterning process is completed as shown in a field (b) of FIG. 14.

C-5. Patterning (Step S5)

Here, the patterning is performed after the blanket thickness is measured. That is, as shown in "Step S5" in a field (a) of FIG. 15, the sensor horizontal drive cylinder CL52 operates to position the blanket thickness measurement sensor SN51 to a position right above a right end portion of the blanket BL (5-1). Then, the blanket thickness measurement sensor SN51 outputs information on the thickness of the blanket BL to the control unit 6, whereby the thickness of the blanket BL is measured (5-2). Thereafter, the sensor horizontal drive cylinder CL 52 operates in an opposite direction to slide the slide plate 562 in the (−X) direction and retract the blanket thickness measurement sensor SN51 from the suction plate 51 (5-3).

Subsequently, the first stage elevating motor M31 rotates its rotary shaft in a predetermined direction to lower the suction plate 37 in the downward (−Z) direction and move the printing plate PP to the vicinity of the blanket BL. Further, the second stage elevating motor M32 rotates its rotary shaft, thereby moving the suction plate 37 upward and downward at a narrow pitch to accurately adjust a distance between the printing plate PP and the blanket BL in the vertical direction Z, i.e. the gap amount (5-4). Note that the gap amount is determined by the control unit 6 based on the thickness measurement results of the printing plate PP and the blanket BL.

Then, the pressing member elevating cylinders CL71 to CL73 operate to lower the pressing member 71 and press the peripheral edge portion of the blanket BL over the entire circumference by the pressing member 71 (5-5). Following this, the valves V51, V52 are operated to partly supply air between the suction plate 51 and the blanket BL and partly raise the blanket BL. The lifted portion of the blanket BL is pressed against the printing plate PP held by the upper stage unit 3 (5-6). As a result, as shown in a field (b) of FIG. 15, a central portion of the blanket BL comes into close contact with the printing plate PP. A pattern (not shown) formed in advance on the lower surface of the printing plate PP comes into contact with the application layer applied to the upper surface of the blanket BL in advance, thereby patterning the application layer. Accordingly, a pattern layer is formed on the upper surface of the blanket BL.

C-6. Printing Plate Separation (Step S6)

As shown in "Step S6" in a field (c) of FIG. 15, Substeps (6-1) to (6-5) are performed. That is, the second stage elevating motor M32 rotates its rotary shaft to lift the suction plate 37 and separate the printing plate PP from the blanket BL (6-1). Further, in parallel with the lifting of the printing plate PP for the separation process, the opening/closing states of the valves V51, V52 are switched at an appropriate timing and a negative pressure is applied to the blanket BL to pull the blanket BL toward the suction plate 37. Thereafter, the first stage elevating motor M31 rotates its rotary shaft to lift the suction plate 37 and position the printing plate PP to a static elimination position substantially at the same height as the ionizer 91 (6-2). Further, the pressing member elevating cylinders CL71 to CL73 operate to lift the pressing member 71 and release the blanket BL from the pressed state (6-3). Following this, the ionizer 91 is actuated to eliminate static electricity generated at the time of the printing plate separation process (6-4). When the static elimination process is completed, the first stage elevating motor M31 rotates its rotary shaft, whereby the suction plate 37 is lifted to the original position (position higher than the printing plate suction position XP23) while sucking and holding the printing plate PP as shown in a field (d) of FIG. 15 (6-5).

C-7. Printing Plate Retraction (Step S7)

As shown in "Step S7" in a field (a) of FIG. 16, Substeps (7-1) to (7-7) are performed. That is, the rotary actuators RA2, RA2 operate to rotate the printing plate hands 252, 252 by 180 degrees and position them from the original positions to inverted positions (7-1). The hand posture is switched from the unused posture to the used posture and preparation for receiving the used printing plate PP is completed. Then, the shuttle horizontal drive motor M21 rotates its rotary shaft to move the shuttle holding plate 24 in the (−X) direction (7-2), whereby the printing plate shuttle 25L is moved and positioned to the printing plate suction position XP23.

On the other hand, the first stage elevating motor M31 rotates its rotary shaft and the suction plate 37 is lowered toward the hands 252, 252 of the printing plate shuttle 25L and positions the printing plate PP on the hands 252, 252 while sucking and holding the printing plate PP. Thereafter, the valves V31, V32 are closed, so that the suction of the printing plate PP by the suction grooves 371 and the suction pads 38 is released. Hereby the transfer of the printing plate PP at the conveyance position is completed (7-3). Then, the first stage elevating motor M31 rotates its rotary shaft in the opposite direction to lift the suction plate 37 to the initial position (7-4). Thereafter, the shuttle horizontal drive motor M21 rotates its rotary shaft to move the shuttle holding plate 24 in the (+X) direction (7-5). The printing plate shuttle 25L is moved and positioned to the middle position XP22 while holding the used printing plate PP.

C-8. Substrate Suction (Step S8)

As shown in "Step S8" in the field (a) of FIG. 16, the shuttle horizontal drive motor M21 rotates its rotary shaft in the predetermined direction to move the shuttle holding plate 24 in the (+X) direction (8-1). The substrate shuttle 25R holding the substrate SB before processes is moved and positioned to the substrate suction position XP23. Then, as in the pre-alignment process for the printing plate PP (3-2, 3-3) and the suction process for the printing plate PP by the suction plate 37 (3-4), a pre-alignment process for the substrate SB (8-2, 8-3) and a suction process for the substrate SB (8-4) are performed.

Thereafter, when the suction of the substrate SB is detected by the suction detection sensor SN31 (FIG. 2), the stage elevating motor M31 rotates its rotary shaft and the suction plate 37 is moved vertically upward while sucking and holding the substrate SB. This makes the substrate SB move to a position higher than the substrate suction position XP23 (8-5). Then, the substrate shuttle elevating motor M22R rotates its rotary shaft to move the elevating plate 251 vertically upward, thereby moving the substrate shuttle 25R from the pre-alignment position to the conveyance position (8-6). Thereafter, the shuttle horizontal drive motor M21 rotates its rotary shaft to move the shuttle holding plate 24 in the (−X) direction and the emptied substrate shuttle 25R is positioned to the middle position XP24 (8-7).

C-9. Transfer (Step S9)

As shown in "Step S9" in a field (a) of FIG. 17, the blanket thickness is measured, precise alignment is performed and the transfer process is performed. That is, as shown in "Step S9" in the field (a) of FIG. 17, the thickness of the blanket BL is measured (9-1 to 9-3) as in Substeps (5-1 to 5-3) of the patterning process (Step S5). Note that the thickness of the blanket BL is measured not only immediately before the patterning, but also immediately before the transfer. The reason is that the thickness of the blanket BL changes with time since the blanket BL is partly swelled, and a highly accurate transfer process can be performed by measuring the thickness of the blanket immediately before the transfer.

Subsequently, the first stage elevating motor M31 rotates its rotary shaft in the predetermined direction to lower the suction plate 37 in the downward (−Z) direction and move the substrate SB to the vicinity of the blanket BL. Further, the second stage elevating motor M32 rotates its rotary shaft, thereby moving the suction plate 37 upward and downward at a narrow pitch to accurately adjust a distance between the substrate SB and the blanket BL in the vertical direction Z, i.e. the gap amount (9-4). The gap amount is determined by the control unit 6 based on the thickness measurement results of the substrate SB and the blanket BL. In the subsequent Substep (9-5), the peripheral edge portion of the blanket BL is pressed by the pressing member 71 as in the patterning (Step S5).

The substrate SB and the blanket BL are both pre-aligned and positioned while being spaced apart by a distance suitable for the transfer process. To accurately transfer the pattern layer formed on the blanket BL to the substrate SB, the both need to be precisely positioned. Therefore, Substeps (9-6 to 9-8) are performed (precise alignment).

Here, the Z-axis drive motors M45*a* to M45*d* of the alignment unit 4 are actuated to perform a focus adjustment in the respective imaging units 45*a* to 45*d* so that the alignment marks patterned on the blanket BL are focused (9-6). Then, images imaged by the respective imaging units 45*a* to 45*d* are output to the image processing unit 65 of the control unit 6 (9-7). Then, based on these images, the control unit 6 calculates a control amount used to position the blanket BL with respect to the substrate SB and generates operation commands for the X-axis drive motors M42, M44 and the Y-axis drive motors M41, M43 of the alignment unit 4. Then, the X-axis drive motors M42, M44 and the Y-axis drive motors M41, M43 are actuated in response to the control commands to horizontally move the suction plate 51 and rotate it about a virtual axis of rotation extending in the vertical direction Z, thereby precisely positioning the blanket BL with respect to the substrate SB (9-8).

Then, the valves V51, V52 are operated to partly supply air between the suction plate 51 and the blanket BL and partly raise the blanket BL. The lifted portion of the blanket BL is pressed against the substrate SB held by the upper stage unit 3 (9-9). As a result, as shown in a field (b) of FIG. 17, the blanket BL is held in close contact with the substrate SB. Accordingly, the pattern layer on the blanket BL is transferred to the substrate SB while precisely positioned with respect to the pattern on the lower surface of the substrate SB.

C-10. Substrate Separation (Step S10)

Figure 18:
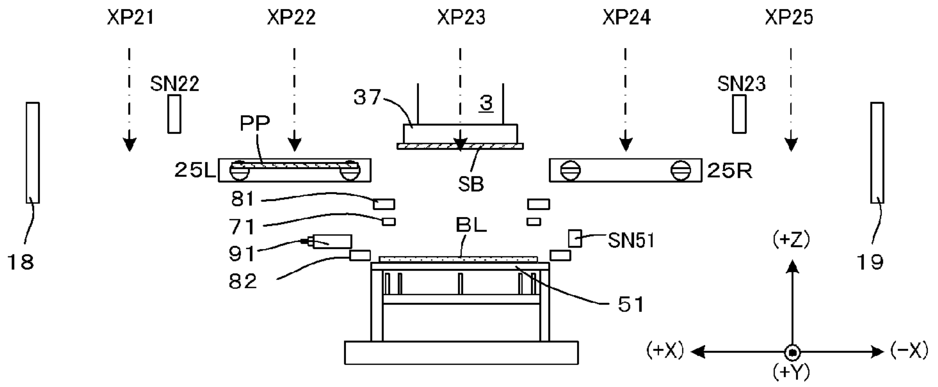

As shown in "Step S10 in a field (a) of FIG. 18, Substeps (10-1) to (10-5) are performed. That is, similar to the printing plate separation (Step S6), the separation of the substrate SB from the blanket BL (10-1), the positioning of the substrate SB to the static elimination position (10-2), the release of the blanket BL from the pressed state by the pressing member 71 (10-3) and static elimination (10-4) are performed. Thereafter, the first stage elevating motor M31 rotates its rotary shaft and the suction plate 37 is lifted to the initial position (position higher than the conveyance position) while sucking and holding the substrate SB (10-5) as shown in a field (b) of FIG. 18.

C-11. Substrate Retraction (Step S11).

As shown in "Step S11" in a field (a) of FIG. 19, Substeps (11-1) to (11-4) are performed. That is, the shuttle horizontal drive motor M21 rotates its rotary shaft to move the shuttle holding plate 24 in the (+X) direction (11-1), whereby the substrate shuttle 25R is moved and positioned to the substrate suction position XP23.

On the other hand, the first stage elevating motor M31 rotates its rotary shaft and the suction plate 37 is lowered toward the hands 252, 252 of the substrate shuttle 25R while sucking and holding the substrate SB. Thereafter, the valves V31, V32 are closed, whereby the suction of the substrate SB by the suction grooves 371 and the suction pads 38 is released (11-2). Then, the first stage elevating motor M31 rotates its rotary shaft in the opposite direction to lift the suction plate 37 to the initial position (11-3). Thereafter, the shuttle horizontal drive motor M21 rotates its rotary shaft to move the shuttle holding plate 24 in the (−X) direction and the substrate shuttle 25R is moved and positioned to the middle position XP24 while holding the substrate SB (11-4).

C-12. Blanket Unloading (Step S12)

As shown in "Step S12" in the field (a) of FIG. 19, Substeps (12-1) to (12-6) are performed. That is, the valves V51, V52 are operated to release the suction of the blanket BL by the suction plate 51 (12-1). Then, the pin elevating cylinder CL51 operate to lift the lift plate 551, thereby lifting the used blanket BL vertically upward from the suction plate 51 (12-2).

Subsequently, the blanket shutter drive cylinder CL13 operates to move the blanket shutter (not shown) and open the shutter (12-3). Then, the blanket conveyance robot accesses to the apparatus 100, receives the used blanket BL from the tops of the lift pins 552 and retracts from the apparatus 100 (12-4). Following this, the blanket shutter drive cylinder CL13 operates to move the blanket shutter and close the shutter (12-5). Further, the pin elevating cylinder CL51 operates to lower the lift plate 551 and lower the lift pins 552 to below the suction plate 51 in the downward (−Z) direction (12-6).

C-13. Printing Plate Unloading Step (S13)

As shown in "Step S13" in the field (a) of FIG. 19, Substeps (13-1) to (13-5) are performed. That is, the shuttle horizontal drive motor M21 rotates its rotary shaft to move the shuttle holding plate 24 in the (+X) direction (13-1), whereby the printing plate shuttle 25L is moved and positioned to the printing plate transfer position XP21. Further, the printing plate shutter drive cylinder CL11 operates to open the shutter 18 (13-2). Following this, the printing plate loading/unloading unit takes out the used printing plate PP from the printing apparatus 100 in response to an operation command from the control unit 6 (13-3). When the unloading of the printing plate PP is completed, the printing plate shutter drive cylinder CL11 operates in the opposite direction by returning the opening/closing states of the above valves to the original states, thereby returning the printing plate shutter 18 to the original position and closing the shutter 18 (13-4). Then, the shuttle horizontal drive motor M21 rotates its rotary shaft to move the shuttle holding plate 24 in the (−X) direction and position the printing plate shuttle 25L to the middle position XP22 (13-5).

C-14. Substrate Unloading (Step S14)

As shown in "Step S14" in the field (a) of FIG. 19, Substeps (14-1) to (14-5) are performed. That is, the shuttle horizontal drive motor M21 rotates its rotary shaft to move the shuttle holding plate 24 in the (−X) direction (14-1), whereby the substrate shuttle 25R is moved and positioned to the substrate transfer position XP25. Further, the substrate shutter drive cylinder CL12 operates to open the shutter 19 (14-2). Following this, the substrate loading/unloading unit takes out the substrate SB subjected to the transfer process from the printing apparatus 100 in response to an operation command from the control unit 6 (14-3). When the unloading of the substrate SB is completed, the substrate shutter drive cylinder CL12 operates in the opposite direction to return the substrate shutter 19 to the original position and close the shutter 19 (14-4). Then, the shuttle horizontal drive motor M21 rotates its rotary shaft to move the shuttle holding plate 24 in the (+X) direction and position the substrate shuttle 25R to the middle position XP24 (14-5). Accordingly, the printing apparatus 100 returns to the initial state as shown in a field (b) of FIG. 19.

D. Precise Alignment Operation

Next, a specific operation of precise alignment (FIG. 17, Substep 9-8) in this embodiment is described in more detail. This precise alignment operation is a process for more precisely aligning relative positions of the substrate SB and the blanket BL in an XY plane, the positions of which are roughly adjusted by the pre-alignment unit 8. The both are aligned with high accuracy, for example, with an accuracy of about ±3 μm by applying an alignment method according to the invention. A supposed planar size of the substrate SB is about 350 mm×300 mm.

In the precise alignment operation of this embodiment, alignment marks as position references are formed on each of the substrate SB and the blanket BL and the substrate SB and the blanket BL are aligned by adjusting a positional relationship of these alignment marks as described below. Note that the final purpose of precise alignment is to correctly transfer a pattern carried on the blanket BL to a predetermined position of the substrate SB. On the other hand, a position on the blanket BL of a pattern formed on the blanket BL by the printing plate PP may possibly vary more or less according to the positional relationship of the printing plate PP and the blanket BL at the time of patterning. Thus, in the precise alignment operation, it is sufficient if a positional relationship between the pattern carried on the blanket BL and the substrate SB is properly adjusted, and the posture of the blanket BL itself with respect to the substrate SB needs not be controlled.

D-1. Alignment Marks

Figure 20:
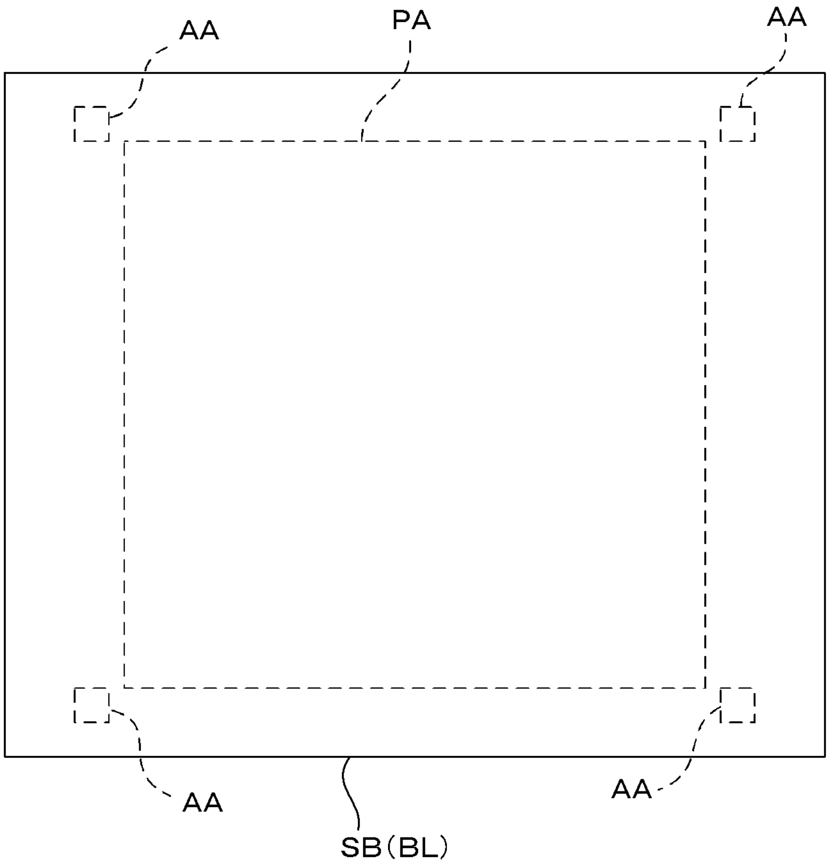
FIG. 20 is a diagram showing an arrangement of the alignment marks for the precise alignment operation.

FIG. 20 is a diagram showing an arrangement of the alignment marks for the precise alignment operation. The substrate SB and the blanket BL are plate-like bodies having substantially the same planar size and the alignment marks are respectively formed at positions corresponding to each other when the both are superposed. That is, an effective pattern area PA where a substrate pattern such as a circuit pattern is formed to finally function as a device is set in a central part of the plate-like substrate SB. A surface area of the blanket BL corresponding to this is an effective pattern area PA of the blanket BL, and a pattern to be transferred to the substrate SB is patterned in this area PA by the printing plate PP. Although a square area in the central part of the square substrate SB is the effective pattern area PA in an example of FIG. 20, these shapes are arbitrary without being limited to square shapes.

Areas at outer sides of four corners of the effective pattern area PA and adjacent to corners of the substrate SB are set as alignment mark forming areas AA. On the substrate SB, the alignment marks are respectively formed in advance in the alignment mark forming areas AA at four positions, for example, by a photolithography technology. On the other hand, the alignment marks formed in the respective alignment mark forming areas AA of the blanket BL are patterned by a pattern forming material using the printing plate PP together with the pattern formed in the effective pattern area PA. Thus, a positional relationship between the pattern formed in the effective pattern area PA and the alignment marks formed in the alignment mark forming areas AA on the blanket BL remains unchanged regardless of a positional relationship between the printing plate PP and the blanket BL at the time of patterning. In this way, a positional relationship between the substrate SB and the pattern on the blanket BL is kept constant by alignment using the alignment marks.

Figure 21A:
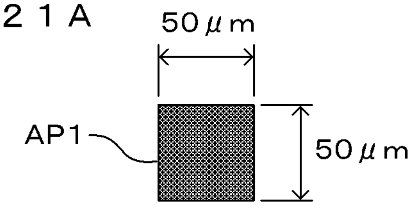
FIG. 21A is a diagram showing a first alignment pattern element.
Figure 21B:
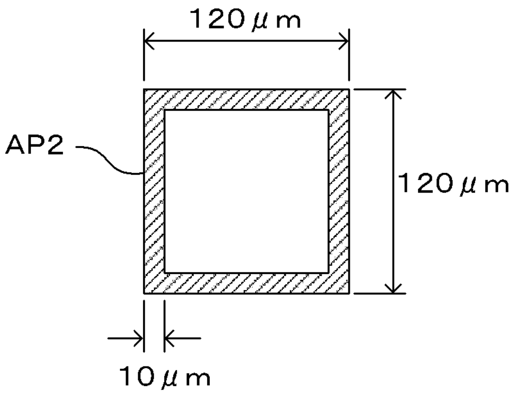
FIG. 21B is a diagram showing a second alignment pattern element.
Figure 21C:
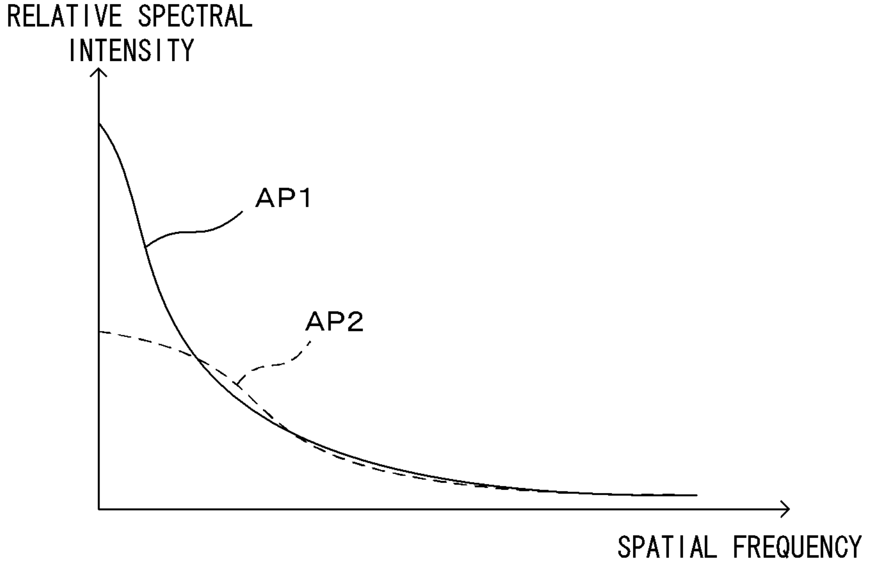
FIG. 21C is a diagram showing spatial frequency spectra of these alignment pattern elements.

FIGS. 21A to 21C are diagrams showing an example of pattern elements of the alignment marks. More specifically, FIG. 21A shows a first alignment pattern element which is a component of a first alignment mark formed on the substrate in this embodiment, and FIG. 21B shows a second alignment pattern element which is a component of a second alignment mark formed on the blanket in this embodiment. Further, FIG. 21C shows spatial frequency spectra of these alignment pattern elements.

As shown in FIG. 21A, the first alignment pattern element AP1 formed on the substrate SB is a solid figure which is of such a size that the figure is not lost even if being out of focus, e.g. a rectangular shape (square shape in this example) one side of which is about 50 μm and the interior of which enclosed by four sides is uniformly filled. On the other hand, as shown in FIG. 21B, the second alignment pattern element AP2 formed on the blanket BL is an annular hollow figure which has a rectangular shape with each side of, e.g. about 120 μm and a blank inside. The line width of each side of a square is, for example, 10 μm, wherefore each side of an inner square is about 100 μm. Thus, when the first and second alignment pattern elements AP1, AP2 are superposed with the centers of gravity thereof located at the same position, the first alignment pattern element AP1 is sized to be completely accommodated in the blank part inside the second alignment pattern element AP2.

If spatial frequency components of these pattern elements are compared, the first alignment pattern element AP1 that is the solid figure includes more low-frequency components than the second alignment pattern element AP2 that is the hollow figure as shown in FIG. 21C. That is, the spatial frequency spectrum of the first alignment pattern element AP1 is more skewed toward a low frequency side. In the precise alignment operation to be described later, the position of each alignment pattern element is detected utilizing this characteristic.

Specifically, the alignment pattern elements configured as described above are imaged by the imaging device 45 of the alignment unit 4, the alignment pattern elements are detected from an imaged image to grasp a positional relationship of the substrate SB and the blanket BL (strictly speaking, the pattern on the blanket BL), and an adjustment operation of aligning these positions is performed as needed.

Although described in detail later, each of the first and second alignment marks of this embodiment includes one or more of the above alignment pattern elements as components. However, the precise alignment operation of this embodiment itself adopting the alignment method according to the invention is also realized by the alignment mark composed only of a single alignment pattern element. Accordingly, the principle of the alignment operation is described here using an example in which the first alignment mark composed of the single first alignment pattern element AP1 is formed on the substrate SB and the second alignment mark composed of the single second alignment pattern element AP2 is formed on the blanket BL.

D-2. Principle of Precise Alignment

Figure 22:
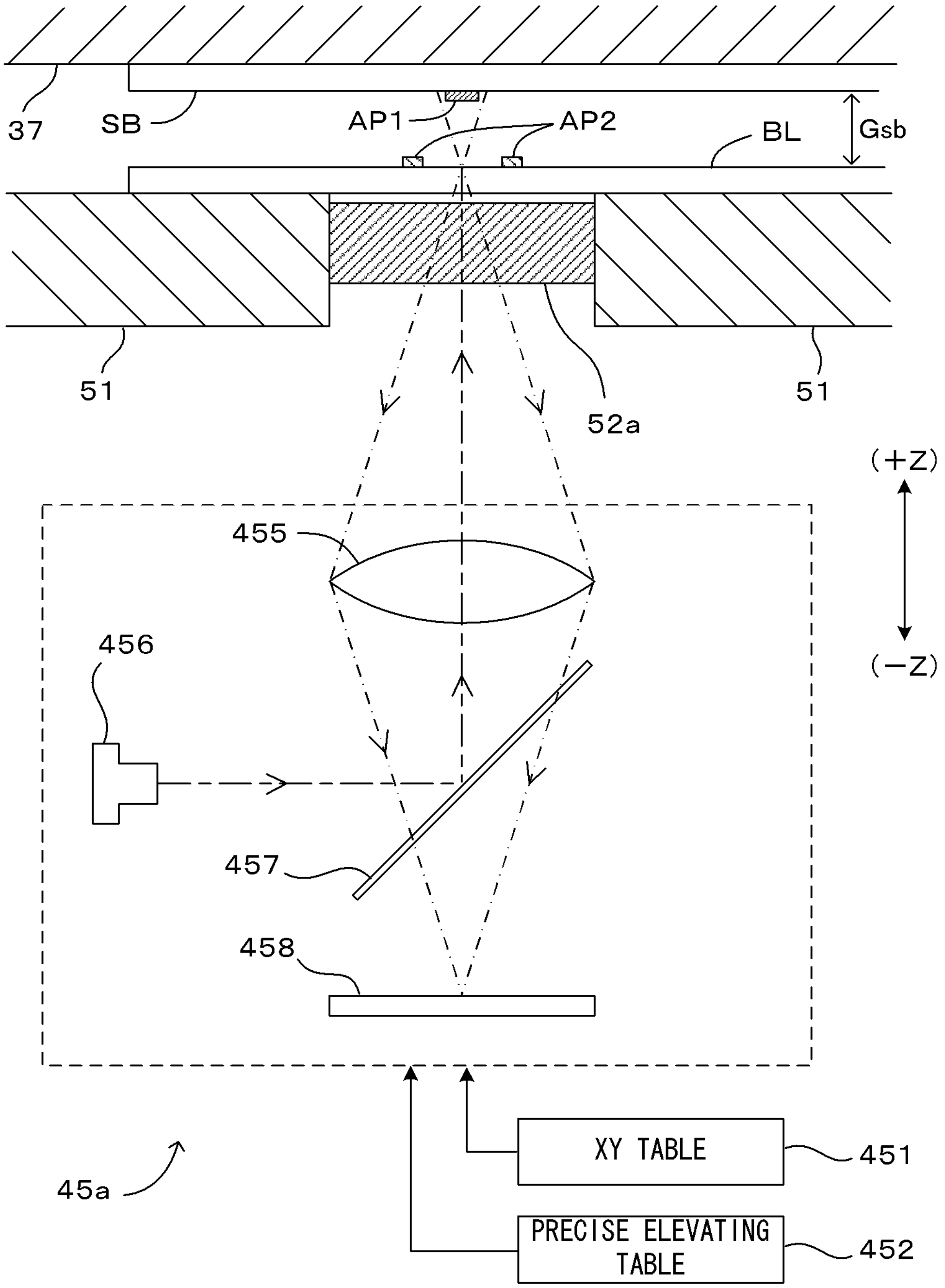
FIG. 22 is a diagram showing an imaging operation for precise alignment.

FIG. 22 is a diagram showing an imaging operation for precise alignment. Although the alignment unit 4 of this embodiment includes four sets of imaging units 45*a* to 45*d* as described above, the operation of one imaging unit 45*a* out of these is described here since the imaging units 45*a* to 45*d* have an identical structure.

The substrate SB formed with the above first alignment pattern element AP1 is sucked and held on the lower surface of the suction plate 37 of the upper stage unit 3 with the alignment mark formed surface thereof faced downward. On the other hand, the blanket BL formed with the second alignment pattern element AP2 is sucked and held on the suction plate 51 of the lower stage unit 5 with the alignment mark formed surface thereof faced upward. Accordingly, the substrate SB and the blanket BL are so arranged that the alignment mark formed surfaces thereof face each other. In this way, a distance between the both alignment marks in the vertical direction (Z direction) can be reduced. A gap Gsb between the substrate SB and the blanket BL is preferably maximally reduced. However, in consideration of dimensional accuracy of the respective units of the apparatus, deflection of the substrate SB and the blanket BL and the like, the substrate SB and the blanket BL have to be separated to a certain degree to prevent an unplanned contact. Here, the gap Gsb is, for example, 300 μm.

The second alignment pattern element AP2 on the surface of the blanket BL is arranged right above the quartz window 52*a* provided in the suction plate 51 of the lower stage unit 5. In other words, the quartz window 52*a* is provided at a position right below one alignment mark forming area AA (FIG. 20) of the blanket BL. The first alignment pattern element AP1 of the substrate SB provided at a position corresponding to this is arranged at a position facing the quartz window 52*a*.

The blanket BL is such that a thin elastic layer made of, e.g. silicon rubber is formed on a surface of a glass plate or a transparent resin plate and has light permeability. Accordingly, the first and second alignment pattern elements AP1, AP2 can be simultaneously viewed through the quartz window 52*a* and the blanket BL from below the lower stage unit 5. The pattern to be transferred to the substrate and the second alignment pattern element AP2 are formed on a surface of the elastic surface of the blanket BL. That is, out of principal surfaces of the blanket BL, one principal surface at a side where the elastic layer is formed is a surface where the pattern and the alignment mark are formed.

The imaging unit 45*a* is arranged below (−Z) the quartz window 52*a*. Specifically, the objective lens 455, a half mirror 457 and a light receiving surface 458 of the CCD camera CMa are arranged in this order at a position right below the quartz window 52*a*. An optical axis of the objective lens 455 substantially coincides with the vertical direction and the quartz window 52*a* and the light receiving surface 458 are respectively arranged on this optical axis. Light from the light source 456 is laterally incident on the half mirror 457, this light is reflected by the half mirror 457 toward the quartz window 52*a* and irradiates the first and second alignment pattern elements via the quartz window 52*a*. The first and second alignment pattern elements AP1, AP2 arranged to face the quartz window 52*a* are collectively imaged within the same field of view on the light receiving surface 458 of the CCD camera.

The objective lens 455, the half mirror 457, the light receiving surface 458 and the light source 456 are integrally movable in a direction along the XY plane by the XY table 451 and in the vertical direction (Z direction) by the precise elevating table 452. A front focus of the objective lens 455 is adjusted to the alignment mark formed surface of the blanket BL by the precise elevating table 452. On the other hand, a rear focus is adjusted to the light receiving surface 458 of the CCD camera. Thus, an optical image focused on (within the focus) the second alignment pattern element AP2 formed on the blanket BL is focused on the light receiving surface 458 of the CCD camera and this optical image is imaged by the CCD camera CMa.

Figure 23:
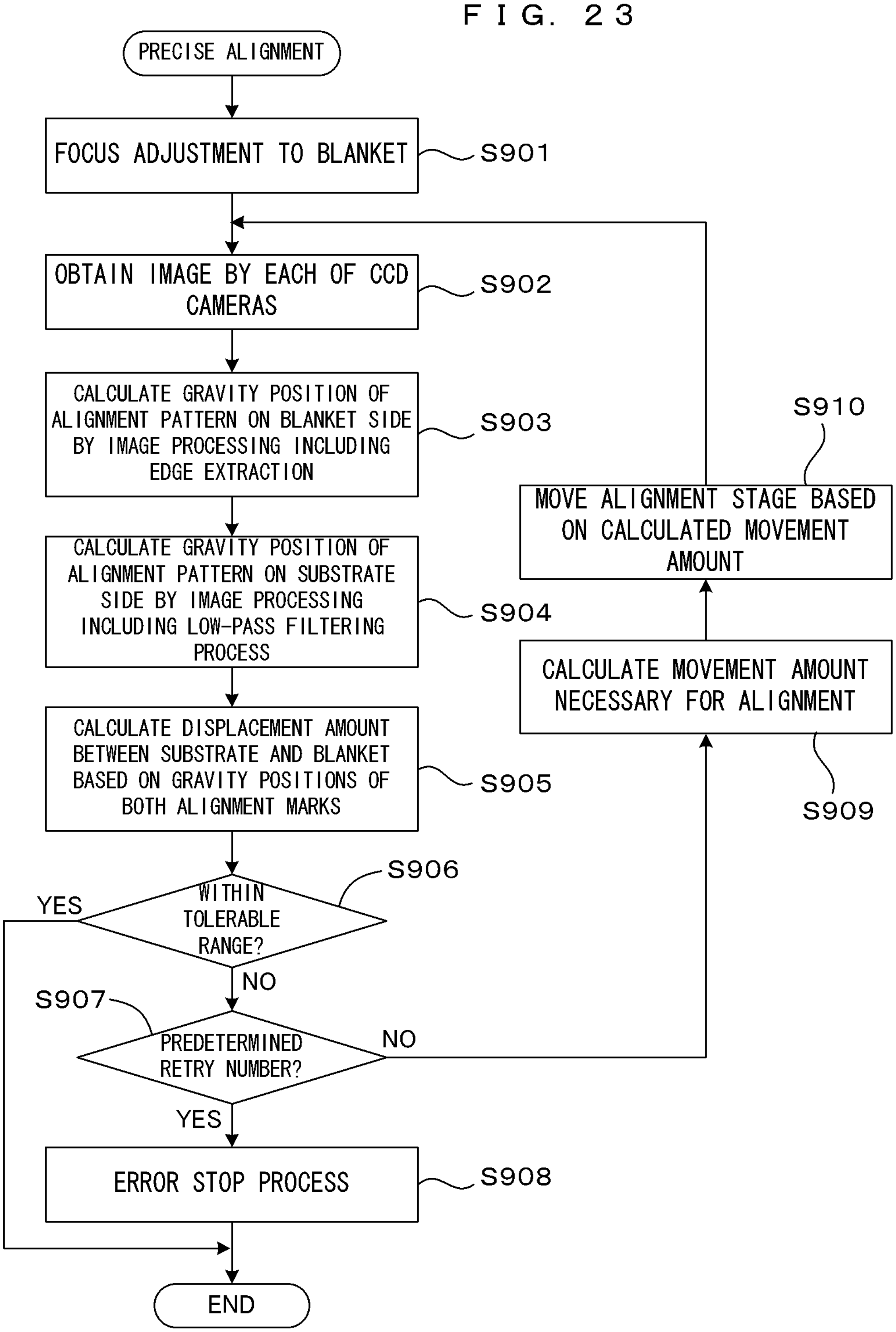
FIG. 23 is a flow chart showing the process flow of the precise alignment operation.

FIG. 23 is a flow chart showing the process flow of the precise alignment operation. Note that, in this process, Steps S901 and S902 are respectively processings corresponding to Substeps (9-6), (9-7) of FIG. 17. Further, the "precise alignment" shown as Substep (9-8) of FIG. 17 corresponds to Steps S903 to S910 of FIG. 23. First, by the precise elevating table 452, the imaging unit 45*a* is focused on the alignment mark formed surface (upper surface) of the blanket BL (Step S901). Specifically, the imaging unit 45*a* is focused as follows.

In a first method, the vertical position of the imaging unit 45*a* is adjusted by the precise elevating table 452 so that the front focus of the objective lens 455 is located on the upper surface of the blanket BL based on the thickness of the blanket BL measured immediately before. That is, the position of the upper surface of the blanket BL held on the suction stage 51 in the Z direction is calculated from a measurement result on the blanket thickness. Then, a focus position of the objective lens 455 in the Z direction is adjusted to the upper surface of the blanket BL by the precise elevating table 452.

Further, in an alternative second method, imaging is performed by the CCD camera CMa and the like every time the focus position is changed and set at a constant pitch in the Z direction by moving the imaging unit 45*a* in the vertical direction (Z direction) by the precise elevating table 452. A position where image contrast is highest is calculated from the imaged image of the alignment pattern element AP2 and the focus position of the objective lens 455 is adjusted to that position.

Focus adjustment can be performed by either one of the two methods. These may be selected by an operation input of an operator. In this way, the imaging unit 45*a* is focused on the upper surface of the blanket BL formed with the second alignment pattern element AP2. Thereafter, the vertical position of the imaging unit 45*a* is not moved so as not to cause a detection error resulting from a deviation of the optical axis.

At this time, the four imaging units 45*a* to 45*d* may be vertically moved integrally or by individual movement amounts. In the former case, a process time can be shortened since the blanket thickness only has to be measured only at one representative position. In the latter case, finer adjustment can be made also in conformity with a thickness difference depending on the position of the blanket BL.

In a state where a focus adjustment is made in this way, the first alignment pattern element AP1 and the second alignment pattern element AP2 corresponding thereto fall within the field of each of the CCD cameras CMa to CMd and, out of these, the second alignment pattern element AP2 is in focus. Each of the CCD cameras CMa to CMd images this image and sends image data to the image processing unit 65 (Step S902). The image processing unit 65 applies a specified image processing to the thus imaged image and detects the positions of the first and second alignment pattern elements AP1, AP2 in each image (Steps S903, S904). Specifically, center of gravity positions G1*m*, G2*m* of these are detected.

Figure 24A:
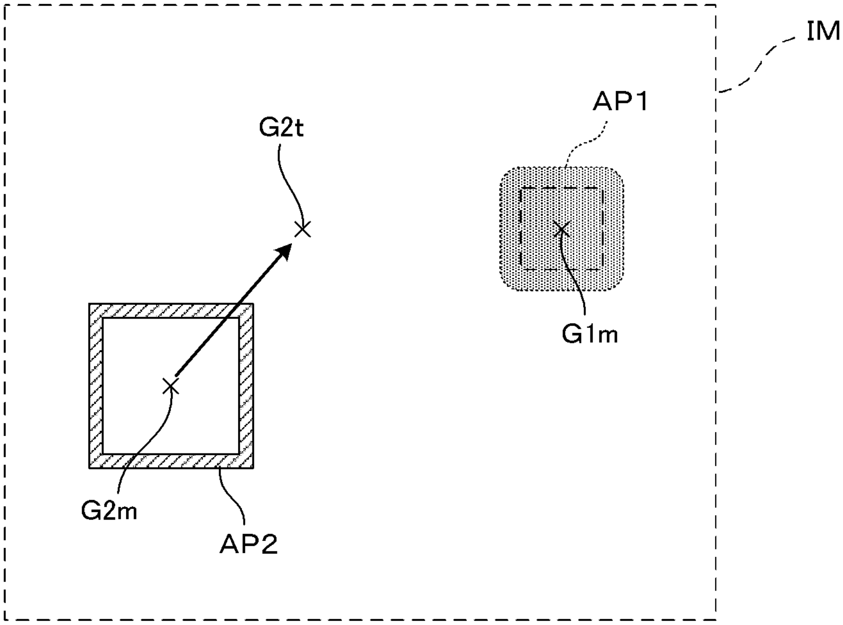
FIGS. 24A to 24C are diagrams showing an example of an image imaged by the CCD camera.
Figure 24B:
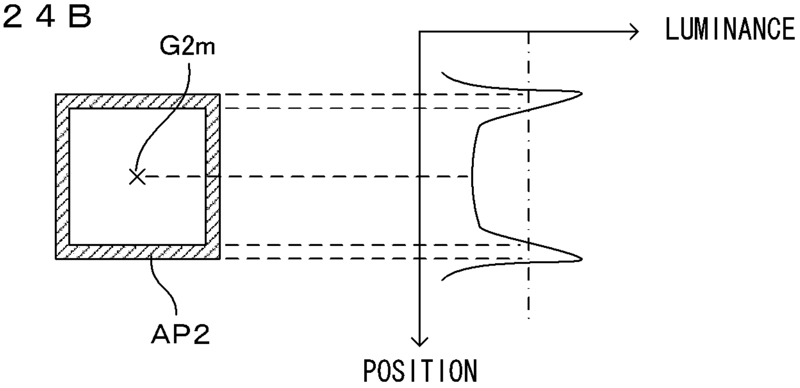
Figure 24C:
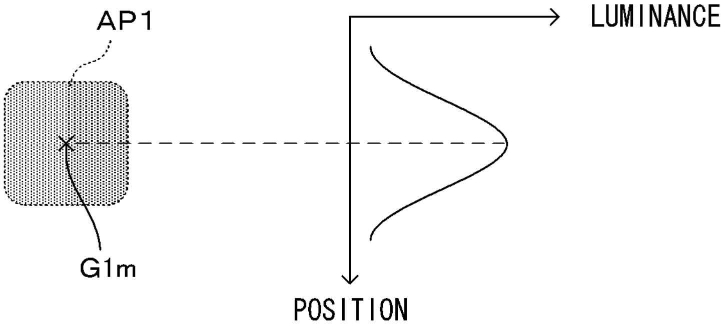

FIGS. 24A to 24C are diagrams showing an example of an image imaged by the CCD camera. An imaged image IM includes an image of the second alignment pattern element AP2 imaged with high image contrast in an in-focus state as shown in FIG. 24A. Accordingly, it is relatively easy to detect the center of gravity position G2*m* of the second alignment pattern element AP2 from the imaged image. When the second alignment pattern element AP2 is an annular rectangular hollow figure, the center of gravity position can be, for example, calculated as follows. As shown in FIG. 24B, an edge part of the second alignment pattern element AP2 is extracted by binarizing luminance at each position in the image using a predetermined threshold. The center of gravity position G2*m* of the second alignment pattern element AP2 can be calculated by estimating the outline thereof from an extraction result (Step S903). Particularly, since characteristics such as external dimensions and line width of the pattern element are known in advance, an image processing specified for those characteristics can be applied.

On the other hand, the first alignment pattern element AP1 formed on the substrate is not necessarily in focus. If a distance between the first and second alignment pattern elements AP1, AP2 in an optical axis direction is equal to or shorter than the depth of field of the objective lens 455, it is possible to image an image in which both first and second alignment pattern elements AP1, AP2 are in focus. However, when the distance between the alignment pattern elements is longer than the depth of field of the objective lens 455, the first alignment pattern element AP1 deviates from the depth of field, cannot be focused on and is imaged as an image with a blurred outline if the second alignment pattern element AP2 is brought into focus.

In this embodiment, the object lens 455 with a magnifying power of about 5 diameters is used and the depth of field thereof is about ±30 μm (focusing range of 60 μm). On the other hand, the gap Gsb between the substrate SB and the blanket BL set in the apparatus 100 is about 300 μm. Under such conditions, it is impossible to simultaneously bring the both alignment marks into focus. That is, if the second alignment pattern element AP2 is brought into focus, the first alignment pattern element AP1 is inevitably out of focus. The precise alignment method of this embodiment also deals with such a case and enables highly accurate alignment.

When out of focus, the first alignment pattern element AP1 is imaged to be larger than an original outer shape shown by broken line and have a blurred outline as shown in FIG. 24A. Accordingly, out of the spatial frequency components of the shape of the original first alignment pattern element AP1, relatively high frequency components are lost. Thus, a method for extracting an edge as in the case of the second alignment pattern element AP2 is difficult to apply and a detection error is thought to become larger. Accordingly, as shown in FIG. 24C, the center of gravity position of the first alignment pattern element AP1 is calculated using a peak position of a luminance level.

At this time, it is possible to suppress loss of image information and a reduction in detection accuracy of the center of gravity position by so setting the shape of the first alignment pattern element AP1 in advance as to include many low spatial frequency components as shown in FIG. 21C. Particularly in the case of performing an image processing associated with a shading correction, low frequency components are also lost by this, wherefore it is effective to use a pattern element with a shape whose spatial frequency distribution is skewed toward the low frequency side.

Since it is known in advance that the high-frequency components included in the original shape are to be lost, the high frequency components have no utility in the detection of a center of gravity position and rather function as noise. Accordingly, it is desirable to perform a low-pass filtering process for removing high frequency components from an image and detect a center of gravity position from an image after removal. In this way, the center of gravity position G1*m* of the first alignment pattern element AP1 out of focus is calculated (Step S904).

As shown in FIG. 24A, a center of gravity position where the second alignment pattern element AP2 is supposed to be located when the substrate SB and the blanket BL are in a proper positional relationship, for example, based on the center of gravity position G1*m* of the first alignment pattern element AP1 is denoted by G2*t*. However, the actually measured center of gravity position G2*m* does not necessarily coincide with this and the precise alignment operation is necessary to bring them into coincidence. That is, in the precise alignment operation, relative positions of the substrate SB and the blanket BL are so adjusted that the detected center of gravity position G2*m* of the second alignment pattern element AP2 coincides with the proper position G2*t* as shown by an arrow in FIG. 24A. In this embodiment, the blanket BL is aligned with the substrate SB by calculating a necessary movement amount of the stage top 442 of the alignment stage 44 based on the imaging result and moving the stage top 442 to move the lower stage unit 5 supported on the stage top 442 and the blanket BL placed thereon.

When the center of gravity position G1*m* of the first alignment pattern element AP1 and the center of gravity position G2*m* of the second alignment pattern element AP2 are detected in the above manner, a displacement amount between them is subsequently calculated (Step S905). What should be calculated here is not a displacement amount between the detected centers of gravity G1*m*, G2*m* of the two alignment pattern elements, but a displacement amount between the proper center of gravity position G2*t* of the second alignment pattern element AP2 derived from the center of gravity position G1*m* of the first alignment pattern element AP1 and the actually detected center of gravity position G2*m* of the second alignment pattern element AP2. Note that when the first and second alignment pattern elements are arranged to share the same center of gravity position (i.e. G2*t* coincides with G1*m*), a displacement amount between the respective centers of gravity G1*m*, G2*m* of the two alignment pattern elements is an amount to be calculated as a matter of course.

A displacement between the substrate SB and the blanket BL in the XY plane includes not only displacements in the X and Y directions, but also a twist, i.e. a displacement caused by different angles of rotation about a vertical axis. In adjusting the center of gravity positions of a pair of alignment pattern elements respectively provided on the substrate SB and the blanket BL, it is difficult to correct a displacement in this rotational direction about the vertical axis (hereinafter, referred to as a "θ direction"). Particularly, when imaging is performed in a state where one alignment pattern element is out of focus, it is difficult to grasp the angle of rotation of this pattern from a blurred image.

In this embodiment, a pair of alignment marks are provided at each of four corners of the substrate SB and the blanket BL (FIG. 20) and these are imaged by four sets of imaging units 45*a* to 45*d* (FIG. 6). By correcting displacements in the X, Y and θ directions as follows based on the respective images imaged by these four sets of imaging units, highly accurate alignment of the substrate SB and the blanket BL is made possible.

Figure 25:
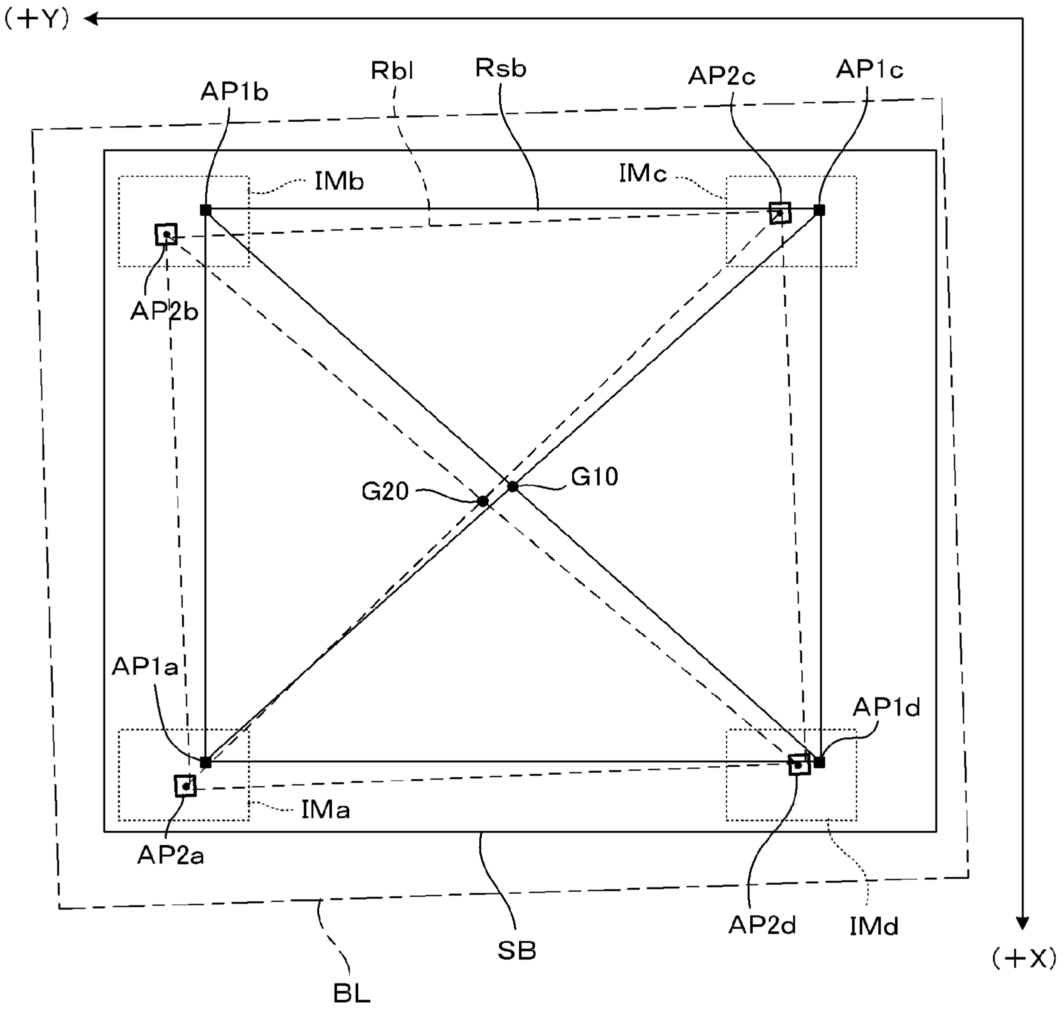
FIG. 25 is a diagram showing a positional relationship of alignment pattern elements to be re-arranged on a virtual plane from an imaging result.
Figure 26A:
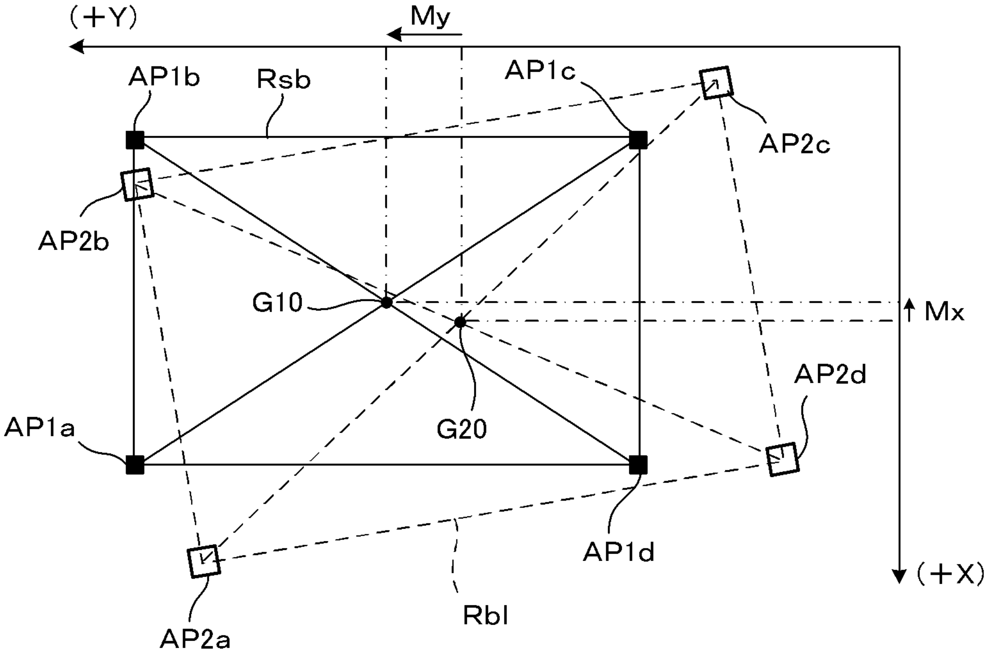
FIGS. 26A and 26B are diagrams showing the principle of a displacement correction based on this.
Figure 26B:
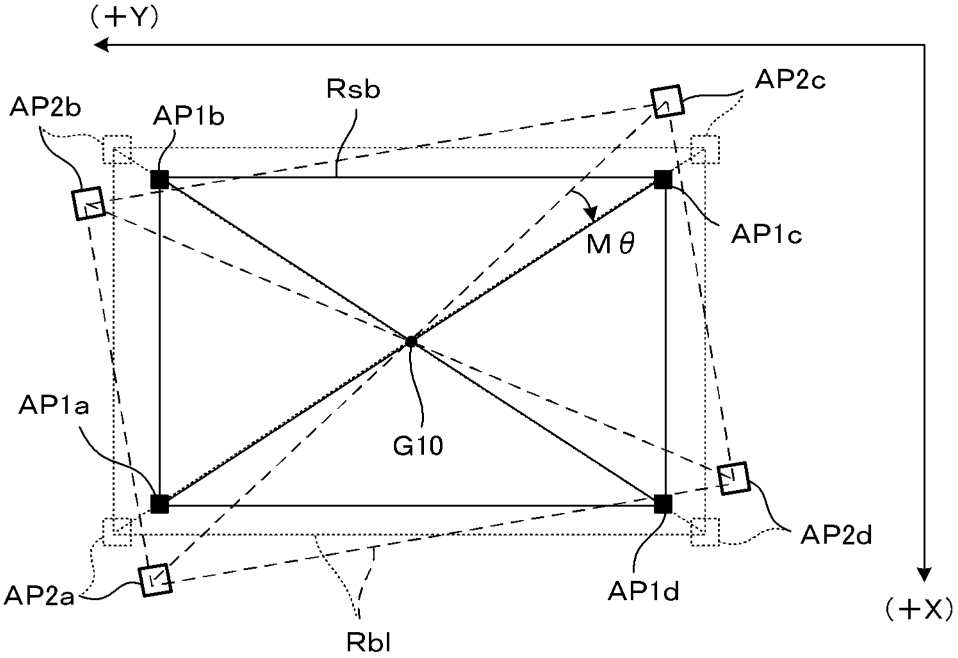

FIGS. 25, 26A and 26B are diagrams showing the principle of the precise alignment in this embodiment. More specifically, FIG. 25 is a diagram showing a positional relationship of alignment pattern elements to be re-arranged on a virtual plane from an imaging result. FIGS. 26A and 26B are diagrams showing the principle of a displacement correction based on this. Directions of coordinate axes in FIGS. 25, 26A, 26B and FIG. 27 to be described later indicate directions in a state where the alignment pattern elements formed on the substrate SB and the blanket BL are viewed up from below as in an imaging mode of the imaging units.

Here, a movement amount of the blanket BL to align the position of the blanket BL based on the position of the substrate SB is assumed to be calculated and a basic way of thinking for that is described. As shown in FIG. 25, images IMa to IMd imaged by the four sets of CCD cameras CMa to CMd are re-arranged on a virtual XY plane. Then, the positional relationship between the substrate SB and the blanket BL is grasped from a positional relationship between a virtual figure formed using alignment pattern elements AP1*a* to AP1*d* at four positions of the substrate SB respectively imaged by the CCD cameras CMa to CMd and a virtual figure formed using alignment pattern elements AP2*a* to AP2*d* at four positions of the blanket BL.

In this embodiment, the alignment pattern elements AP1*a* to AP1*d* on the substrate SB are so arranged that a quadrilateral Rsb whose vertices are located at the respective center of gravity positions becomes a rectangle. Accordingly, a line segment connecting the centers of gravity of the alignment pattern elements AP1*a* and AP1*c* at positions diagonal to each other is one diagonal of this rectangle and an intersection G10 between this line segment and another line segment connecting the centers of gravity of the alignment pattern elements AP1*b* and AP1*d* which is another diagonal coincides with the center of gravity of this rectangle Rsb. Similarly, the alignment pattern elements AP2*a* to AP2*d* on the blanket BL are so arranged that a quadrilateral Rbl whose vertices are located at the respective center of gravity positions becomes a rectangle, and an intersection G20 between a line segment connecting the centers of gravity of the alignment pattern elements AP2*a* and AP2*c* and a line segment connecting the centers of gravity of the alignment pattern elements AP2*b* and AP2*d* coincides with the center of gravity of this rectangle Rbl.

The coordinates and inclinations with respect to the coordinate axes of the center of gravity positions of the rectangles Rsb and Rbl in the virtual plane can be easily calculated from the center of gravity positions of the alignment pattern elements at four positions detected on each of the substrate SB and the blanket BL. A displacement amount between the substrate SB and the blanket BL and movement amounts of the blanket BL in the X, Y and θ directions to correct this displacement can be calculated from these values.

As a simplest example, the rectangle Rsb on the substrate SB and the rectangle Rbl on the blanket BL are assumed to be similar figures. Then, a case is thought where the respective alignment pattern elements are so arranged that the center of gravity G10 of the rectangle Rsb on the substrate SB and the center of gravity G20 of the rectangle Rbl on the blanket BL coincide on the virtual plane and the inclinations of the both rectangles in the virtual plane are equal when the substrate SB and the blanket BL are properly arranged.

As shown in FIG. 26A, the rectangle Rbl (i.e. blanket BL) has to be moved by Mx in (−X) direction and My in the (+Y) direction to correct the displacement between the center of gravity G10 of the rectangle Rsb and the center of gravity G20 of the rectangle Rbl in the XY plane. If such movements are made, the center of gravity G20 of the rectangle Rbl coincides with the center of gravity G10 of the rectangle Rsb as shown in FIG. 26B. However, the inclinations of the both rectangles may differ and a displacement between the substrate SB and the blanket BL in the θ direction may remain. A rotation amount Mθ of the blanket BL about the vertical axis (Z axis) necessary to correct this displacement can be calculated from the detection result of the center of gravity positions of the respective alignment pattern elements.

As just described, the movement amounts Mx, My and Mθ of the blanket BL in the X, Y and θ directions to correct the displacement from the substrate SB can be calculated from the detection result of the center of gravity positions of the respective alignment pattern elements. Based on this calculation result, the stage top 442 of the alignment stage 44 is moved to adjust the position of the blanket BL with respect to the substrate SB, whereby the substrate SB and the blanket BL can be aligned with high accuracy.

Although it is premised in this example that the figures formed by connecting the centers of gravity of the respective alignment pattern elements on the substrate SB and the blanket BL are similar to each other and the center of gravity positions and inclinations of the both figures are equal if there is no displacement between the substrate SB and the blanket BL, there is no limitation to this. That is, regardless of the arrangement of the alignment pattern elements, movement amounts of the blanket BL with respect to the substrate SB only have to be so calculated that a relative positional relationship between a virtual figure formed by appropriately connecting the center of gravity positions of the alignment pattern elements on the substrate SB and a virtual figure formed by appropriately connecting the center of gravity positions of the alignment pattern elements on the blanket BL becomes a relationship set in advance according to the arrangement of the alignment pattern elements.

The above operation is described in accordance with the flow chart of FIG. 23. When the center of gravity positions of the alignment pattern elements imaged by the respective cameras are calculated by the imaging process by the image processing unit 65 for each of the substrate SB and the blanket BL (Steps S903, S904), a displacement amount between the substrate SB and the blanket BL is calculated from these calculation results (Step S905). The displacement amount here is calculated with respect to each of the X, Y and θ direction. If the thus calculated displacement amount falls within a predetermined permissible range (Step S906), the precise alignment operation is finished, assuming that the displacement between the substrate SB and the blanket BL can be ignored.

If the displacement amount is beyond the permissible range, the blanket BL needs to be moved to correct this. Subsequently, the blanket BL is moved for that purpose. In view of a possibility that alignment cannot be performed due to a certain problem of the apparatus, an upper limit is set for a retry number for aligning movements. That is, if the retry number has reached a predetermined number set in advance (Step S907), the process is finished after a predetermined error stop process is performed (S908). The possible content of the error stop process is, for example, to display a predetermined error message and completely stop the process itself, to wait for a user's instruction for the subsequent process after notifying the content of an error to the user and the like. The process may be resumed according to the user's instruction.

On the other hand, if the predetermined retry number has not been reached yet (Step S907), movement amounts (Mx, My, Mθ) of the blanket BL necessary for alignment are calculated (Step S909). Then, the alignment stage 44 is moved based on the calculated movement amounts (Step S910) and the position of the blanket BL is moved together with the stage top 442. In this state, the imaging of the respective alignment pattern elements and the detection of the center of gravity positions are performed again and whether or not the blanket BL needs to be moved again is judged (Steps S902 to S906). This is repeated until the predetermined retry number is reached (Step S907).

In this way, both the center of gravity positions (X direction, Y direction) and the inclinations (angles of rotation in the θ direction) in the XY plane of the rectangle Rsb formed by the alignment pattern elements AP1 at four positions formed on the substrate SB shown by solid line in FIG. 26B and the rectangle Rbl formed by the alignment pattern elements AP2 at four positions formed on the blanket BL shown by dotted line coincide with each other or the displacement amount therebetween comes to fall within the permissible range. In this way, alignment (precise alignment) between the substrate SB and the blanket BL is completed.

In this embodiment, the position of the blanket BL with respect to the substrate SB is adjusted to correct the displacement by repeatedly imaging the alignment pattern elements and moving the blanket BL based on the imaging result. At this time, it is desirable to complete the correction of the displacement amount at least in the θ direction at an earliest possible stage. The reason for that is that a movement to twist the alignment stage 44 is necessary to correct the displacement in the θ direction and repetition of such a movement tends to lead to an error caused by the backlash of the moving mechanism.

By performing alignment based on the comparison of the figures specified by the alignment pattern elements imaged at a plurality of positions in this way, the following advantages can be obtained. Firstly, by synthesizing the detection results at the plurality of positions, displacements can be easily detected not only in the X and Y directions, but also in the θ direction about the vertical axis (Z axis), and these can be corrected. Secondly, alignment accuracy is improved by reducing position detection errors of the alignment pattern elements in each of the images imaged by the respective cameras.

Thirdly, a requirement for the mount position accuracy of the respective imaging units 45*a* to 45*d* on the camera mount base 41 can be reduced. For highly accurate alignment, the mount positions of the imaging units 45*a* to 45*d* on the camera mount base 41 need to be controlled with high accuracy. On the other hand, in this embodiment, a plurality of alignment pattern elements provided on the substrate SB and the blanket BL are respectively imaged by the individual imaging units and alignment is performed in a comprehensive manner from the position detection result of those alignment pattern elements. In such a configuration, it is possible to reduce variations of the mount positions of the imaging units 45*a* to 45*d* and errors due to changes of the mount positions with time as described below.

Figure 27:
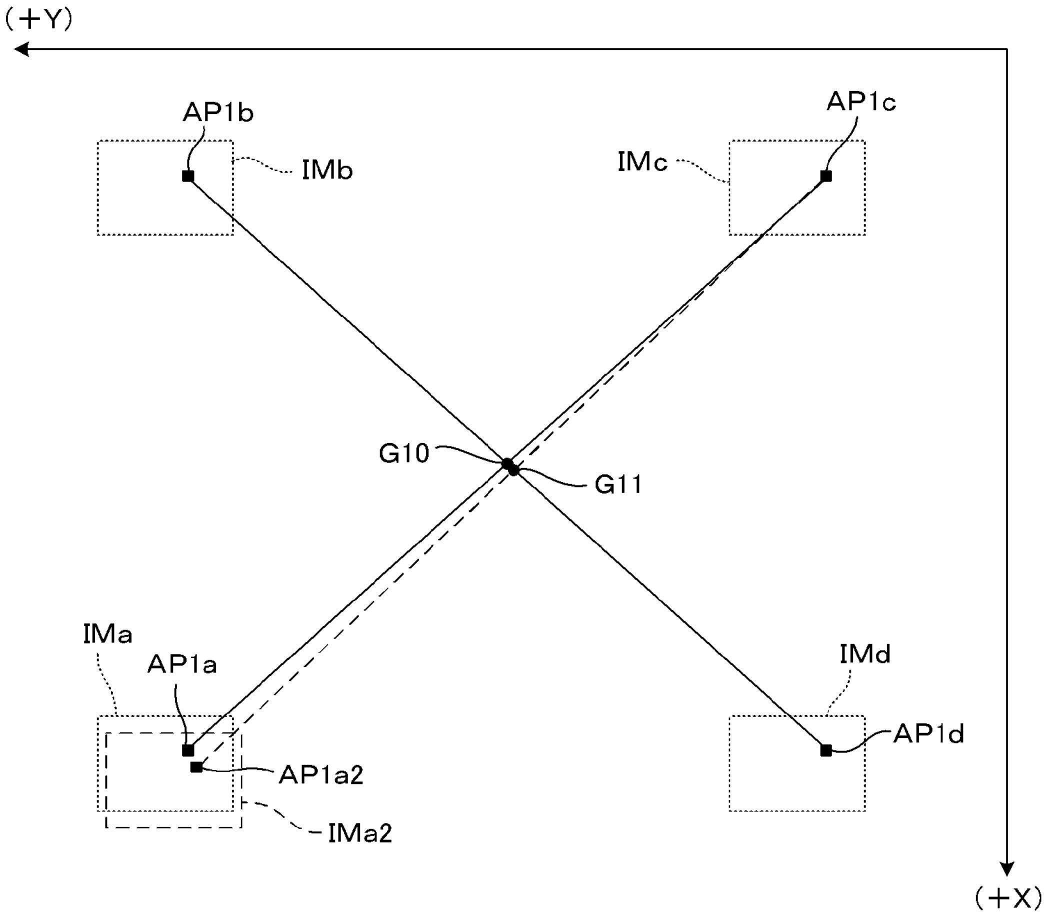
FIG. 27 is a diagram showing an influence of a variation of the mount position of the imaging unit on alignment.

FIG. 27 is a diagram showing an influence of a variation of the mount position of the imaging unit on alignment. As an example, a case is thought where the CCD camera CMa that is supposed to image an area indicated by IMa in FIG. 27 images an area indicated by IMa2 due to a displacement of the mount position. In this case, there is an error between an original center of gravity G10 indicated by four alignment pattern elements AP1*a*, AP1*b*, AP1*c* and AP1*d* and a center of gravity G11 indicated by detected alignment pattern elements AP1*a*2, AP1*b*, AP1*c* and AP1*d* due to a difference in position in a virtual plane between the alignment pattern elements AP1*a* and AP1*a*2. However, that displacement amount becomes smaller than a detected position error of the alignment pattern element itself by being averaged with the position detection results of the alignment pattern elements imaged by the other imaging units.

Further, in this embodiment, the alignment pattern elements at four positions on the substrate SB and the alignment pattern elements at four positions on the blanket BL that are paired with the former alignment pattern elements are respectively imaged within the same fields of the same imaging units. Accordingly, the displacements due to the mount position accuracy of the imaging units 45*a* to 45*d* are nearly equal between the alignment pattern elements on the substrate SB and those on the blanket BL. Thus, the displacement amount between the center of gravity of the figure Rsb formed by the detected alignment pattern elements on the substrate SB and the center of gravity of the figure Rbl formed by the alignment pattern elements on the blanket BL is suppressed to an even lower level.

That is, the influence of the mount positions of the imaging units 45*a* to 45*d* on the detection results is reduced, wherefore the accuracy required for the mount positions of the imaging units can be reduced. Further, the influence of the variation of the mount positions of the imaging units with time can also be suppressed.

As just described, in the precise alignment operation of this embodiment, the second alignment pattern element AP2 that is a hollow figure provided on the blanket BL and the first alignment pattern element AP1 provided on the substrate SB are imaged within the same field of view with the imaging unit 45*a* and the like focused on the second alignment pattern element AP2. The center of gravity position of the second alignment pattern element AP2 is detected by the image processing including the edge extraction, whereas that of the first alignment pattern element AP1 is detected by the image processing including the low-pass filtering process. Thus, the first alignment pattern element AP1 is set as a solid figure including many low spatial frequency components.

By these configurations, in this embodiment, the center of gravity positions of the respective first and second alignment pattern elements can be calculated with high accuracy by imaging in the state where the first alignment pattern element AP1 is out of focus. Accordingly, the substrate SB and the blanket BL can be aligned with high accuracy based on this. According to an experiment of the inventors of this application, it is confirmed that relative displacements can be suppressed to a level of about several μm in the case of aligning the substrate SB and the blanket BL spaced apart by about 300 μm in the vertical direction.

Further, in this embodiment, a plurality of alignment pattern elements are provided at corresponding positions on each of the substrate SB and the blanket BL and the positional relationship between the substrate SB and the blanket BL is obtained in a comprehensive manner from images obtained by individually imaging these. By doing so, it is possible to prevent a reduction in accuracy due to the position detection errors of the alignment pattern elements in the imaged images, the detection errors resulting from variations of the mount positions of the imagers and the like.

D-3. Actual Examples of Alignment Marks

In the above description of the principle of the precise alignment operation, to facilitate the understanding, each of the alignment marks provided at four positions on the substrate SB is composed of the single solid rectangular alignment pattern element AP1, whereas each of the alignment marks provided at four positions on the blanket BL is composed of the single hollow rectangular alignment pattern element AP2. Alignment can be, in principle, performed using the alignment mark that is the single figure, but the alignment mark on the substrate SB is composed of a plurality of alignment pattern elements AP1 arrayed as follows in this embodiment.

Figure 28A:
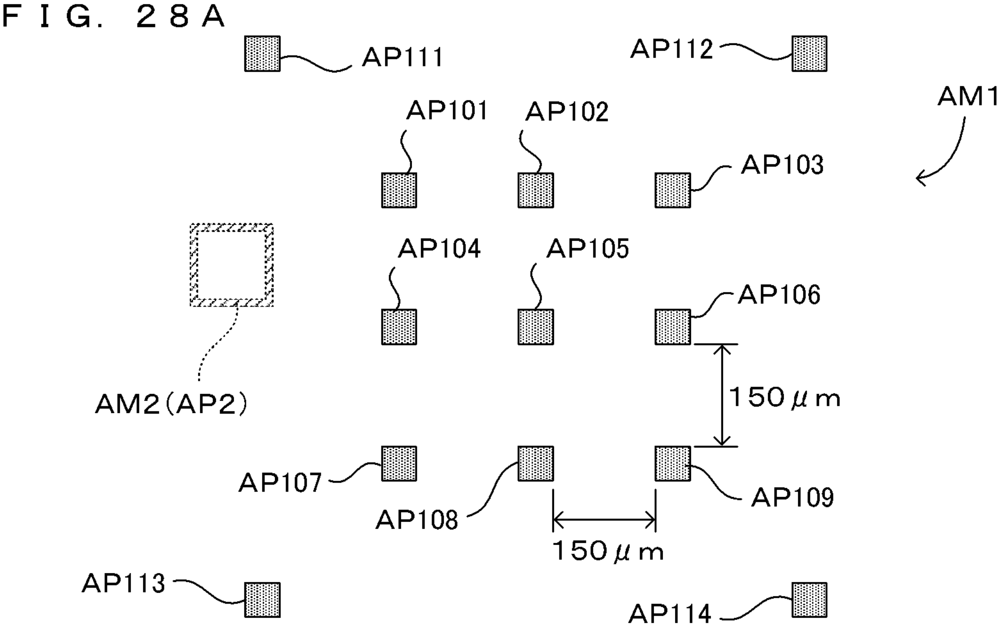
FIGS. 28A and 28B are diagrams showing a specific example of the alignment mark.
Figure 28B:
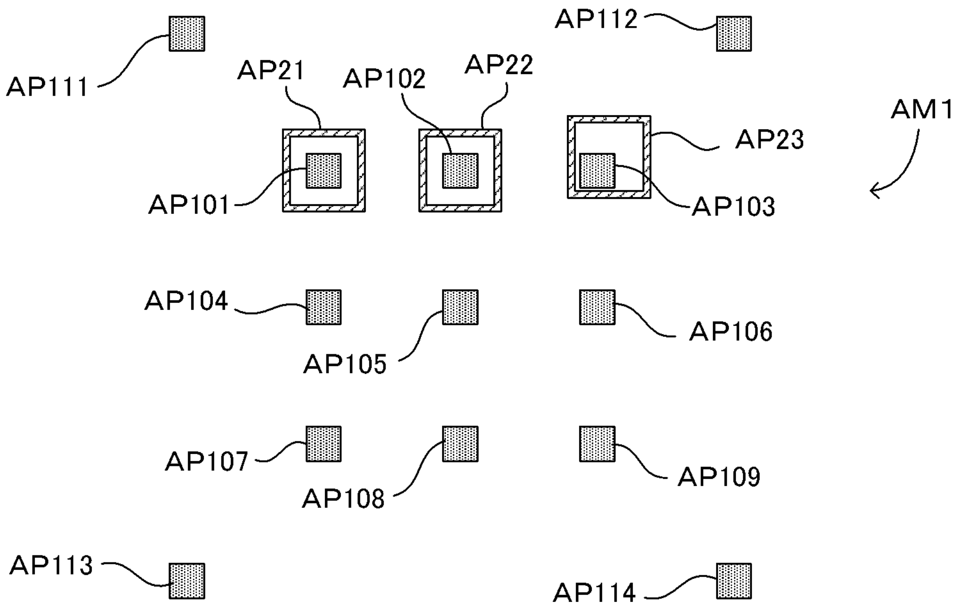

FIGS. 28A and 28B are diagrams showing a specific example of the alignment mark. As shown in FIG. 28A, an alignment mark AM1 formed on the substrate SB is an array of a plurality of solid rectangular alignment pattern elements AP1 described above. Specifically, three alignment pattern elements in each of vertical and horizontal directions, i.e. a total of nine alignment pattern elements AP101 to AP109 having the same shape are arranged in a central part of the alignment mark AM1. An interval between adjacent alignment pattern elements is at least twice the length of one side (50 μm) of each alignment pattern element AP101 and the like, here 150 μm. Further four alignment pattern elements AP111 to AP114 are arranged to surround the outside of a 3×3 matrix of the respective alignment pattern elements AP101 to AP109 thus formed. On the other hand, an alignment mark AM2 on the blanket BL is composed of the single hollow rectangular alignment pattern element AP2, but may be composed of a plurality of alignment pattern elements.

The substrate SB and the blanket BL can be aligned by the above principle using any one of a total of 13 alignment pattern elements AP101 to AP109, AP111 to AP114 on the substrate SB and the alignment pattern element AP2 of the blanket BL. However, in this embodiment, since the alignment mark AM2 is formed of the same material as a pattern to be transferred to the substrate SB in a subsequent transfer process (Substep 9-9 of FIG. 17) on the surface of the blanket BL, the alignment mark AM2 is transferred to the substrate SB together with the pattern. Utilizing this, an example of the arrangement of alignment marks to enable a pattern transfer position to the substrate SB to be retrospectively confirmed is as shown in FIG. 28A.

As shown in FIG. 28A, the precise alignment operation is desirably started in such a positional relationship that the alignment mark AM1 on the substrate SB and the alignment mark AM2 on the blanket BL do not overlap each other in an image imaged by each imaging unit. By doing so, it is possible to prevent a reduction in position detection accuracy due to mutual interference of the both alignment marks. This can be realized by appropriately setting the positions of the substrate SB and the blanket BL at the time of pre-alignment.

On the other hand, the positions of the substrate SB and the blanket BL at the time of the transfer process, i.e. after precise alignment are in such a relationship that the annular second alignment pattern element AP2 encloses one of the inner alignment pattern elements AP101 to AP109 of the first alignment mark AM1. For example, the positions are set as follows. At this time, the center of gravity of the second alignment pattern element AP2 and that of the alignment pattern element on the substrate SB to be enclosed by the second alignment pattern element AP2 more desirably coincide.

The pattern can be transferred to the substrate SB over a plurality of times. This enables a multilayer pattern to be formed on the surface of the substrate SB. FIG. 28B shows an example in which pattern transfer is performed three times. In the first pattern transfer, a second alignment pattern element AP21 carried on the blanket BL is transferred to be superposed on one alignment pattern element AP101 on the substrate SB. Similarly, in the second and third pattern transfers, the second alignment pattern elements AP22, AP23 carried on the blanket BL are respectively transferred to be superimposed on the alignment pattern elements AP102, AP103 on the substrate SB.

At this time, if precise alignment has been appropriately performed, the center of gravity of the alignment pattern element to be transferred from the blanket BL to the substrate SB and that of the alignment pattern element on the substrate SB to be enclosed thereby are supposed to coincide. In the example of FIG. 28B, this relationship is maintained between the alignment pattern elements AP21 and AP101 and between the alignment pattern elements AP22 and AP102. On the other hand, the center of gravity positions are displaced between the alignment pattern elements AP23 and AP103. From this, it can be retrospectively confirmed that there was a slight displacement between the substrate SB and the blanket BL due to a certain cause in the third pattern transfer. Since nine alignment pattern elements AP101 to AP109 are provided in this example, whether or not precise alignment is good in a maximum of nine pattern transfers can be judged in each time.

As just described, the alignment pattern elements AP101 to AP109 have a function as reference marks which are position references of the substrate SB to confirm the position to which the pattern is transferred. Note that the alignment pattern elements AP101 and the like on the substrate SB enclosed by the alignment pattern elements AP21 and the like already transferred from the blanket BL in this way are not suitably used as position references in the subsequent precise alignment. This is because the alignment pattern elements AP21 and the like transferred around may become disturbance at the time of position detection. That is, the alignment pattern elements AP101 to AP109 are said to be "consumed" one by one every time the transfer is performed. In this embodiment, the alignment pattern elements AP111 to AP114 around which the alignment pattern elements from the blanket BL are not to be transferred are separately provided and this problem is solved by using them as position references at the time of precise alignment.

Next, the shape of the alignment pattern element AP2 is described. In this embodiment, a hollow figure having a rectangular (square in this example) outer shape as shown in FIG. 21B is used as the alignment pattern element AP2. Since imaging is performed in the state where the alignment pattern element AP2 is in focus, the shape thereof has a relatively high degree of freedom. For example, a circular ring-shaped figure may be possibly used but, in this case, there is a problem of largely reducing the detection accuracy of the center of gravity position as described below when the alignment pattern element is in an imperfect state. Such imperfection of the pattern element may be caused, for example, by a scratch, smear or the like on the surface of the blanket BL and, in addition, insufficient drying or the like when the alignment pattern element is formed by a liquid applied to the blanket BL.

Figure 29A:
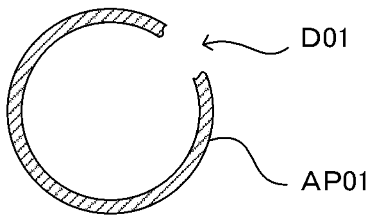
FIGS. 29A to 29D are diagrams showing examples of an alignment pattern element shape with a defect.

FIGS. 29A to 29D are diagrams showing examples of an alignment pattern element shape with a defect. In a circular ring-shaped alignment pattern element AP01 as shown in FIG. 29A, a center of gravity position grasped from an observed pattern element deviates from an original center of gravity position and it is not easy to obtain information as a clue to calculate the original center of gravity position from an image due to the rotational symmetry thereof when there is a defect D01 in a part of the circular ring.

Figure 29B:
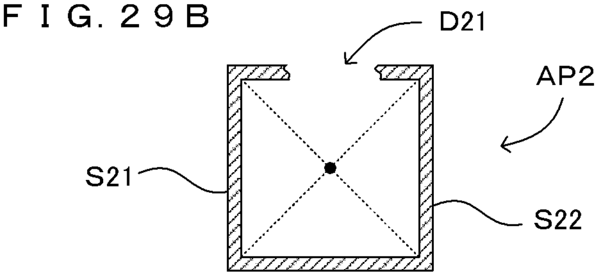
Figure 29C:
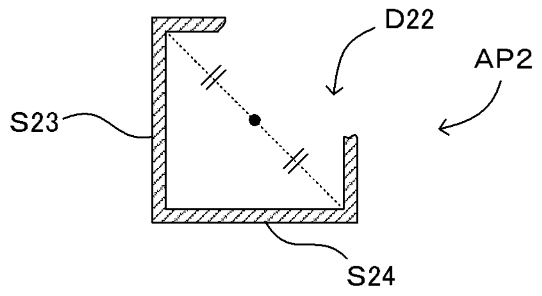
Figure 29D:
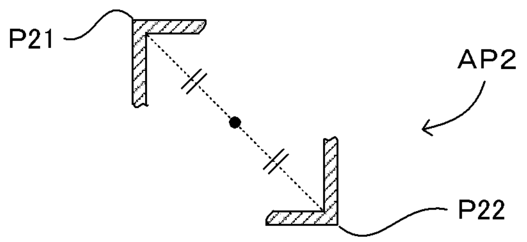

Contrary to this, in the rectangular annular figure of this embodiment, the center of gravity position can be precisely detected if two sides S21, S22 parallel to each other are preserved even when there is a defect D21 in one side as shown in FIG. 29B. Further, when there is a defect D22 including one vertex as shown in FIG. 29C, the center of gravity position can be precisely detected if two adjacent sides S23, S24 are preserved. Even when a defect is extreme, the original center of gravity position can be precisely detected if two vertices P21, P22 on a diagram are preserved as shown in FIG. 29D.

E. Miscellaneous

As described above, in this embodiment, the substrate SB corresponds to a "first substrate" and a "substrate" of the invention, whereas the blanket BL corresponds to a "second substrate" and a "carrier" of the invention. The lower stage unit 5 functions as a "holder" of the invention, and the suction plate 51 thereof functions as a "carrier holding stage" of the invention. Further, in this embodiment, each of the imaging units 45*a* to 45*d* functions as an "imager" of the invention. Further, the CPU 61 and the image processing unit 65 function as a "position detector" of the invention, whereas the alignment stage 44 functions as an "aligner" of the invention.

Further, rectangles Rsb, Rbl in FIG. 25 and other Figures respectively correspond to a "first figure" and a "second figure" of the invention.

Further, Steps S4 (FIG. 12) and S8 of this embodiment correspond to a "holding step" of the invention, and Step S9 corresponds to an "imaging step", a "position detecting step" and an "aligning step" of the invention. More specifically, Step S902 of FIG. 23 corresponds to the "imaging step" of the invention, and Steps S903, S904 correspond to the "position detecting step". Steps S909 and S910 correspond to the "aligning step" of the invention.

Note that the invention is not limited to the above embodiment and various changes other than those described above can be made without departing from the gist of the invention. For example, the shapes of the alignment marks shown in the above embodiment are merely examples and various shapes other than the above shapes can be adopted as long as they satisfy requirements of the invention. However, as described above, a point-symmetric figure at several angles of rotation with respect to a center of gravity is preferable to reduce a detection error of the center of gravity position caused by a defect of a pattern element, but this figure is desirably not in the shape of a circle or a circular ring.

For example, in the above embodiment, four pairs of alignment marks are formed near four corners of the substrate SB and the blanket BL, but the number of alignment marks to be formed is arbitrary without being limited to this. However, to properly correct a displacement about the vertical axis, it is preferable to use a plurality of pairs of alignment marks formed at different positions, and these are more desirably located at maximally distant positions. Further, to suppress an error caused by displacements of the respective cameras, it is desirable to provide three or more pairs of alignment marks.

Further, although the alignment marks on the blanket BL are formed of the same material as the pattern forming material in the above embodiment, this is not an essential requirement. For example, alignment marks that cannot be transferred to the substrate may be formed on the blanket BL in advance. In this case, the positional accuracy of the pattern carried on the blanket BL is important to perform the pattern transfer to the substrate SB with high positional accuracy, wherefore it is necessary to more precisely align the printing plate PP and the blanket BL at the time of patterning on the blanket BL by the printing plate PP.

Further, although the retrospective confirmation of the transfer position is facilitated by transferring the alignment pattern elements AP21 and the like on the blanket BL around the alignment pattern elements AP101 and the like on the substrate SB in the above embodiment, this is not an essential requirement. That is, the alignment pattern elements on the blanket BL can be transferred to appropriate positions outside the effective pattern area PA of the substrate SB.

Further, although patterning is performed on the blanket BL in the printing apparatus as one embodiment of the transfer apparatus according to the invention in the above embodiment, the invention is not limited to this and also suitably applicable to an apparatus into which a blanket patterned outside is loaded to transfer a pattern to a substrate.

Further, for example, the shape of the pattern element of the second alignment mark of the above embodiment is an annular hollow rectangular shape, it is not limited to the hollow figure. The pattern element may be, for example, a repeated pattern element by periodically arranged thin lines. The shape of the pattern element of the first alignment mark is also not limited to the solid figure, but is desirably a shape whose center of gravity position is not changed even if high spatial frequency components are removed.

Further, since the distance between the substrate SB and the blanket BL is longer than the depth of field of the CCD cameras CMa and the like in the above embodiment, the first and second alignment marks cannot be simultaneously brought into focus. The invention enables highly accurate alignment of the substrate SB and the blanket BL even in such a situation, but similar functions and effects can be obtained by applying pattern element shapes of the alignment marks of the invention to a system in which both alignment marks are simultaneously brought into focus.

Further, although the invention is applied to the apparatus for transferring the pattern carried on the blanket BL as the "second substrate" of the invention to the substrate SB as the "first substrate" in the above embodiment, this invention is also suitably applicable not only to alignment between substrates for the purpose of transferring a pattern in this way, but also to alignment, for example, when two substrates are bonded to each other.

This invention can be suitably applied to a field of technology required to align a first substrate and a second substrate with high accuracy with the first and second substrates opposed to each other. For example, this invention can be suitably applied to a field of technology required to align a carrier carrying a transfer material and a substrate, to which the transfer material is to be transferred, with high accuracy.

In the position detecting steps of the present invention (the alignment method and the transfer method), for example, the position of the second alignment mark may be detected based on a result of an edge extraction from the image. Further, center of gravity positions of the first alignment mark and the second alignment mark in the image may be respectively detected in the position detecting step, and at least one of the first substrate and the second substrate may be moved by a movement amount calculated based on the respective center of gravity positions of the first and second alignment marks in the aligning step.

In the inventions, high spatial frequency components of the second alignment mark are preserved since the second alignment mark is imaged in focus as described above. Accordingly, in the position detecting step, the position of the second alignment mark can be detected with high accuracy, for example, by a process associated with edge extraction from the image. Various pattern element shapes can be used for the second alignment mark and a degree of freedom is high.

Further, the positional relationship between the first and second alignment marks in a state where the first and second substrates are properly aligned is known. Accordingly, it is possible to grasp the presence or absence of a relative displacement between the first and second substrates and the magnitude of that displacement amount from the center of gravity positions of the respective first and second alignment marks detected in the image and correct the displacement by moving the first or second substrate as needed.

Further, the alignment method according to the invention may be constructed so that: a plurality of first alignment marks are provided on the first substrate, whereas a plurality of second alignment marks corresponding to the first alignment marks are provided on the second substrate; a plurality of pairs of alignment marks, each pair including one first alignment mark and one second alignment mark corresponding to the first alignment mark, are respectively imaged by individual imagers in the imaging step; and the movement amount is calculated based on a virtual first figure formed by connecting the detected center of gravity positions of the plurality of first alignment marks and a virtual second figure formed by connecting the detected center of gravity positions of the plurality of second alignment marks in the aligning step.

In the case of making an alignment adjustment using a plurality of imagers, movement amounts individually derived from respective images imaged by the individual imagers may not coincide due to a variation of relative positions among the imagers. This may affect the accuracy of a final alignment result. On the other hand, the positional relationship between a pair of first and second alignment marks in the image imaged within the same field of the same imager is not affected by the positional accuracy of the imager. That is, a detected position error resulting from the positional accuracy of the imager is nearly equal between the first and second alignment marks.

Accordingly, the relative positional relationship between the first figure obtained by connecting the center of gravity positions of the first alignment marks and the second figure obtained by connecting the center of gravity positions of the second alignment marks is less affected by the positional accuracy of the imagers. The first and second substrates can be aligned with high accuracy without requiring high positional accuracy for the arrangement of the imagers by grasping the positional relationship between the first and second substrates from the positional relationship of these figures and aligning the first and second substrates.

More specifically, for example, the movement amount calculated in the aligning step may be an amount for bringing the center of gravity positions and angles of rotation into coincidence respectively between the first figure and the second figure projected on a virtual plane of projection parallel to the surface of the first substrate.

When the first and second figures share the same center of gravity, displacement amounts between the center of gravity positions and angles of rotation of the figures connecting the alignment marks are nearly equal between the first and second figures even if the detected positions of the respective alignment marks have an error due to a variation of the arrangement of the imagers. Thus, the first and second substrates can be aligned with high accuracy regardless of the variation of the arrangement of the imagers by making such an adjustment as to bring the center of gravity positions and angles of rotation of these figures into coincidence.

Further, the first alignment mark may include more low spatial frequency components than the second alignment mark.

Here, that "the first alignment mark includes more low spatial frequency components than the second alignment mark" means as follows. When spatial frequency spectra of these alignment marks are obtained, for example, by a Fourier transform, relative spectral intensities of a direct-current component and a component in a frequency domain adjacent to the direct-current component are higher in the first alignment mark than in the second alignment mark. For example, a pattern element formed by a thick line includes more low spatial frequency components than a pattern element formed by a thin line, and a less repeating monotonous pattern element includes more low spatial frequency components than a more repeating pattern element. Generally, a simple pattern element includes many low spatial frequency components and a more complicated pattern element includes more high spatial frequency components.

In the present invention, the first and second alignment marks are imaged in a state where the second alignment mark is in focus. Since the second alignment mark is imaged with high image contrast, the position thereof is relatively easily detected. On the other hand, since the first alignment mark is out of focus depending on a distance from the second alignment mark, position detection may be possibly difficult.

Accordingly, it is preferable that the first alignment mark includes more low spatial frequency components than the second alignment mark and the center of gravity position of the first alignment mark is detected from the imaged image. In an out-of-focus image, high frequency components out of spatial frequency components of the first alignment mark are lost and the outline of the first alignment mark tends to be blurred and, on the other hand, loss of low frequency components is little. By setting the first alignment mark as a pattern element shape including many low frequency components in advance, the loss is suppressed to an even lower level. Because of this, even an image with a blurred outline can provide information sufficient to detect the center of gravity position thereof.

As just described, in the invention, the positions of the first and second alignment marks in the image can be detected with high accuracy and the first and second substrates can be aligned with high accuracy based on this image. This technology is applicable regardless of whether or not the first alignment mark is in focus in the image and alignment can be performed with the same accuracy in either case.

Further, the second substrate may be transparent and the first and second alignment marks may be imaged via the second substrate from a side opposite to the alignment mark formed surface of the second substrate in the imaging step. This enables imaging in a direction perpendicular to the alignment mark formed surface, a displacement in the image between the first and second alignment marks arranged while being spaced apart in this direction can be reduced, and more accurate alignment can be performed.

Further, the first alignment mark may include a solid figure, whereas the second alignment mark may include a hollow figure. If the sizes are nearly equal, the solid figure generally includes many low spatial frequency components, whereas the hollow figure includes many high spatial frequency components. Thus, the solid figure and the hollow figure are respectively suitably applicable as the first alignment mark and as the second alignment mark.

More specifically, the solid figure may be, for example, a figure which is point-symmetric with respect to its center of gravity. Such a figure is particularly suitably usable in the invention since the center of gravity position does not move even in an out-of-focus image. For example, a figure having a rectangular shape can be used as the solid image.

Further, a figure which is point-symmetric with respect to its center of gravity and not a circular ring can be used as the hollow figure. By using a point-symmetric figure, a movement of the center of gravity position in relation to a defocus can be reduced as described above. However, in the case of the hollow figure, a displacement of the center of gravity position is large, for example, such as when a peripheral edge part of the figure partly lacks. To reduce error detection due to such a cause, the figure desirably includes such a characteristic part that the center of gravity position can be restored and extracted even from a part of the figure. Thus, the hollow figure as the second alignment mark of the invention is preferably not a circular ring which is rotationally symmetric by an arbitrary angle and includes no characteristic part as described above. For example, in the case of using an annular figure, the outer and inner peripheries of which are rectangular, a center of gravity position can be derived from a pair of opposite sides, a pair of vertices on a diagonal or two adjacent sides even if the figure partly lacks.

Further, the second alignment mark may be formed on the carrier surface by the same material as the transfer material and be transferred from the carrier to the substrate together with the transfer material in the transferring step. By forming the second alignment mark of the same material as the pattern or the thin film as the transfer material, the transfer material and the second alignment mark are not displaced on the carrier. Thus, as a result of performing alignment utilizing the first alignment mark of the substrate and the second alignment mark of the carrier, the transfer position of the transfer material to the substrate can be aligned with high accuracy.

Further, a reference mark indicating a transfer position of the second alignment mark may be provided on the substrate in advance. The second alignment mark is transferred together with the transfer material to the substrate after the transfer, and whether or not the transfer material has been correctly transferred to a proper position can be easily discriminated if a reference mark is provided on the substrate.

Further, the transfer material may be transferred to one substrate a plurality of times and the reference mark corresponding to each of the plurality of transfers may be individually provided. By doing so, whether or not each transfer has been made to the proper position can be individually discriminated.

As described above, high spatial frequency components of the second alignment mark are preserved since the second alignment mark is imaged in focus. Accordingly, the position detector in the transfer apparatus of the present invention can detect the position of the second alignment mark with high accuracy, for example, by a process associated with edge extraction from the image. Various pattern element shapes can be used for the second alignment mark and a degree of freedom is high.

Further, the position detector may detect center of gravity positions of the first alignment mark and the second alignment mark in the image, and the aligner may move at least one of the substrate and the carrier by a movement amount determined according to the center of gravity positions of the respective first alignment mark and the second alignment mark.

In this configuration, by the same principle as the invention relating to the alignment method described above, the substrate and the carrier can be aligned with high accuracy without requiring that both the first and second alignment marks are located within the depth of field of the imager.

Further, for example, a plurality of imagers may be provided in correspondence with a plurality of alignment marks provided on each of the substrate and the carrier. By performing alignment based on the images of the alignment marks provided at a plurality of positions, alignment accuracy can be further improved. Particularly, the detection of the inclination may be difficult for the first alignment mark that is imaged out of focus, and it is difficult to calculate an angle of rotation of the substrate from a single image. By the detection at the plurality of positions, it is possible to correct also a difference between the angles of rotation of the substrate and the carrier.

Further, the holder may include a carrier holding stage, the upper surface of which is a placing surface on which the carrier is placed and substantially horizontally held, at least a part of the carrier holding stage corresponding to the second alignment mark is transparent, and the imager performs imaging via the transparent part of the carrier holding stage from below the carrier holding stage.

In such a configuration, imaging and alignment can be performed in a state where the carrier is substantially horizontally held on the placing surface of the carrier holding stage. Thus, even a flexible carrier formed of a thin or soft material can be aligned with the substrate with high accuracy.

For example, a focus position of the imager may be variable in the optical axis direction. By doing so, the alignment mark formed surface of the carrier can be brought into focus by also dealing with a variation of the thickness of the carrier. That is, even if the thickness of the carrier varies, the second alignment mark can be brought into focus. Even if the position of the imager changes in a plane perpendicular to an optical axis by performing focusing, the first and second alignment marks are imaged within the same field at the position after the change and the obtained image is used for alignment, wherefore there is no error due to a position variation of the imager.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An alignment method for arranging a first substrate and a second substrate opposite to each other and adjusting a mutual positional relationship, comprising:

a holding step of proximately holding the first substrate formed with a first alignment mark on a surface and the second substrate formed with a second alignment mark on a surface with the respective alignment mark formed surfaces facing each other;

an imaging step of imaging both the first alignment mark and the second alignment mark collectively within a same field of view of a same imager via the second substrate from a side opposite to the alignment mark formed surface of the second substrate;

a position detecting step of detecting positions of both the first alignment mark and the second alignment mark based on an image containing both the first alignment mark and the second alignment mark obtained by imaging; and an aligning step of adjusting relative positions of the first substrate and the second substrate based on a detection result in the position detecting step, wherein:

the first alignment mark includes more low spatial frequency components than the second alignment mark;

the imaging step is performed in a state where a distance in an optical axis direction of the imager between the alignment mark formed surface of the first substrate and that of the second substrate is longer than the depth of field of the imager and the imager is focused on the alignment mark formed surface of the second substrate; and in the position detecting step, a filtering process of removing high spatial frequency components from the image is performed and a center of gravity position of the first alignment mark is detected from the image after filtering.

2. The alignment method according to claim 1, wherein, in the position detecting step, an edge is extracted from the image and the position of the second alignment mark is detected based on an extraction result.

3. The alignment method according to claim 1, wherein center of gravity positions of the first alignment mark and the second alignment mark in the image are respectively detected in the position detecting step, and at least one of the first substrate and the second substrate is moved by a movement amount calculated based on the respective center of gravity positions of the first and second alignment marks in the aligning step.

4. The alignment method according to claim 3, wherein:

a plurality of first alignment marks are provided on the first substrate, whereas a plurality of second alignment marks corresponding to the first alignment marks are provided on the second substrate;

a plurality of pairs of alignment marks, each pair including one first alignment mark and one second alignment mark corresponding to the first alignment mark, are respectively imaged by individual imagers in the imaging step; and the movement amount is calculated based on a virtual first figure formed by connecting the detected center of gravity positions of the plurality of first alignment marks and a virtual second figure formed by connecting the detected center of gravity positions of the plurality of second alignment marks in the aligning step.

5. The alignment method according to claim 4, wherein the movement amount calculated in the aligning step is an amount for bringing the center of gravity positions and angles of rotation into coincidence respectively between the first figure and the second figure projected on a virtual plane of projection parallel to the surface of the first substrate.

6. The alignment method according to claim 1, wherein the first alignment mark includes a solid figure, whereas the second alignment mark includes a hollow figure.

7. The alignment method according to claim 6, wherein the solid figure is a figure which is point-symmetric with respect to a center of gravity.

8. The alignment method according to claim 6, wherein the hollow figure is a figure which is point-symmetric with respect to a center of gravity and not circular ring-shaped.

9. The alignment method according to claim 6, wherein the solid figure is rectangular, whereas the hollow figure is an annular figure and the outer and inner peripheries of which are rectangular.

10. The alignment method according to claim 1, wherein the first alignment mark has a pattern shape including more low-frequency components at a spatial frequency spectrum distribution than the second alignment mark.

11. A transfer method for transferring a pattern or a thin film as a transfer material carried on a transparent carrier to a predetermined position of a substrate, comprising:

a holding step of proximately holding the substrate formed with a first alignment mark on a surface and the carrier formed with the transfer material and a second alignment mark on a surface with the respective alignment mark formed surfaces facing each other;

an imaging step of imaging both the first alignment mark and the second alignment mark collectively within a same field of view of a same imager via the carrier from a side opposite to the alignment mark formed surface of the carrier;

a position detecting step of detecting positions of both the first alignment mark and the second alignment mark based on an image containing both the first alignment mark and the second alignment mark obtained by imaging;

an aligning step of adjusting relative positions of the substrate and the carrier based on a detection result in the position detecting step; and a transferring step of transferring the transfer material on the surface of the carrier to the substrate by bringing the substrate and the carrier, the relative positions of which are adjusted, into contact, wherein:

the first alignment mark includes more low spatial frequency components than the second alignment mark;

the imaging step is performed in a state where a distance in an optical axis direction of the imager between the alignment mark formed surface of the substrate and the alignment mark formed surface of the carrier held proximate to each other is longer than the depth of field of the imager and the imager is focused on the alignment mark formed surface of the carrier; and in the position detecting step, a filtering process of removing high spatial frequency components from the image is performed and a center of gravity position of the first alignment mark is detected from the image after filtering.

12. The transfer method according to claim 11, wherein the second alignment mark is formed on the carrier surface by the same material as the transfer material, and the second alignment mark is transferred from the carrier to the substrate together with the transfer material in the transferring step.

13. The transfer method according to claim 12, wherein a reference mark indicating a transfer position of the second alignment mark is provided on the substrate in advance.

14. The transfer method according to claim 13, wherein the transfer material is transferred to one substrate a plurality of times and the reference mark corresponding to each of the plurality of transfers is individually provided.

15. The transfer method according to claim 11, wherein the first alignment mark has a pattern shape including more low-frequency components at a spatial frequency spectrum distribution than the second alignment mark.

16. A transfer apparatus for transferring a pattern or a thin film as a transfer material to a substrate, comprising:

a holder that proximately holds the substrate formed with a first alignment mark on a surface and a carrier carrying the transfer material to be transferred to the substrate and a second alignment mark on a surface with the respective alignment mark formed surfaces facing each other;

an imager configured for imaging both the first alignment mark and the second alignment mark collectively within a same field of view via the carrier from a side opposite to the alignment mark formed surface of the carrier;

a position detector configured for detecting positions of both the first alignment mark and the second alignment mark based on an image containing both the first alignment mark and the second alignment mark imaged by the imager; and an aligner that adjusts relative positions of the substrate and the carrier based on a detection result of the position detector, wherein:

the first alignment mark includes more low spatial frequency components than the second alignment mark;

a distance in an optical axis direction of the imager between the alignment mark formed surface of the substrate and the alignment mark formed surface of the carrier held proximate to each other by the holder is longer than the depth of field of the imager;

the imager performs imaging in a state where the alignment mark formed surface of the carrier is in focus; and the position detector performs a filtering process of removing high spatial frequency components from the image and detects a center of gravity position of the first alignment mark from the image after filtering.

17. The transfer apparatus according to claim 16, wherein the position detector detects center of gravity positions of the first alignment mark and the second alignment mark in the image, and the aligner moves at least one of the substrate and the carrier by a movement amount determined according to the center of gravity positions of the respective first alignment mark and the second alignment mark.

18. The transfer apparatus according to claim 16, wherein a plurality of imagers are provided in correspondence with a plurality of alignment marks provided on each of the substrate and the carrier.

19. The transfer apparatus according to claim 16, wherein the holder includes a carrier holding stage, the upper surface of which is a placing surface on which the carrier is placed and substantially horizontally held, at least a part of the carrier holding stage corresponding to the second alignment mark is transparent, and the imager performs imaging via the transparent part of the carrier holding stage from below the carrier holding stage.

20. The transfer apparatus according to claim 16, wherein a focus position of the imager is variable along the optical axis direction.

21. The transfer apparatus according to claim 16, wherein the first alignment mark has a pattern shape including more low-frequency components at a spatial frequency spectrum distribution than the second alignment mark.

22. An alignment method for arranging a first substrate and a second substrate opposite to each other and adjusting a mutual positional relationship, comprising:

a holding step of proximately holding the first substrate formed with a first alignment mark on a surface and the second substrate formed with a second alignment mark on a surface with the respective alignment mark formed surfaces facing each other;

an imaging step of imaging the first alignment mark and the second alignment mark within a same field of view of an imager via the second substrate from a side opposite to the alignment mark formed surface of the second substrate;

a position detecting step of detecting positions of the first alignment mark and the second alignment mark based on an image obtained by imaging; and an aligning step of adjusting relative positions of the first substrate and the second substrate based on a detection result in the position detecting step, wherein:

the imaging step is performed in a state where a distance in an optical axis direction of the imager between the alignment mark formed surface of the first substrate and that of the second substrate is longer than the depth of field of the imager and the imager is focused on the alignment mark formed surface of the second substrate; and in the position detecting step, a filtering process of removing high spatial frequency components from the image is performed and a center of gravity position of the first alignment mark is detected from the image after filtering wherein:

center of gravity positions of the first alignment mark and the second alignment mark in the image are respectively detected in the position detecting step, and at least one of the first substrate and the second substrate is moved by a movement amount calculated based on the respective center of gravity positions of the first and second alignment marks in the aligning step;

a plurality of first alignment marks are provided on the first substrate, whereas a plurality of second alignment marks corresponding to the first alignment marks are provided on the second substrate;

a plurality of pairs of alignment marks, each pair including one first alignment mark and one second alignment mark corresponding to the first alignment mark, are respectively imaged by individual imagers in the imaging step; and the movement amount is calculated based on a virtual first figure formed by connecting the detected center of gravity positions of the plurality of first alignment marks and a virtual second figure formed by connecting the detected center of gravity positions of the plurality of second alignment marks in the aligning step.

23. The alignment method according to claim 22, wherein the movement amount calculated in the aligning step is an amount for bringing the center of gravity positions and angles of rotation into coincidence respectively between the first figure and the second figure projected on a virtual plane of projection parallel to the surface of the first substrate.

* * * * *